(12) United States Patent
Waltermire et al.

(10) Patent No.: US 11,137,198 B2
(45) Date of Patent: Oct. 5, 2021

(54) MODULAR BOX ASSEMBLY

(71) Applicant: Pratt Retail Specialties, LLC, Conyers, GA (US)

(72) Inventors: Jamie Waltermire, Peachtree City, GA (US); Paul Ott, Atlanta, GA (US); Greg Sollie, Sharpsburg, GA (US)

(73) Assignee: Pratt Retail Specialties, LLC, Conyers, GA (US)

( * ) Notice: Subject to any disclaimer, the term of this patent is extended or adjusted under 35 U.S.C. 154(b) by 0 days.

(21) Appl. No.: 16/381,678

(22) Filed: Apr. 11, 2019

(65) Prior Publication Data
US 2019/0234679 A1 Aug. 1, 2019

Related U.S. Application Data

(63) Continuation of application No. 15/663,905, filed on Jul. 31, 2017, now Pat. No. 10,551,110.

(51) Int. Cl.
| | |
|---|---|
| *F25D 23/06* | (2006.01) |
| *B65D 81/38* | (2006.01) |
| *B65D 25/28* | (2006.01) |
| *F25D 5/02* | (2006.01) |
| *F25D 3/14* | (2006.01) |

(52) U.S. Cl.
CPC ............ *F25D 23/06* (2013.01); *B65D 25/28* (2013.01); *B65D 81/3888* (2013.01); *F25D 23/067* (2013.01); *F25D 23/069* (2013.01); *F25D 3/14* (2013.01); *F25D 5/02* (2013.01); *F25D 2201/12* (2013.01); *F25D 2323/061* (2013.01)

(58) Field of Classification Search
CPC ...... F25D 23/06; F25D 23/067; F25D 23/069; F25D 5/02; F25D 3/14; F25D 2323/061; F25D 2201/12; B65D 81/3888
USPC .......................................... 220/592.2
See application file for complete search history.

(56) References Cited

U.S. PATENT DOCUMENTS

| | | | | |
|---|---|---|---|---|
| 265,985 | A * | 10/1882 | Seabury | B65D 5/4287 229/125.01 |
| 1,527,167 | A | 2/1925 | Birdseye | |
| 1,677,565 | A | 7/1928 | Oppenheim | |
| 1,682,410 | A | 8/1928 | Oppenheim | |
| 1,747,980 | A | 2/1930 | Kondolf | |
| 1,753,813 | A | 4/1930 | Washburn | |
| 1,868,996 | A | 7/1932 | Sharp | |

(Continued)

FOREIGN PATENT DOCUMENTS

| | | |
|---|---|---|
| CA | 2019104 | 12/1991 |
| CN | 1503962 | 6/2004 |

(Continued)

OTHER PUBLICATIONS

US 10,562,676 B2, 02/2020, Waltermire et al. (withdrawn)

(Continued)

*Primary Examiner* — Ernesto A Grano
(74) *Attorney, Agent, or Firm* — Taylor English Duma LLP

(57) ABSTRACT

A box assembly includes a box defining a box cavity within the box; and at least one insulated panel disposed within the box cavity, the at least one insulated panel including at least one board and at least one insulation batt, the at least one board laminated to the at least one insulation batt, the at least one insulated panel configured to at least partially insulate the box cavity.

17 Claims, 22 Drawing Sheets

(56) References Cited

U.S. PATENT DOCUMENTS

| | | | |
|---|---|---|---|
| 1,896,393 A | 2/1933 | Devine | |
| 1,899,892 A | 2/1933 | D'Este et al. | |
| 1,930,680 A | 10/1933 | Hinton | |
| 1,935,923 A | 11/1933 | Thoke | |
| 1,937,263 A | 11/1933 | Bubb | |
| 1,942,917 A | 1/1934 | D'Este et al. | |
| 1,954,013 A | 4/1934 | Lilienfield | |
| 2,018,519 A | 10/1935 | Hall | |
| 2,070,747 A | 2/1937 | Ostrom | |
| 2,116,513 A | 5/1938 | Frankenstein | |
| 2,148,454 A | 2/1939 | Gerard | |
| 2,165,327 A | 7/1939 | Zalkind | |
| 2,289,060 A | 7/1942 | Merkle | |
| 2,293,361 A | 8/1942 | Roberts | |
| 2,360,806 A | 10/1944 | Van Rosen | |
| 2,386,905 A * | 10/1945 | Meltzen | B65D 5/247 229/189 |
| 2,389,601 A * | 11/1945 | De Witt | B65D 11/10 220/604 |
| 2,485,643 A | 10/1949 | Norquist | |
| 2,554,004 A | 5/1951 | Bergstein | |
| 2,632,311 A | 3/1953 | Sullivan | |
| 2,650,016 A | 8/1953 | McMillan | |
| 2,753,102 A | 7/1956 | Paige | |
| 2,867,035 A | 1/1959 | Patterson, Jr. | |
| 2,899,103 A * | 8/1959 | Ebert | A01K 97/04 220/754 |
| 2,927,720 A | 3/1960 | Adams | |
| 2,986,324 A | 5/1961 | Anderson, Jr. | |
| 2,987,239 A | 6/1961 | Atwood | |
| 3,029,008 A | 4/1962 | Membrino | |
| 3,031,121 A | 4/1962 | Chase | |
| 3,065,895 A | 11/1962 | Lipschutz | |
| 3,096,879 A * | 7/1963 | Schumacher | B65D 81/1275 206/523 |
| 3,097,782 A * | 7/1963 | Koropatkin | A45C 9/00 229/103 |
| 3,182,913 A * | 5/1965 | James | B65D 5/247 229/117.13 |
| 3,193,176 A | 7/1965 | Gullickson et al. | |
| 3,194,471 A | 7/1965 | Murphy | |
| 3,222,843 A | 12/1965 | Schneider | |
| 3,236,206 A | 2/1966 | Willinger | |
| 3,282,411 A | 11/1966 | Jardine | |
| 3,286,825 A | 11/1966 | Laas | |
| 3,335,941 A | 8/1967 | Gatward | |
| 3,371,462 A | 3/1968 | Nordkvist et al. | |
| 3,375,934 A | 4/1968 | Bates | |
| 3,399,818 A | 9/1968 | Stegner | |
| 3,420,363 A | 1/1969 | Blickensderfer | |
| 3,435,736 A | 4/1969 | Reiche | |
| 3,465,948 A | 9/1969 | Boyer | |
| 3,503,550 A | 3/1970 | Main et al. | |
| 3,551,945 A | 1/1971 | Eyberg et al. | |
| 3,670,948 A | 6/1972 | Berg | |
| 3,703,383 A | 11/1972 | Kuchenbecker | |
| 3,734,336 A * | 5/1973 | Rankow | B65D 25/287 220/516 |
| 3,747,743 A | 7/1973 | Hoffman, Jr. | |
| 3,749,299 A | 7/1973 | Ingle | |
| 3,836,044 A | 9/1974 | Tilp et al. | |
| 3,843,038 A | 10/1974 | Sax | |
| 3,880,341 A | 4/1975 | Bamburg et al. | |
| 3,887,743 A | 6/1975 | Lane | |
| 3,890,762 A | 6/1975 | Ernst et al. | |
| 3,980,005 A | 9/1976 | Buonaiuto | |
| 4,030,227 A * | 6/1977 | Oftedahl | A01K 97/05 43/56 |
| 4,050,264 A | 9/1977 | Tanaka | |
| 4,068,779 A * | 1/1978 | Canfield | B65D 25/28 16/428 |
| 4,091,852 A * | 5/1978 | Jordan | A45C 7/004 206/522 |
| 4,169,540 A | 10/1979 | Larsson et al. | |
| 4,211,267 A | 7/1980 | Skovgaard | |
| 4,213,310 A | 7/1980 | Buss | |
| 4,335,844 A | 6/1982 | Egli | |
| 4,342,416 A | 8/1982 | Philips | |
| 4,380,314 A | 4/1983 | Langston, Jr. et al. | |
| 4,396,144 A | 8/1983 | Gutierrez et al. | |
| 4,418,864 A | 12/1983 | Neilsen | |
| 4,488,623 A * | 12/1984 | Linnell, II | A45C 9/00 190/115 |
| 4,509,645 A * | 4/1985 | Hotta | A45C 11/20 206/545 |
| 4,679,242 A | 7/1987 | Brockhaus | |
| 4,682,708 A | 7/1987 | Pool | |
| 4,797,010 A | 1/1989 | Coelho | |
| 4,819,793 A | 4/1989 | Willard et al. | |
| 4,828,133 A | 5/1989 | Hougendobler | |
| 4,830,282 A | 5/1989 | Knight, Jr. | |
| 4,889,252 A | 12/1989 | Rockom et al. | |
| 4,930,903 A | 6/1990 | Mahoney | |
| 4,989,780 A | 2/1991 | Foote et al. | |
| 5,016,813 A * | 5/1991 | Simons | B65D 5/4287 229/189 |
| 5,020,481 A | 6/1991 | Nelson | |
| 5,062,527 A * | 11/1991 | Westerman | B65D 5/3678 229/117 |
| 5,094,547 A | 3/1992 | Graham | |
| 5,102,004 A | 4/1992 | Hollander et al. | |
| 5,154,309 A | 10/1992 | Wischusen, III et al. | |
| 5,158,371 A | 10/1992 | Moravek | |
| 5,165,583 A * | 11/1992 | Kouwenberg | A45C 11/20 206/428 |
| 5,185,904 A | 2/1993 | Rogers et al. | |
| 5,226,542 A | 7/1993 | Boecker et al. | |
| 5,230,450 A | 7/1993 | Mahvi et al. | |
| 5,263,339 A * | 11/1993 | Evans | B65D 5/46112 229/104 |
| 5,358,757 A | 10/1994 | Robinette et al. | |
| 5,372,429 A | 12/1994 | Beaver, Jr. et al. | |
| 5,417,342 A | 5/1995 | Hutchison | |
| 5,418,031 A * | 5/1995 | English | B32B 27/12 428/74 |
| 5,441,170 A | 8/1995 | Bane, III | |
| 5,454,471 A | 10/1995 | Norvell | |
| 5,491,186 A | 2/1996 | Kean et al. | |
| 5,493,874 A * | 2/1996 | Landgrebe | A47J 47/14 62/263 |
| 5,499,473 A * | 3/1996 | Ramberg | A01K 97/05 220/532 |
| 5,505,810 A | 4/1996 | Kirby et al. | |
| 5,511,667 A | 4/1996 | Carder | |
| 5,512,345 A | 4/1996 | Tsutsumi et al. | |
| 5,516,580 A | 5/1996 | Frenette et al. | |
| 5,562,228 A | 10/1996 | Ericson | |
| 5,573,119 A | 11/1996 | Luray | |
| 5,596,880 A * | 1/1997 | Welker | F25D 3/06 40/606.03 |
| 5,613,610 A | 3/1997 | Bradford | |
| 5,615,795 A | 4/1997 | Tipps | |
| 5,638,978 A | 6/1997 | Cadiente | |
| 5,775,576 A | 7/1998 | Stone | |
| 5,842,571 A | 12/1998 | Rausch | |
| 5,906,290 A | 5/1999 | Haberkorn | |
| 5,996,366 A * | 12/1999 | Renard | A47F 3/04 62/256 |
| 6,003,719 A * | 12/1999 | Stewart, III | B65D 81/3825 220/592.11 |
| 6,041,958 A | 3/2000 | Tremelo | |
| 6,048,099 A | 4/2000 | Muffett et al. | |
| 6,050,412 A | 4/2000 | Clough et al. | |
| 6,138,902 A | 10/2000 | Welch | |
| 6,164,526 A * | 12/2000 | Dalvey | B65D 5/0005 206/427 |
| 6,168,040 B1 * | 1/2001 | Sautner | F16L 59/065 220/592.1 |
| 6,220,473 B1 * | 4/2001 | Lehman | B65D 81/3858 150/901 |
| 6,223,551 B1 | 5/2001 | Mitchell | |

(56) References Cited

U.S. PATENT DOCUMENTS

| | | | |
|---|---|---|---|
| 6,238,091 B1 * | 5/2001 | Mogil | A45C 7/0077 383/110 |
| 6,244,458 B1 * | 6/2001 | Frysinger | B65D 81/3823 220/592.09 |
| 6,247,328 B1 * | 6/2001 | Mogil | A45C 7/0077 383/110 |
| 6,295,830 B1 | 10/2001 | Newman | |
| 6,295,860 B1 | 10/2001 | Sakairi et al. | |
| 6,308,850 B1 | 10/2001 | Coom et al. | |
| 6,325,281 B1 * | 12/2001 | Grogan | B65D 81/3862 220/592.25 |
| 6,443,309 B1 | 9/2002 | Becker | |
| 6,453,682 B1 * | 9/2002 | Jennings | A47F 3/0439 62/246 |
| 6,478,268 B1 * | 11/2002 | Bidwell | A47F 5/112 248/152 |
| 6,510,705 B1 * | 1/2003 | Jackson | A01M 31/00 62/457.1 |
| 6,582,124 B2 * | 6/2003 | Mogil | A45C 7/0077 383/110 |
| 6,618,868 B2 * | 9/2003 | Minnick | E04H 4/08 4/498 |
| 6,688,133 B1 * | 2/2004 | Donefrio | F25D 3/08 62/372 |
| 6,725,783 B2 * | 4/2004 | Sekino | B65D 19/44 108/55.3 |
| 6,726,017 B2 | 4/2004 | Maresh et al. | |
| 6,736,309 B1 * | 5/2004 | Westerman | B65D 5/2057 229/117.05 |
| 6,771,183 B2 * | 8/2004 | Hunter | B65D 81/3823 220/592.25 |
| 6,821,019 B2 * | 11/2004 | Mogil | A45C 7/0077 206/545 |
| 6,837,420 B2 | 1/2005 | Westerman et al. | |
| 6,868,982 B2 * | 3/2005 | Gordon | B65D 81/3862 220/592.23 |
| 6,875,486 B2 | 4/2005 | Miller | |
| 6,899,229 B2 * | 5/2005 | Dennison | B65D 5/5028 206/583 |
| 6,910,582 B2 | 6/2005 | Lantz | |
| 6,913,389 B2 | 7/2005 | Kannankeril et al. | |
| 6,971,539 B1 * | 12/2005 | Abbe | B65D 25/205 220/592.12 |
| 7,000,962 B2 * | 2/2006 | Le | B65D 5/46032 220/757 |
| 7,019,271 B2 | 3/2006 | Wnek et al. | |
| 7,070,841 B2 | 7/2006 | Benim et al. | |
| 7,094,192 B2 | 8/2006 | Schoenberger et al. | |
| 7,140,773 B2 | 11/2006 | Becker et al. | |
| 7,225,632 B2 | 6/2007 | Derifield | |
| 7,225,970 B2 * | 6/2007 | Philips | B65D 5/247 229/171 |
| 7,229,677 B2 | 6/2007 | Miller | |
| 7,264,147 B1 | 9/2007 | Benson et al. | |
| 7,392,931 B2 * | 7/2008 | Issler | B65D 5/20 229/125.08 |
| 7,452,316 B2 | 11/2008 | Cals et al. | |
| D582,676 S * | 12/2008 | Rothschild | D3/276 |
| 7,597,209 B2 * | 10/2009 | Rothschild | A45C 7/0036 220/23.87 |
| 7,607,563 B2 | 10/2009 | Hanna et al. | |
| 7,677,406 B2 * | 3/2010 | Maxson | B65D 81/3823 220/254.3 |
| 7,681,405 B2 | 3/2010 | Williams | |
| 7,784,301 B2 | 8/2010 | Sasaki et al. | |
| 7,807,773 B2 * | 10/2010 | Matsuoka | C08L 67/04 528/272 |
| 7,841,512 B2 * | 11/2010 | Westerman | B65D 5/6697 229/117.01 |
| 7,845,508 B2 * | 12/2010 | Rothschild | A45C 7/0054 220/7 |
| 7,870,992 B2 | 1/2011 | Schille et al. | |
| 7,909,806 B2 | 3/2011 | Goodman et al. | |
| 7,971,720 B2 | 7/2011 | Minkler | |
| 8,118,177 B2 | 2/2012 | Drapela et al. | |
| 8,209,995 B2 | 7/2012 | Kieling et al. | |
| 8,210,353 B2 | 7/2012 | Epicureo | |
| 8,343,024 B1 | 1/2013 | Contanzo, Jr. et al. | |
| 8,365,943 B2 | 2/2013 | Bentley | |
| 8,465,404 B2 | 6/2013 | Hadley | |
| 8,579,183 B2 | 11/2013 | Belfort et al. | |
| 8,596,520 B2 | 12/2013 | Scott | |
| 8,613,202 B2 | 12/2013 | Williams | |
| 8,651,593 B2 | 2/2014 | Bezich et al. | |
| 8,763,811 B2 | 7/2014 | Lantz | |
| 8,763,886 B2 | 7/2014 | Hall | |
| 8,795,470 B2 | 8/2014 | Henderson et al. | |
| 8,919,082 B1 | 12/2014 | Cataldo | |
| 8,960,528 B2 | 2/2015 | Sadlier | |
| 9,272,475 B2 | 3/2016 | Ranade et al. | |
| 9,290,313 B2 | 3/2016 | De Lesseux et al. | |
| 9,322,136 B2 | 4/2016 | Ostendorf et al. | |
| D758,182 S | 6/2016 | Sponselee | |
| 9,394,633 B2 | 7/2016 | Shimotsu et al. | |
| 9,408,445 B2 | 8/2016 | Mogil et al. | |
| 9,429,350 B2 | 8/2016 | Chapman, Jr. | |
| 9,499,294 B1 | 11/2016 | Contanzo, Jr. | |
| 9,550,618 B1 | 1/2017 | Jobe | |
| 9,605,382 B2 | 3/2017 | Virtanen | |
| 9,611,067 B2 | 4/2017 | Collison | |
| 9,635,916 B2 | 5/2017 | Bezich et al. | |
| 9,701,437 B2 | 7/2017 | Bugas et al. | |
| 9,738,420 B2 | 8/2017 | Miller | |
| 9,738,432 B1 | 8/2017 | Petrucci et al. | |
| 9,834,366 B2 | 12/2017 | Giuliani | |
| 9,908,680 B2 | 3/2018 | Shi et al. | |
| 9,908,684 B2 | 3/2018 | Collison | |
| 9,920,517 B2 | 3/2018 | Sollie | |
| 9,950,830 B2 | 4/2018 | De Lesseux et al. | |
| 9,981,797 B2 | 5/2018 | Aksan et al. | |
| 10,046,901 B1 | 8/2018 | Jobe | |
| 10,094,126 B2 | 10/2018 | Collison et al. | |
| 10,112,756 B2 | 10/2018 | Menzel, Jr. | |
| 10,226,909 B2 | 3/2019 | Frem et al. | |
| 10,266,332 B2 | 4/2019 | Aksan et al. | |
| 10,357,936 B1 | 7/2019 | Vincent et al. | |
| 10,442,600 B2 | 10/2019 | Waltermire et al. | |
| 10,507,968 B2 | 12/2019 | Sollie et al. | |
| 10,551,110 B2 | 2/2020 | Waltermire et al. | |
| 10,583,977 B2 | 3/2020 | Collison et al. | |
| 10,800,595 B2 | 10/2020 | Waltermire et al. | |
| 10,843,840 B2 | 11/2020 | Sollie et al. | |
| 10,858,141 B2 | 12/2020 | Sollie et al. | |
| 10,882,681 B2 | 1/2021 | Waltermire et al. | |
| 10,882,682 B2 | 1/2021 | Collison et al. | |
| 10,882,683 B2 | 1/2021 | Collison et al. | |
| 10,882,684 B2 | 1/2021 | Sollie et al. | |
| 10,926,939 B2 | 2/2021 | Collison et al. | |
| 10,941,977 B2 | 3/2021 | Waltermire et al. | |
| 10,947,025 B2 | 3/2021 | Sollie et al. | |
| 10,954,057 B2 | 3/2021 | Waltermire et al. | |
| 10,954,058 B2 | 3/2021 | Sollie et al. | |
| 11,027,875 B2 | 6/2021 | Sollie et al. | |
| 11,059,652 B2 | 7/2021 | Sollie et al. | |
| 11,066,228 B2 | 7/2021 | Sollie et al. | |
| 2001/0010312 A1 | 8/2001 | Mogil | |
| 2002/0020188 A1 | 2/2002 | Sharon et al. | |
| 2002/0064318 A1 | 5/2002 | Malone et al. | |
| 2002/0162767 A1 | 11/2002 | Ohtsubo | |
| 2003/0145561 A1 | 8/2003 | Cals et al. | |
| 2004/0004111 A1 | 1/2004 | Cardinale | |
| 2004/0031842 A1 * | 2/2004 | Westerman | B65D 5/2057 229/117.06 |
| 2004/0079794 A1 | 4/2004 | Mayer | |
| 2005/0109655 A1 | 5/2005 | Vershum et al. | |
| 2005/0117817 A1 | 6/2005 | Mogil et al. | |
| 2005/0189404 A1 | 9/2005 | Xiaohai et al. | |
| 2005/0214512 A1 | 9/2005 | Fascio | |
| 2005/0224501 A1 | 10/2005 | Folkert et al. | |
| 2005/0279963 A1 | 12/2005 | Church et al. | |
| 2006/0053828 A1 * | 3/2006 | Shallman | F25D 3/14 62/457.9 |

(56) References Cited

U.S. PATENT DOCUMENTS

| | | |
|---|---|---|
| 2006/0078720 A1 | 4/2006 | Toas et al. |
| 2006/0096978 A1 | 5/2006 | Lafferty et al. |
| 2006/0193541 A1 | 8/2006 | Norcom |
| 2006/0243784 A1 | 11/2006 | Glaser et al. |
| 2007/0000932 A1 | 1/2007 | Cron et al. |
| 2007/0000983 A1 | 1/2007 | Spurrell et al. |
| 2007/0051782 A1 | 3/2007 | Lantz |
| 2007/0193298 A1 | 8/2007 | Derifield |
| 2007/0209307 A1 | 9/2007 | Andersen |
| 2007/0257040 A1 | 11/2007 | Price, Jr. et al. |
| 2008/0095959 A1 | 4/2008 | Warner et al. |
| 2008/0135564 A1 | 6/2008 | Romero |
| 2008/0173703 A1* | 7/2008 | Westerman .......... B65D 5/3678 229/117.01 |
| 2008/0190940 A1* | 8/2008 | Scott .................. A45C 9/00 220/592.2 |
| 2008/0203090 A1 | 8/2008 | Dickinson |
| 2008/0289302 A1 | 11/2008 | Vulpitta |
| 2008/0296356 A1 | 12/2008 | Hatcher et al. |
| 2008/0308616 A1 | 12/2008 | Phung |
| 2008/0314794 A1 | 12/2008 | Bowman |
| 2009/0034883 A1 | 2/2009 | Giuliani |
| 2009/0114311 A1 | 5/2009 | McDowell |
| 2009/0193765 A1 | 8/2009 | Lantz |
| 2009/0214142 A1 | 8/2009 | Bossel et al. |
| 2009/0283578 A1 | 11/2009 | Miller |
| 2010/0001056 A1 | 1/2010 | Chandaria |
| 2010/0006630 A1 | 1/2010 | Humphries et al. |
| 2010/0062921 A1 | 3/2010 | Veiseh |
| 2010/0072105 A1 | 3/2010 | Glaser et al. |
| 2010/0139878 A1 | 6/2010 | Clemente |
| 2010/0151164 A1* | 6/2010 | Grant ..................... D21H 21/20 428/34.2 |
| 2010/0258574 A1 | 10/2010 | Bentley |
| 2010/0270317 A1 | 10/2010 | Kieling et al. |
| 2010/0282827 A1 | 11/2010 | Padovani |
| 2010/0284634 A1 | 11/2010 | Hadley |
| 2010/0314397 A1 | 12/2010 | Williams et al. |
| 2010/0314437 A1 | 12/2010 | Dowd |
| 2011/0042449 A1 | 2/2011 | Copenhaver et al. |
| 2011/0100868 A1 | 5/2011 | Lantz |
| 2011/0114513 A1 | 5/2011 | Miller |
| 2011/0235950 A1 | 9/2011 | Lin |
| 2011/0284556 A1 | 11/2011 | Palmer et al. |
| 2011/0311758 A1 | 12/2011 | Burns et al. |
| 2011/0317944 A1 | 12/2011 | Liu |
| 2012/0031957 A1 | 2/2012 | Whitaker |
| 2012/0074823 A1 | 3/2012 | Bezich et al. |
| 2012/0145568 A1 | 6/2012 | Collison et al. |
| 2012/0243808 A1 | 9/2012 | De Lesseux et al. |
| 2012/0248101 A1 | 10/2012 | Tumber et al. |
| 2012/0251818 A1 | 10/2012 | Axrup et al. |
| 2012/0279896 A1 | 11/2012 | Lantz |
| 2013/0112694 A1* | 5/2013 | Bentley ..................... F25D 3/08 220/592.2 |
| 2013/0112695 A1 | 5/2013 | Hall |
| 2013/0140317 A1 | 6/2013 | Roskoss |
| 2014/0000306 A1 | 1/2014 | Chapman, Jr. |
| 2014/0021208 A1 | 1/2014 | Anti et al. |
| 2014/0093697 A1 | 4/2014 | Perry et al. |
| 2014/0248003 A1 | 9/2014 | Mogil et al. |
| 2014/0319018 A1* | 10/2014 | Collison .............. B65D 81/127 206/589 |
| 2014/0367393 A1 | 12/2014 | Ranade |
| 2015/0110423 A1 | 4/2015 | Fox et al. |
| 2015/0166244 A1 | 6/2015 | Wood et al. |
| 2015/0175338 A1 | 6/2015 | Culp et al. |
| 2015/0238033 A1 | 8/2015 | Zavitsanos |
| 2015/0239639 A1 | 8/2015 | Wenner et al. |
| 2015/0259126 A1 | 9/2015 | McGoff et al. |
| 2015/0284131 A1 | 10/2015 | Genender et al. |
| 2015/0345853 A1 | 12/2015 | Oeyen |
| 2016/0015039 A1 | 1/2016 | Pierce |
| 2016/0052696 A1 | 2/2016 | Cook et al. |
| 2016/0060017 A1 | 3/2016 | De Lesseux et al. |
| 2016/0304267 A1 | 10/2016 | Aksan |
| 2016/0325915 A1* | 11/2016 | Aksan ................ B65D 81/3862 |
| 2017/0015080 A1 | 1/2017 | Collison et al. |
| 2017/0043937 A1 | 2/2017 | Lantz |
| 2017/0144792 A1 | 5/2017 | Block |
| 2017/0198959 A1 | 7/2017 | Morris |
| 2017/0225870 A1 | 8/2017 | Collison |
| 2017/0233134 A9 | 8/2017 | Grajales et al. |
| 2017/0283157 A1 | 10/2017 | Jobe |
| 2017/0305639 A1 | 10/2017 | Kuhn et al. |
| 2017/0320653 A1 | 11/2017 | Mogil et al. |
| 2017/0334622 A1 | 11/2017 | Menzel, Jr. |
| 2017/0341847 A1 | 11/2017 | Chase et al. |
| 2017/0361973 A1 | 12/2017 | Padilla |
| 2017/0369226 A1 | 12/2017 | Chase et al. |
| 2018/0050857 A1 | 2/2018 | Collison |
| 2018/0051460 A1 | 2/2018 | Sollie et al. |
| 2018/0148246 A1 | 5/2018 | Fu et al. |
| 2018/0194534 A1 | 7/2018 | Jobe |
| 2018/0215525 A1 | 8/2018 | Vogel et al. |
| 2018/0229917 A1 | 8/2018 | Jobe |
| 2018/0237207 A1 | 8/2018 | Aksan et al. |
| 2018/0274837 A1 | 9/2018 | Christensen |
| 2018/0290813 A1 | 10/2018 | Waltermire et al. |
| 2018/0290815 A1 | 10/2018 | Waltermire et al. |
| 2018/0299059 A1 | 10/2018 | McGoff et al. |
| 2018/0327171 A1 | 11/2018 | Waltermire et al. |
| 2018/0327172 A1* | 11/2018 | Waltermire ........ B65D 81/3897 |
| 2018/0334308 A1 | 11/2018 | Moore et al. |
| 2018/0335241 A1 | 11/2018 | Li et al. |
| 2019/0032991 A1 | 1/2019 | Waltermire et al. |
| 2019/0047775 A1 | 2/2019 | Waltermire et al. |
| 2019/0185246 A1 | 6/2019 | Sollie et al. |
| 2019/0185247 A1 | 6/2019 | Sollie et al. |
| 2019/0193916 A1 | 6/2019 | Waltermire et al. |
| 2019/0210790 A1 | 7/2019 | Rizzo et al. |
| 2019/0248573 A1 | 8/2019 | Collison et al. |
| 2019/0270572 A1 | 9/2019 | Collison et al. |
| 2019/0270573 A1 | 9/2019 | Collison et al. |
| 2019/0352075 A1 | 11/2019 | Waltermire et al. |
| 2019/0352076 A1 | 11/2019 | Waltermire et al. |
| 2019/0352080 A1 | 11/2019 | Waltermire et al. |
| 2019/0359412 A1 | 11/2019 | Sollie et al. |
| 2019/0359413 A1 | 11/2019 | Sollie et al. |
| 2019/0359414 A1 | 11/2019 | Sollie et al. |
| 2019/0367209 A1 | 12/2019 | Jobe |
| 2019/0376636 A1 | 12/2019 | Fellinger et al. |
| 2019/0382186 A1 | 12/2019 | Sollie et al. |
| 2019/0390892 A1 | 12/2019 | Waltermire et al. |
| 2020/0088458 A1 | 3/2020 | Waltermire et al. |
| 2020/0103159 A1 | 4/2020 | Waltermire et al. |
| 2020/0122896 A1 | 4/2020 | Waltermire et al. |
| 2020/0148409 A1 | 5/2020 | Sollie et al. |
| 2020/0148410 A1 | 5/2020 | Sollie et al. |
| 2020/0148453 A1 | 5/2020 | Sollie et al. |
| 2020/0283188 A1 | 9/2020 | Sollie et al. |
| 2020/0346816 A1 | 11/2020 | Sollie et al. |
| 2020/0346841 A1 | 11/2020 | Sollie et al. |
| 2021/0039869 A1 | 2/2021 | Waltermire et al. |
| 2021/0039870 A1 | 2/2021 | Sollie et al. |
| 2021/0039871 A1 | 2/2021 | Sollie et al. |
| 2021/0070527 A1 | 3/2021 | Sollie et al. |
| 2021/0070529 A1 | 3/2021 | Sollie et al. |
| 2021/0070530 A1 | 3/2021 | Sollie et al. |
| 2021/0101734 A1 | 4/2021 | Collison et al. |
| 2021/0101735 A1 | 4/2021 | Collison et al. |
| 2021/0101736 A1 | 4/2021 | Waltermire et al. |
| 2021/0101737 A1 | 4/2021 | Waltermire et al. |
| 2021/0102746 A1 | 4/2021 | Waltermire et al. |
| 2021/0155367 A1 | 5/2021 | Sollie et al. |
| 2021/0163210 A1 | 6/2021 | Waltermire et al. |
| 2021/0179313 A1 | 6/2021 | Sollie et al. |
| 2021/0179337 A1 | 6/2021 | Sollie et al. |

FOREIGN PATENT DOCUMENTS

| | | |
|---|---|---|
| CN | 102264961 | 11/2011 |
| CN | 206494316 | 9/2017 |

(56) References Cited

FOREIGN PATENT DOCUMENTS

| | | |
|---|---|---|
| CN | 108001787 | 5/2018 |
| DE | 1897846 | 7/1964 |
| DE | 102011016500 | 10/2012 |
| DE | 202017103230 | 7/2017 |
| DE | 202017003908 | 10/2017 |
| EP | 0133539 | 2/1985 |
| EP | 0537058 | 4/1993 |
| EP | 2990196 | 3/2016 |
| FR | 1241878 | 9/1960 |
| FR | 2705317 | 11/1994 |
| FR | 2820718 | 8/2002 |
| FR | 2821786 | 9/2002 |
| FR | 3016352 | 7/2015 |
| GB | 217683 | 6/1924 |
| GB | 235673 | 6/1925 |
| GB | 528289 | 1/1940 |
| GB | 713640 | 8/1954 |
| GB | 1204058 | 9/1970 |
| GB | 1372054 | 10/1974 |
| GB | 2400096 | 5/2006 |
| GB | 2516490 | 1/2015 |
| JP | 01254557 | 10/1989 |
| JP | 2005139582 | 6/2005 |
| JP | 2005247329 | 9/2005 |
| JP | 2012126440 | 7/2012 |
| WO | 8807476 | 10/1988 |
| WO | 9726192 | 7/1997 |
| WO | 9932374 | 7/1999 |
| WO | 2001070592 | 9/2001 |
| WO | 2014147425 | 9/2014 |
| WO | 2016187435 A2 | 5/2016 |
| WO | 2016187435 A3 | 11/2016 |
| WO | 2018089365 | 5/2018 |
| WO | 2018093586 | 5/2018 |
| WO | 2018227047 | 12/2018 |
| WO | 2019125904 | 6/2019 |
| WO | 2019125906 | 6/2019 |
| WO | 2019226199 | 11/2019 |
| WO | 2020101939 | 5/2020 |
| WO | 2020102023 | 5/2020 |
| WO | 2020122921 | 6/2020 |
| WO | 2020222943 | 11/2020 |

OTHER PUBLICATIONS

US 10,899,530 B2, 01/2021, Sollie et al. (withdrawn)
US 10,899,531 B2, 01/2021, Sollie et al. (withdrawn)
US 11,027,908 B2, 06/2021, Sollie et al. (withdrawn)
US 11,040,817 B2, 06/2021, Sollie et al. (withdrawn)
Waltermire, Jamie; Requirement for Restriction/Election for U.S. Appl. No. 15/482,186, filed Apr. 7, 2017, dated Apr. 17, 2019, 7 pgs.
Waltermire, Jamie; Final Office Action for U.S. Appl. No. 15/482,200, filed Apr. 7, 2017, dated Jan. 2, 2019, 23 pgs.
Waltermire, Jamie; Non-Final Office Action for U.S. Appl. No. 15/482,200, filed Apr. 7, 2017, dated Jun. 11, 2018, 36 pgs.
Waltermire, Jamie; Final Office Action for U.S. Appl. No. 15/590,345, filed May 9, 2017, dated Mar. 19, 2019, 42 pgs.
Waltermire, Jamie; Non-Final Office Action for U.S. Appl. No. 15/590,345, filed May 9, 2017, dated Aug. 24, 2018, 41 pgs.
Waltermire, Jamie; Non-Final Office Action for U.S. Appl. No. 15/590,349, filed May 9, 2017, dated Nov. 5, 2018, 41 pgs.
Waltermire, Jamie; Requirement for Restriction/Election for U.S. Appl. No. 15/590,349, filed May 9, 2017, dated Aug. 30, 2018, 10 pgs.
Waltermire, Jamie; Requirement for Restriction/Election for U.S. Appl. No. 15/663,905, filed Jul. 31, 2017, dated Mar. 21, 2019, 8 pgs.
Sollie, Greg; Non-Final Office Action for U.S. Appl. No. 15/845,545, filed Dec. 18, 2017, dated Mar. 5, 2019, 41 pgs.
Sollie, Greg; Non-Final Office Action for U.S. Appl. No. 15/845,540, filed Dec. 18, 2017, dated Apr. 2, 2019, 50 pgs.
Collison, Alan B.; Applicant Interview Summary for U.S. Appl. No. 15/677,738, filed Aug. 15, 2017, dated Dec. 5, 2018, 4 pgs.
Collison, Alan B.; Applicant Interview Summary for U.S. Appl. No. 15/677,738, filed Aug. 15, 2017, dated Apr. 22, 2019, 4 pgs.
Collison, Alan B.; Final Office ACtion for U.S. Appl. No. 15/677,738, filed Aug. 15, 2017, dated Feb. 28, 2019, 14 pgs.
Collison, Alan B.; Non-Final Office Action for U.S. Appl. No. 15/677,738, filed Aug. 15, 2017, dated Oct. 23, 2018, 11 pgs.
Collison, Alan B.; Requirement for Restriction/Election for U.S. Appl. No. 15/677,738, filed Aug. 15, 2017, dated Jul. 3, 2018, 8 pgs.
Collison, Alan B.; Requirement for Restriction/Election for U.S. Appl. No. 15/677,738, filed Aug. 15, 2017, dated Jul. 31, 2018, 8 pgs.
Cellulose Material Solutions, LLC; Brochure for Infinity Care Thermal Liner, accessed on Oct. 22, 2018, 2 pgs.
Uline; Article entitled: Corrugated Corner Protectors—4×4, accessed on Oct. 25, 2018, 1 pg.
DHL Express; Brochure for Dry Ice Shipping Guidelines, accessed on Oct. 26, 2018, 12 pgs.
Thomas Scientific; Article entitled: "Thermosafe: Test Tube Shipper/ Rack", accessed on Oct. 26, 2018, 2 pgs.
Stinson, Elizabeth; Article entitled: "A Pizza Geek Discovers the World's Smartest Pizza Box", published Jan. 17, 2014, 8 pgs.
Waltermire, Jamie; International Search Report and Written Opinion for PCT Application No. PCT/US18/65464, filed Dec. 13, 2018, dated Mar. 11, 2019, 9 pgs.
Sollie, Greg; International Search Report and Written Opinion for PCT Application No. PCT/US18/65461, filed Dec. 13, 2018, dated Mar. 21, 2019, 13 pgs.
Sollie, Greg; International Search Report and Written Opinion for PCT/US18/65463, filed Dec. 13, 2018, dated Mar. 25, 2019, 11 pgs.
American Bag Company; Article entitled: "Cool Green Bag, Small", located at <http://hotcoldbags.com/items/Cool%20Green%20Bag,%20Small>, accessed on Mar. 20, 2017, 2 pgs.
Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Duro Bag; Article entitled: "The Load and Fold Bag", accessed on May 24, 2017, copyrighted Apr. 2017, 3 pgs.
Greenblue; "Environmental Technical Briefs of Common Packaging Materials—Fiber-Based Materials", Sustainable Packaging Solution, 2009.
Images of Novolex bag, including an outer paper bag, a corrugated cardboard insert, and an inner foil-covered bubble-wrap bag, publicly available prior to May 9, 2017, 7 pgs.
MP Global Products, LLC; International Search Report and Written Opinion of the International Searching Authority for PCT/US2017/060403, filed Nov. 7, 2017, dated Feb. 19, 2018, 15 pgs.
MP Global Products; Article entitled: "Thermopod mailer envelopes and Thermokeeper insulated box liners", located at < http://www.mhpn.com/product/thermopod_mailer_envelopes_and_thermokeeper_insulated_box_liners/packaging>, accessed on Aug. 30, 2017, 2 pgs.
Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.
Periwrap; Article entitled: "Insulated Solutions", located at <https://www.peri-wrap.com/insulation/>, accessed on Dec. 3, 2018, 5 pgs.
Salazar Packaging; Article entitle: "Custom Packaging and Design", located at <https://salazarpackaging.com/custom-packaging-and-design/>, accessed on Sep. 28, 2017, 2 pgs.
Singh, et al; Article entitled: "Performance Comparison of Thermal Insulated Packaging Boxes, Bags and Refrigerants for Single-parcel Shipments", published Mar. 13, 2007, 19 pgs.
Tera-Pak; Article entitled: "Insulated Shipping Containers", located at <http://www.tera-pak.com/>, accessed on Mar. 20, 2017, 3 pgs.
Un Packaging; Article entitled: "CooLiner® Insulated Shipping Bags", available at <http://www.chem-tran.com/packaging/supplies/cooliner-insulated-shipping-bags.php>, accessed on Aug. 30, 2017, 2 pgs.
weiku.com; Article entitled: "100% Biodegradable Packing materials Green Cell Foam Stock Coolers", located at <http://www.

(56) References Cited

OTHER PUBLICATIONS weiku.com/products/18248504/100_Biodegradable_Packing_materials_Green_Cell_Foam_Stock_Coolers.html>, accessed on Sep. 28, 2017, 7 pgs.
Waltermire, Jamie; Notice of Allowance for U.S. Appl. No. 15/482,200, filed Apr. 7, 2017, dated May 14, 2019, 25 pgs.
Waltermire, Jamie; Final Office Action for U.S. Appl. No. 15/590,349, filed May 9, 2017, dated May 9, 2019, 31 pgs.
Waltermire, Jamie; Non-Final Office Action for U.S. Appl. No. 15/663,905, filed Jul. 31, 2017, dated Jun. 25, 2019, 66 pgs.
Sollie, Greg; Notice of Allowance for U.S. Appl. No. 15/845,545, filed Dec. 18, 2017, dated Jun. 19, 2019, 20 pgs.
Collison, Alan B.; Notice of Allowance for U.S. Appl. No. 15/677,738, filed Aug. 15, 2017, dated Jun. 19, 2019, 10 pgs.
Sollie, Greg; Non-Final Office Action for U.S. Appl. No. 15/988,550, filed May 24, 2018, dated May 29, 2019, 48 pgs.
Sollie, Greg; Non-Final Office Action for U.S. Appl. No. 16/280,595, filed Feb. 20, 2019, dated May 29, 2019, 60 pgs.
Sollie, Greg; International Search Report and Written Opinion for PCT Application No. PCT/US18/65459, filed Dec. 13, 2018, dated May 1, 2019, 15 pgs.
Voluntary Standard for Repulping and Recycling Corrugated Fiberboard Treated to Improve Its Performance in the Presence of Water and Water Vapor. (revises Aug. 16, 2013) Fibre Box Association (FBA), Elk Grove Village, IL, 1-23, Retrieved from http://www.corrugated.org/wp-content/uploads/PDFs/Recycling/Vol_Std_Protocol_2013.pdf, 23 pgs.
Waltermire, Jamie; Supplemental Notice of Allowance for U.S. Appl. No. 15/482,200, filed Apr. 7, 2017, dated Jul. 26, 2019, 9 pgs.
Waltermire, Jamie; Supplemental Notice of Allowance for U.S. Appl. No. 15/482,200, filed Apr. 7, 2017, dated Aug. 12, 2019, 7 pgs.
Sollie, Greg; Requirement for Restriction/Election for U.S. Appl. No. 16/382,710, filed Apr. 12, 2019, dated Jul. 15, 2019, 6 pgs.
Periwrap; Article entitled: "Insulated Solutions", located at <https://www.peri-wrap.com/insulation/>, accessed on Dec. 3, 2018, 9 pgs.
Collison, Alan B.; Corrected Notice of Allowance for U.S. Appl. No. 15/677,738, filed Aug. 15, 2017, dated Jul. 15, 2019, 7 pgs.
Waltermire, Jamie; Non-Final Office Action for U.S. Appl. No. 15/482,186, filed Apr. 7, 2017, dated Aug. 20, 2019, 81 pgs.
Waltermire, Jamie; Supplemental Notice of Allowance for U.S. Appl. No. 15/482,200, filed Apr. 7, 2017, dated Sep. 10, 2019, 8 pgs.
Waltermire, Jamie; Notice of Allowance for U.S. Appl. No. 15/590,345, filed May 9, 2017, dated Oct. 1, 2019, 28 pgs.
Waltermire, Jamie; Non-Final Office Action for U.S. Appl. No. 15/590,349, filed May 9, 2017, dated Sep. 5, 2019, 25 pgs.
Waltermire, Jamie; Final Office Action for U.S. Appl. No. 15/663,905, filed Jul. 31, 2017, dated Aug. 22, 2019, 23 pgs.
Sollie, Greg; Corrected Notice of Allowance for U.S. Appl. No. 15/845,545, filed Dec. 18, 2017, dated Oct. 1, 2019, 7 pgs.
"Green Cell Foam Shipping Coolers", located at <https://www.greencellfoam.com/shipping-coolers>, accessed on Oct. 18, 2019, 4 pgs.
CooLiner® Insulated Shipping Bags, available at <http://www/chem-tran.com/packaging/supplies/cooliner-insulated-shipping-bags.php>, accessed on Oct. 18, 2019, 4 pgs.
Sollie, Greg; Final Office Action for U.S. Appl. No. 15/988,550, filed May 24, 2018, dated Aug. 14, 2019, 19 pgs.
Sollie, Greg; Non-Final Office Action for U.S. Appl. No. 15/988,550, filed May 24, 2018, dated Oct. 9, 2019, 17 pgs.
Sollie, Greg; Final Office Action for U.S. Appl. No. 16/280,595, filed Feb. 20, 2019, dated Oct. 3, 2019, 19 pgs.
Sollie, Greg; Non-Final Office Action for U.S. Appl. No. 16/530,052, filed Aug. 2, 2019, dated Oct. 2, 2019, 12 pgs.
Sollie, Greg; Non-Final Office Action for U.S. Appl. No. 16/382,710, filed Apr. 12, 2019, dated Oct. 10, 2019, 49 pgs.
Sollie, Greg; Non-Final Office Action for U.S. Appl. No. 16/408,981, filed May 10, 2019, dated Aug. 20, 2019, 50 pgs.
Waltermire, Jamie; Corrected Notice of Allowance for U.S. Appl. No. 15/590,345, filed May 9, 2017, dated Feb. 18, 2020, 9 pgs.
Waltermire, Jamie; Supplemental Notice of Allowance for U.S. Appl. No. 15/590,345, filed May 9, 2017, dated Jan. 9, 2020, 8 pgs.
Waltermire, Jamie; Requirement for Restriction/Election for U.S. Appl. No. 16/526,555, filed Jul. 30, 2019, dated Jan. 17, 2020, 7 pgs.
Sollie, Greg; Non-Final Office Action for U.S. Appl. No. 15/845,540, filed Dec. 18, 2017, dated Feb. 19, 2020, 32 pgs.
Sollie, Greg; Applicant-Initiated Interview Summary for U.S. Appl. No. 16/530,052, filed Aug. 2, 2019, dated Feb. 5, 2020, 2 pgs.
Sollie, Greg; Requirement for Restriction/Election for U.S. Appl. No. 16/401,603, filed May 2, 2019, dated Feb. 18, 2020, 6 pgs.
Sollie, Greg; International Search Report and Written Opinion for PCT Application No. PCT/US19/60486, filed Nov. 18, 2019, dated Jan. 13, 2020, 10 pgs.
Sollie, Greg; Invitation to Pay Additional Fees for PCT/US19/59764, filed Nov. 5, 2019, dated Jan. 2, 2020, 2 pgs.
Waltermire, Jamie; Non-Final Office Action for U.S. Appl. No. 16/526,511, filed Jul. 30, 2019, dated Dec. 9, 2019, 55 pgs.
Waltermire, Jamie; Non-Final Office Action for U.S. Appl. No. 16/530,045, filed Aug. 2, 2019, dated Dec. 20, 2019, 61 pgs.
Waltermire, Jamie; Supplemental Notice of Allowance for U.S. Appl. No. 15/590,345, filed May 9, 2017, dated Dec. 3, 2019, 14 pgs.
Waltermire, Jamie; Applicant-Initiated Interview Summary for U.S. Appl. No. 15/590,349, filed May 9, 2017, dated Dec. 3, 2019, 3 pgs.
Waltermire, Jamie; Final Office Action for U.S. Appl. No. 15/590,349, filed May 9, 2017, dated Jan. 6, 2020, 26 pgs.
Waltermire, Jamie; Corrected Notice of Allowance for U.S. Appl. No. 15/663,905, filed Jul. 31, 2017, dated Nov. 18, 2019, 6 pgs.
Waltermire, Jamie; Corrected Notice of Allowance for U.S. Appl. No. 15/663,905, filed Jul. 31, 2017, dated Dec. 26, 2019, 7 pgs.
Waltermire, Jamie; Notice of Allowance for U.S. Appl. No. 15/663,905, filed Jul. 31, 2017, dated Nov. 4, 2019, 18 pgs.
Sollie, Greg; Corrected Notice of Allowance for U.S. Appl. No. 15/845,545, filed Dec. 18, 2017, dated Oct. 31, 2019, 12 pgs.
Sollie, Greg; Final Office Action for U.S. Appl. No. 15/845,540, filed Dec. 18, 2017, dated Oct. 30, 2019, 56 pgs.
Collison, Alan B.; Notice of Allowance for U.S. Appl. No. 15/677,738, filed Aug. 15, 2017, dated Oct. 29, 2019, 14 pgs.
Collison, Alan B.; Supplemental Notice of Allowance for U.S. Appl. No. 15/677,738, filed Aug. 15, 2017, dated Dec. 10, 2019, 4 pgs.
Sollie, Greg; Applicant Initiated Interview Summary for U.S. Appl. No. 15/988,550, filed May 24, 2018, dated Dec. 27, 2019, 3 pgs.
Sollie, Greg; Non-Final Office Action for U.S. Appl. No. 16/280,595, filed Feb. 20, 2019, dated Dec. 19, 2019, 23 pgs.
Sollie, Greg; Final Office Action for U.S. Appl. No. 16/530,052, filed Aug. 2, 2019, dated Dec. 27, 2019, 49 pgs.
Sollie, Greg; Non-Final Office Action for U.S. Appl. No. 16/567,192, filed Sep. 11, 2019, dated Dec. 10, 2019, 49 pgs.
Waltermire, Jamie; Notice of Allowance for U.S. Appl. No. 15/482,186, filed Apr. 7, 2017, dated Mar. 5, 2020, 29 pgs.
Waltermire, Jamie; Requirement for Restriction/Election for U.S. Appl. No. 16/293,716, filed Mar. 6, 2019, dated Feb. 26, 2020, 6 pgs.
Waltermire, Jamie; Requirement for Restriction/Election for U.S. Appl. No. 16/561,203, filed Sep. 5, 2019, dated Feb. 26, 2020, 5 pgs.
Sollie, Greg; Non-Final Office Action for U.S. Appl. No. 15/988,550, filed May 24, 2018, dated Mar. 11, 2020, 35 pgs.
Sollie, Greg; Final Office Action for U.S. Appl. No. 16/280,595, filed Feb. 20, 2019, dated Mar. 24, 2020, 20 pgs.
Sollie, Greg; Non-Final Office Action for U.S. Appl. No. 16/530,052, filed Aug. 2, 2019, dated Mar. 3, 2020, 24 pgs.
Sollie, Greg; Non-Final Office Action for U.S. Appl. No. 16/401,603, filed May 2, 2019, dated Mar. 10, 2020, 67 pgs.
Sollie, Greg; Final Office Action for U.S. Appl. No. 16/408,981, filed May 10, 2019, dated Feb. 24, 2020, 29 pgs.
Waltermire, Jamie; Corrected Notice of Allowance for U.S. Appl. No. 15/482,186, filed Apr. 7, 2017, dated Jun. 2, 2020, 10 pgs.
Waltermire, Jamie; Applicant-Initiated Interview Summary for U.S. Appl. No. 16/526,511, filed Jul. 30, 2019, dated Jun. 12, 2020, 5 pgs.
Waltermire, Jamie; Final Office Action for U.S. Appl. No. 16/526,511, filed Jul. 30, 2019, dated May 19, 2020, 39 pgs.

(56) References Cited

OTHER PUBLICATIONS

Waltermire, Jamie; Applicant-Initiated Interview Summary for U.S. Appl. No. 16/530,045, filed Aug. 2, 2019, dated Jun. 15, 2020, 3 pgs.
Waltermire, Jamie; Non-Final Office Action for U.S. Appl. No. 16/530,045, filed Aug. 2, 2019, dated May 27, 2020, 38 pgs.
Waltermire, Jamie; Non-Final Office Action for U.S. Appl. No. 15/590,349, filed May 9, 2017, dated Jun. 12, 2020, 30 pgs.
Waltermire, Jamie; Non-Final Office Action for U.S. Appl. No. 16/293,716, filed Mar. 6, 2019, dated May 5, 2020, 70 pgs.
Waltermire, Jamie; Non-Final Office Action for U.S. Appl. No. 16/526,555, filed Jul. 30, 2019, dated Apr. 2, 2020, 63 pgs.
Waltermire, Jamie; Non-Final Office Action for U.S. Appl. No. 16/561,203, filed Sep. 5, 2019, dated May 6, 2020, 59 pgs.
Sollie, Greg; Non-Final Office Action for U.S. Appl. No. 16/552,277, filed Aug. 27, 2019, dated Jun. 3, 2020, 68 pgs.
Sollie, Greg; Restriction Requirement for U.S. Appl. No. 16/552,277, filed Aug. 27, 2019, dated Apr. 20, 2020, 7 pgs.
Collison, Alan B.; Requirement for Restriction/Election for U.S. Appl. No. 16/414,309, filed May 16, 2019, dated Jun. 16, 2020, 5 pgs.
Sollie, Greg; Applicant-Initiated Interview Summary for U.S. Appl. No. 16/280,595, filed Feb. 20, 2019 dated May 6, 2020, 3 pgs.
Sollie, Greg; Applicant-Initiated Interview Summary for U.S. Appl. No. 16/401,603, filed May 2, 2019, dated May 15, 2020, 3 pgs.
Sollie, Greg; Final Office Action for U.S. Appl. No. 16/382,710, filed Apr. 12, 2019, dated Apr. 6, 2020, 33 pgs.
Sollie, Greg; Notice of Allowance for U.S. Appl. No. 16/382,710, filed Apr. 12, 2019, dated Jun. 3, 2020, 12 pgs.
Sollie, Greg; Final Office Action for U.S. Appl. No. 16/567,192, filed Sep. 11, 2019, dated Jun. 8, 2020, 20 pgs.
Waltermire, Jamie; Non-Final Office Action for U.S. Appl. No. 16/526,511, filed Jul. 30, 2019, dated Jul. 10, 2020, 23 pgs.
Collison, Alan B.; Applicant Interview Summary for U.S. Appl. No. 16/658,756, filed Oct. 21, 2019, dated May 6, 2020, 3 pgs.
Collison, Alan B.; Applicant Interview Summary for U.S. Appl. No. 16/658,756, filed Oct. 21, 2019, dated Jun. 29, 2020, 3 pgs.
Collison, Alan B.; Final Office Action for U.S. Appl. No. 16/658,756, filed Oct. 21, 2019, dated Jun. 17, 2020, 10 pgs.
Collison, Alan B.; Non-Final Office Action for U.S. Appl. No. 16/414,309, filed May 16, 2019, dated Jul. 17, 2020, 77 pgs.
Collison, Alan B.; Applicant-Initiated Interview Summary for U.S. Appl. No. 16/414,310, filed Jun. 16, 2019, dated Jul. 30, 2020, 3 pgs.
Collison, Alan B.; Non-Final Office Action for U.S. Appl. No. 16/414,310, filed May 16, 2019, dated Jul. 8, 2020, 84 pgs.
Sollie, Greg; Advisory Action for U.S. Appl. No. 16/280,595, filed Feb. 20, 2019, dated Jul. 6, 2020, 3 pgs.
Sollie, Greg; Final Office Action for U.S. Appl. No. 16/401,603, filed May 2, 2019, dated Jun. 30, 2020, 13 pgs.
Sollie, Greg; International Preliminary Report on Patentability for PCT Application No. PCT/US18/65459, filed Dec. 13, 2018, dated Jul. 2, 2020, 11 pgs.
Sollie, Greg; International Preliminary Report on Patentability for PCT Application No. PCT/US18/65461, filed Dec. 13, 2018, dated Jul. 2, 2020, 12 pgs.
Sollie, Greg; International Search Report and Written Opinion for PCT Application No. PCT/US20/24820, filed Mar. 26, 2020, dated Jul. 2, 2020, 14 pgs.
Sollie, Greg; International Search Report and Written Opinion for PCT Application No. PCT/US19/59764, filed Nov. 5, 2019, dated Jul. 1, 2020, 13 pgs.
Waltermire, Jamie; Corrected Notice of Allowance for U.S. Appl. No. 15/482,186, filed Apr. 7, 2017, dated Sep. 2, 2020, 12 pgs.
Waltermire, Jamie; Notice of Allowance for U.S. Appl. No. 16/526,511, filed Jul. 30, 2019, dated Sep. 14, 2020, 18 pgs.
Waltermire, Jamie; Final Office Action for U.S. Appl. No. 16/293,716, filed Mar. 6, 2019, dated Sep. 10, 2020, 24 pgs.
Waltermire, Jamie; Final Office Action for U.S. Appl. No 16/561,203, filed Sep. 5, 2019, dated Sep. 10, 2020, 25 pgs.
Sollie, Greg; Non-Final Office Action for U.S. Appl. No. 16/408,981, filed May 10, 2019, dated Sep. 16, 2020, 40 pgs.
Sollie, Greg; Final Office Action for U.S. Appl. No. 16/552,277, filed Aug. 27, 2019, dated Aug. 7, 2020, 19 pgs.
Sollie, Greg; Notice of Allowance for U.S. Appl. No. 16/552,277, filed Aug. 27, 2019, dated Aug. 31, 2020, 6 pgs.
Sollie, Greg; Notice of Allowance for U.S. Appl. No. 15/845,540, filed Dec. 18, 2017, dated Sep. 17, 2020, 5 pgs.
Collison, Alan B.; Applicant-Initiated Interview Summary for U.S. Appl. No. 16/414,309, filed Jun. 16, 2019, dated Aug. 21, 2020, 3 pgs.
Collison, Alan B.; Final Office Action for U.S. Appl. No. 16/414,309, filed May 16, 2019, dated Oct. 8, 2020, 15 pgs.
Sollie, Greg; Final Office Action for U.S. Appl. No. 15/988,550, filed May 24, 2018, dated Aug. 27, 2020, 27 pgs.
Sollie, Greg; Non-Final Office Action for U.S. Appl. No. 16/280,595, filed Feb. 20, 2019, dated Aug. 28, 2020, 26 pgs.
Sollie, Greg; Final Office Action for U.S. Appl. No. 16/530,052, filed Aug. 2, 2019, dated Aug. 28, 2020, 29 pgs.
Sollie, Greg; Notice of Allowance for U.S. Appl. No. 16/401,603, filed May 2, 2019, dated Aug. 31, 2020, 14 pgs.
Sollie, Greg; Non-Final Office Action for U.S. Appl. No. 16/401,607, filed May 2, 2019, dated Aug. 19, 2020, 88 pgs.
Sollie, Greg; Corrected Notice of Allowance for U.S. Appl. No. 16/382,710, filed Apr. 12, 2019, dated Sep. 24, 2020, 9 pgs.
Sollie, Greg; Notice of Allowance for U.S. Appl. No. 16/567,192, filed Sep. 11, 2019, dated Aug. 7, 2020, 14 pgs.
Sollie, Greg; Final Office Action for U.S. Appl. No. 15/845,540, filed Dec. 18, 2017, dated Sep. 2, 2020, 28 pgs.
MP Global Products LLC: European Search Report Response for serial No. 17868605.1, dated Oct. 2, 2020, 15 pgs.
Waltermire, Jamie; Corrected Notice of Allowance for U.S. Appl. No. 15/590,349, filed May 9, 2017, dated Feb. 5, 2021, 9 pgs.
Waltermire, Jamie; Non-Final Office Action for U.S Appl. No. 16/293,716, filed Mar. 6, 2019, dated Feb. 5, 2021, 18 pgs.
Waltermire, Jamie; Corrected Notice of Allowance for US. Appl. No. 16/561,203, filed Sep, 5, 2019, dated Feb. 5, 2021, 8 pgs.
Sollie, Greg; Corrected Notice of Allowance for U.S. Patent Application No. 16/552,277, filed Aug. 27, 2019, dated Feb. 9, 2021, 9 pgs.
Sollie, Greg; Corrected Notice of Allowance for U.S. Appl. No. 15/845,540, filed Dec. 18, 2017, dated Feb. 12, 2021, 8 pgs.
Collison, Alan B.; Corrected Notice of Allowance for U.S. Appl. No. 16/658,756, filed Oct. 21, 2019, dated Jan. 28, 2021, 3 pgs.
MP Global Products LLC: Office Action for European application No. 17868605.1, dated Dec. 3, 2020, 4 pgs.
MP Global Products, LLC; Examination Report for Australian patent application No. 2017359035, dated Nov. 27, 2020 3 pgs.
MP Global Products, LLC; Office Action for Chinese patent application No. 201780081689.7, dated Nov. 2, 2020, 17 pgs.
Collison, Alan B.; Non-Final Office Action for U.S. Appl. No. 17/123,676, filed Dec. 16, 2020, dated Feb. 3, 2021, 23 pgs.
Sollie, Greg; Certificate of Correction for U.S. Appl. No. 16/567,192, filed Sep. 11, 2019 dated Feb. 16, 2021, 1 pg.
MP Global Products LLC: European Office Action for application No. 17868605.1, dated Dec. 3, 2020, 4 pgs.
MP Global Products LLC: European Office Action Response for application No. 17868605.1, dated Jan. 19, 2021, 15 pgs.
Waltermire, Jamie; Certificate of Correction for U.S. Appl. No. 15/482,186, filed Apr. 7, 2017, dated Dec. 29, 2020, 1 pg.
Waltermire, Jamie; Corrected Notice of Allowance for U.S. Appl No. 16/526,511, filed Jul. 30, 2019, dated Oct. 30, 2020, 14 pgs.
Waltermire, Jamie; Corrected Notice of Allowance for U.S. Appl. No. 16/526,511, filed Jul. 30, 2019, dated Nov. 30, 2020, 9 pgs.
Waltermire, Jamie; Final Office Action for U.S. Appl. No. 16/530,045, filed Aug. 2, 2019, dated Nov. 24, 2020, 40 pgs.
Waltermire, Jamie; Non-Final Office Action for U.S. Appl. No. 16/164,933, filed Oct. 19, 2018, dated Nov. 18, 2020, 104 pgs.
Waltermire, Jamie; Corrected Notice of Allowance for U.S. Appl. No. 15/590,349, filed May 9, 2017, dated Nov. 2, 2020, 9 pgs.
Waltermire, Jamie; Corrected Notice of Allowance for U.S. Appl. No. 15/590,349, filed May 9, 2017, dated Dec. 22, 2020, 9 pgs.

(56) References Cited

OTHER PUBLICATIONS

Waltermire, Jamie; Notice of Allowance for U.S. Appl. No. 15/590,349, filed May 9, 2017, dated Oct. 20, 2020, 20 pgs.
Waltermire, Jamie; Final Office Action for U.S. Appl. No. 16/293,716, filed Mar. 6, 2019, dated Oct. 29, 2020, 19 pgs.
Waltermire, Jamie; Non-Final Office Action for U.S. Appl. No. 16/526,555, filed Jul. 30, 2019, dated Oct. 27, 2020, 39 pgs.
Waltermire, Jamie; Corrected Notice of Allowance for U.S. Appl. No. 16/561,203, filed Sep. 5, 2019, dated Jan. 5, 2021, 9 pgs.
Waltermire, Jamie; Notice of Allowance for U.S. Appl. No. 16/561,203, filed Sep. 5, 2019, dated Nov. 3, 2020, 14 pgs.
Waltermire, Jamie; Non-Final Office Action for U.S. Appl. No. 16/689,407, filed Nov. 20, 2019, dated Jan. 8, 2021, 92 pgs.
Waltermire, Jamie; Requirement for Restriction/Election for U.S. Appl. No. 16/689,407, filed Nov. 20, 2019, dated Oct. 29, 2020, 6 pgs.
Waltermire, Jamie; Requirement for Restriction/Election for U.S. Appl. No. 16/689,433, filed Nov. 20, 2019, dated Oct. 16, 2020, 6 pgs.
Sollie, Greg; Corrected Notice of Allowance for U.S. Appl. No. 16/552,277, filed Aug. 27, 2019, dated Nov. 5, 2020, 9 pgs.
Sollie, Greg; Corrected Notice of Allowance for U.S. Appl. No. 16/552,277, filed Aug. 27, 2019, dated Dec. 22, 2020, 7 pgs.
Solie, Greg; Corrected Notice of Allowance for U.S. Appl. No. 15/845,540, filed Dec. 18, 2017, dated Dec. 21, 2020, 9 pgs.
Collison, Alan B.; Advisory Action for U.S. Appl. No. 16/658,756, filed Oct. 21, 2019, dated Sep. 25, 2020, 4 pgs.
Collison, Alan B.; Notice of Allowance for U.S. Appl. No. 16/658,756, filed Oct. 21, 2019, dated Oct. 23, 2020, 10 pgs.
Collison, Alan B.; Applicant-Initiated Interview Summary for U.S. Appl. No. 16/414,309, filed Jun. 16, 2019, dated Oct. 15, 2020, 3 pgs.
Collison, Alan B.; Corrected Notice of Allowance for U.S. Appl. No. 16/414,309, filed May 16, 2019, dated Nov. 16, 2020, 10 pgs.
Collison, Alan B.; Corrected Notice of Allowance for U.S. Appl. No. 16/414,309, filed May 16, 2019, dated Nov. 27, 2020, 9 pgs.
Collison, Alan B.; Notice of Allowance for U.S. Appl. No. 16/414,309, filed May 16, 2019, dated Oct. 21, 2020, 6 pgs.
Collison, Alan B.; Notice of Allowance for U.S. Appl. No. 16/414,310, filed May 16, 2019, dated Nov. 13, 2020, 15 pgs.
Collison, Alan B.; Supplemental Notice of Allowance for U.S. Appl. No. 16/414,310, filed May 16, 2019, dated Dec. 3, 2020, 8 pgs.
Collison, Alan; Final Office Action for U.S. Appl. No. 16/414,310, filed May 16, 2019, dated Oct. 13, 2020, 30 pgs.
Sollie, Greg; Applicant-Initiated Interview Summary for U.S. Appl. No. 15/988,550, filed May 24, 2018, dated Dec. 24, 2020, 2 pgs.
Sollie, Greg; Final Office Action for U.S. Appl. No. 16/280,595, filed Feb. 20, 2019, dated Dec. 30, 2020, 25 pgs.
Sollie, Greg; Non-Final Office Action for U.S. Appl. No. 16/530,052, filed Aug. 2, 2019, dated Dec. 18, 2020, 17 pgs.
Sollie, Greg; Corrected Notice of Allowance for U.S. Appl. No. 16/401,603, filed May 2, 2019, dated Nov. 24, 2020, 8 pgs.
Sollie, Greg; Corrected Notice of Allowance for U.S. Appl. No. 16/401,603, filed May 2, 2019, dated Nov. 3, 2020, 9 pgs.
Sollie, Greg; Corrected Notice of Allowance for U.S. Appl. No. 16/401,607, filed May 2, 2019, dated Jan. 4, 2021, 9 pgs.
Sollie, Greg; Notice of Allowance for U.S. Appl. No. 16/401,607, filed May 2, 2019, dated Dec. 4, 2020, 12 pgs.
Sollie, Greg; Notice of Allowance for U.S. Appl. No. 16/382,710, filed Apr. 12, 2019, dated Oct. 21, 2020, 5 pgs.
Sollie, Greg; Corrected Notice of Allowance for U.S. Appl. No. 16/567,192, filed Sep. 11, 2019, dated Oct. 20, 2020, 8 pgs.
Sollie, Greg; Final Office Action for U.S. Appl. No. 16/408,981, filed May 10, 2019, dated Dec. 29, 2020, 22 pgs.
Sollie, Greg; Requirement for Restriction/Election for U.S. Appl. No. 16/886,040, filed May 28, 2020, dated Dec. 23, 2020, 6 pgs.
MP Global Products, LLC; First Examination Report for Australian patent application No. 2017359035, filed Nov. 7, 2017, dated Nov. 27, 2020, 3 pgs.
Sollie, Greg; International Preliminary Report on Patentability for PCT/US18/65463, filed Dec. 13, 2018, dated Dec. 3, 2020, 9 pgs.
Waltermire, Jamie; Notice of Allowance for U.S. Appl. No 16/164,933, filed Oct. 19, 2018, dated Jun. 14, 2021, 24 pgs.
Waltermire, Jamie; Final Office Action for U.S. Appl. No. 16/526,555, filed Jul. 30, 2019, dated Mar. 8, 2021, 25 pgs.
Waltermire, Jamie; Final Office Action for U.S. Appl. No. 16/689,407, filed Nov. 20, 2019, dated Apr. 23, 2021, 18 pgs.
Waltermire, Jamie; Non-Final Office Action for U.S. Appl. No. 16/689,433, filed Nov. 20, 2019, dated Feb. 23, 2021, 88 pgs.
Collison, Alan B.; Certificate of Correction for U.S. Appl. No. 16/414,309, filed May 16, 2019, dated Mar. 9, 2021, 1 pg.
Collison, Alan B.; Non-Final Office Action for U.S. Appl. No. 17/123,673, filed Dec. 16, 2020, dated Mar. 23, 2021, 86 pgs.
Collison, Alan B.; Applicant-Initiated Interview Summary for U.S. Appl. No. 17/123,676, filed Dec. 16, 2020, dated May 4, 2021, 4 pgs.
Collison, Alan B.; Notice of Allowance for U.S. Appl. No. 17/123,676, filed Dec. 16, 2020, dated Jun. 13, 2021, 93 pgs.
Sollie, Greg; Corrected Notice of Allowance for U.S. Appl. No. 15/988,550, filed May 24, 2018, dated Jun. 10, 2021, 9 pgs.
Sollie, Greg; Notice of Allowance for U.S. Appl. No. 15/988,550, filed May 24, 2018, dated Apr. 13, 2021, 21 pgs.
Sollie, Greg; Non-Final Office Action for U.S. Appl. No. 16/280,595, filed Feb. 20, 2019, dated Apr. 9, 2021, 20 pgs.
Sollie, Greg; Final Office Action for U.S. Appl. No. 16/530,052, filed Aug. 2, 2019, dated Apr. 20, 2021, 27 pgs.
Sollie, Greg; Corrected Notice of Allowance for U.S. Appl. No. 16/401,607, filed May 2, 2019, dated Mar. 15, 2021, 13 pgs.
Sollie, Greg; Corrected Notice of Allowance for U.S. Appl. No. 16/401,607, filed May 2, 2019, dated Apr. 29, 2021, 8 pgs.
Sollie, Greg; Requirement for Restriction/Election for U.S. Appl. No. 16/879,811, filed May 21, 2020, dated Apr. 15, 2021, 6 pgs.
Sollie, Greg; Corrected Notice of Allowance for U.S. Appl. No. 16/408,981, filed May 10, 2019, dated Mar. 15, 2021, 9 pgs.
Sollie, Greg; Corrected Notice of Allowance for U.S. Appl. No. 16/408,981, filed May 10, 2019, dated Apr. 29, 2021, 6 pgs.
Sollie, Greg; Notice of Allowance for U.S. Appl. No. 16/408,981, filed May 10, 2019, dated Feb. 23, 2021, 6 pgs.
Sollie, Greg; Non-Final Office Action for U.S. Appl. No. 16/886,040, filed May 28, 2020, dated Mar. 30, 2021, 89 pgs.
MP Global Products LLC: European Office Action for application No. 17868605.1, dated Apr. 13, 2021, 3 pgs.
Collison, Alan. B.; Extended European Search Report for application No. 21160713.0, filed Nov. 7, 2017, dated Jun. 10, 2021, 7 pgs.
Waltermire, Jamie; Supplemental Notice of Allowance for U.S. Appl. No. 16/164,933, filed Oct. 19, 2018, dated May 26, 2021, 10 pgs.
Waltermire, Jamie; Supplemental Notice of Allowance for U.S. Appl. No. 16/164,933, filed Oct. 19, 2018, dated Jun. 16, 2021, 7 pgs.
Waltermire, Jamie; Certificate of Correction for U.S. Appl. No. 15/590,349, filed May 9, 2017, dated Jun. 1, 2021, 1 pg.
Waltermire, Jamie; Notice of Allowance for U.S. Appl. No 16/526,555, filed Jul. 30, 2019, dated Jun. 21, 2021, 32 pgs.
Waltermire, Jamie; Supplemental Notice of Allowance for U.S. Appl. No. 16/526,555, filed Jul. 30, 2019, dated Jun. 8, 2021, 13 pgs.
Sollie, Greg; Certificate of Correction for U.S. Appl. No. 15/845,540, filed Dec. 18, 2017, dated Jun. 1, 2021, 1 pg.
Collison, Alan B.; Supplemental Notice of Allowance for U.S. Appl. No. 17/123,676, filed Dec. 16, 2020, dated Jun. 1, 2021, 10 pgs.
Sollie, Greg; Corrected Notice of Allowance for U.S. Appl. No. 15/988,550, filed May 24, 2018, dated Jun. 11, 2021, 7 pgs.
Sollie, Greg; Corrected Notice of Allowance for U.S. Appl. No. 16/408,981, filed May 10, 2019, dated Jun. 16, 2021, 9 pgs.
Sollie, Greg; International Preliminary Report on Patentability for PCT Application No. PCT/US19/60486, filed Nov. 18, 2019, dated May 27, 2021, 9 pgs.
Sollie, Greg; International Preliminary Report on Patentability for PCT Application No. PCT/US19/59764, filed Nov. 5, 2019, dated May 27, 2021, 9 pgs.

(56) References Cited

OTHER PUBLICATIONS

Waltermire, Jamie; Non-Final Office Action for U.S. Appl. No. 16/293,716, filed Mar. 6, 2019, dated Jul. 26, 2021, 26 pgs.
Waltermire, Jamie; Supplemental Notice of Allowance for U.S. Appl. No. 16/526,555, filed Jul. 30, 2019, dated Jul. 6, 2021, 7 pgs.
Waltermire, Jamie; Notice of Allowance for U.S. Appl. No. 16/689,407, filed Nov. 20, 2019, dated Jul. 19, 2021, 12 pgs.
Collison, Alan B.; Applicant-Initiated Interview Summary for U.S. Appl. No. 17/123,673, filed Dec. 16, 2020, dated Jun. 24, 2021, 2 pgs.
Collison, Alan B.; Notice of Allowance for U.S. Appl. No. 17/123,673, filed Dec. 16, 2020, dated Jul. 1, 2021, 12 pgs.
Collison, Alan B.; Supplemental Notice of Allowance for U.S. Appl. No. 17/123,676, filed Dec. 16, 2020, dated Jun. 24, 2021, 7 pgs.
Sollie, Greg; Advisory Action for U.S. Appl. No. 16,530,052, filed, Aug. 2, 2019, dated Jun. 29, 2021, 15 pgs.
Sollie, Greg; Non-Final Office Action for U.S. Appl. No. 16/879,811, filed May 21, 2020, dated Jun. 22, 2021, 93 pgs.
Sollie, Greg; Notice of Allowance for U.S. Appl. No. 16/879,811, filed May 21, 2020, dated Jul. 7, 2021, 5 pgs.
Sollie, Greg; Notice of Allowance for U.S. Appl. No. 16/886,040, filed May 28, 2020, dated Jul. 7, 2021, 12 pgs.
Waltermire, Jamie; International Preliminary Report on Patentability for PCT Application No. PCT/US18/65464, filed Dec. 13, 2018, dated Jun. 24, 2021, 8 pgs.

* cited by examiner

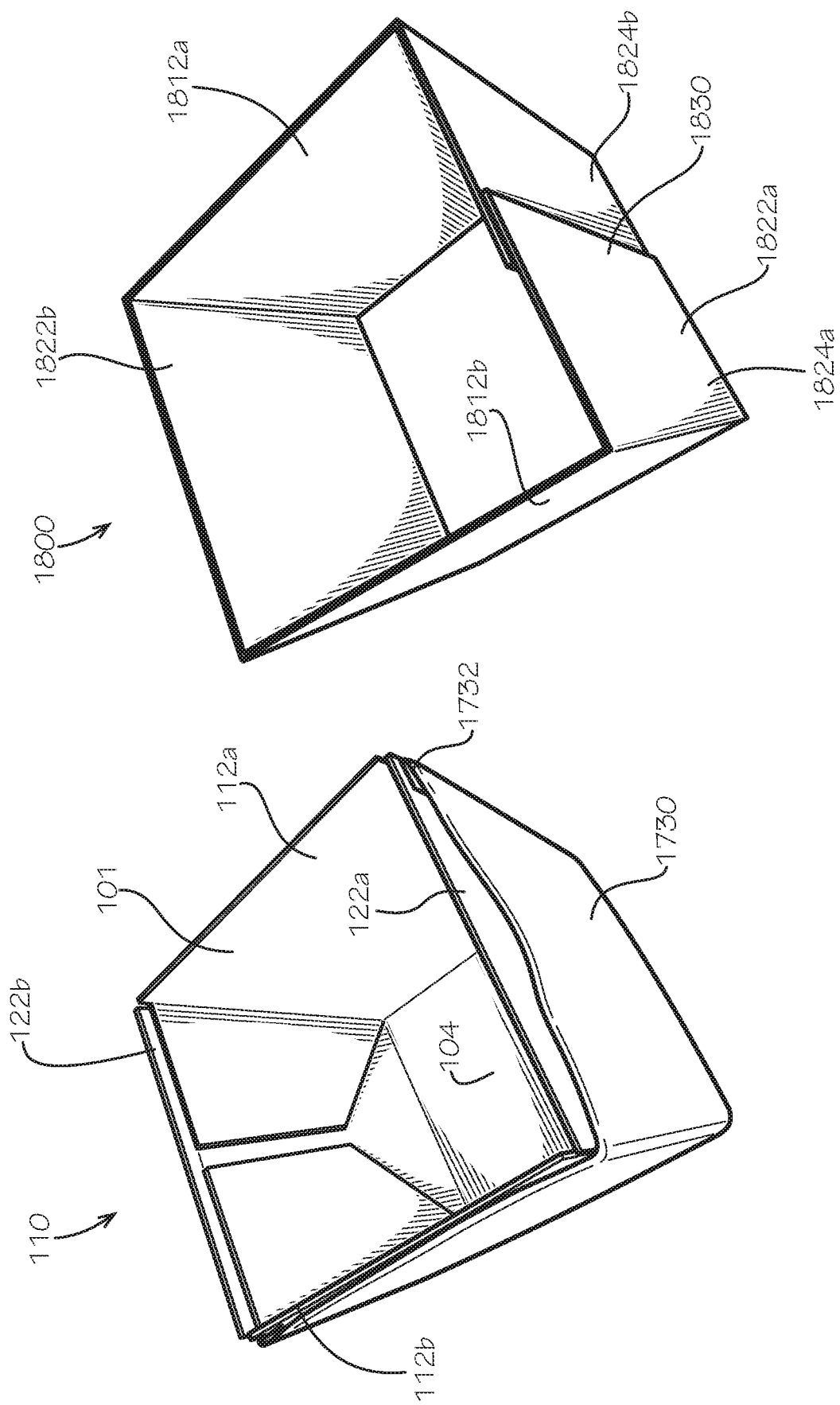

MODULAR BOX ASSEMBLY

REFERENCE TO RELATED APPLICATION

This application is a continuation of U.S. application Ser. No. 15/663,905, filed Jul. 31, 2017, which is hereby specifically incorporated by reference herein in its entirety.

JOINT RESEARCH AGREEMENT

The subject matter disclosed was developed and the claimed invention was made by, or on behalf of, one or more parties to a joint research agreement between MP Global Products LLC of Norfolk, Nebr. and Pratt Retail Specialties, LLC of Conyers, Ga., that was in effect on or before the effective filing date of the claimed invention, and the claimed invention was made as a result of activities undertaken within the scope of the joint research agreement.

TECHNICAL FIELD

This disclosure relates to packaging. More specifically, this disclosure relates to a modular box assembly.

BACKGROUND

Packaging and shipping temperature sensitive contents can pose challenges. The contents can spoil, destabilize, freeze, melt, or evaporate during storage or shipping if the temperature of the contents is not maintained or the packaging is not protected from hot or cold environmental conditions. In applications such as hot food delivery, customers can be dissatisfied if the contents have cooled to ambient temperature upon delivery. Contents such as food, pharmaceuticals, electronics, or other temperature sensitive items can be damaged if exposed to temperature extremes. Many insulated packages are bulky and difficult to store prior to use. Additionally, many insulated packages are specialized to ship or carry hot goods, chilled goods, or frozen goods, and shippers must maintain large stocks of specialized packaging for each application. Additionally, many insulated packages cannot be recycled and are often disposed of in landfills.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a box assembly comprising a box defining a box cavity within the box; and at least one insulated panel disposed within the box cavity, the at least one insulated panel comprising at least one board and at least one insulation batt, the at least one board laminated to the at least one insulation batt, the at least one insulated panel configured to at least partially insulate the box cavity.

Also disclosed is a box assembly comprising a box defining a box cavity within the box; a first liner disposed within the box cavity, the first liner folded into a C-shape; and a second liner disposed within the box cavity, the second liner folded into the C-shape, the second liner fitting together with the first liner to define an inner insulated cavity between the first liner and the second liner.

Also disclosed is a box assembly comprising a box, the box comprising a bottom panel and a plurality of side walls; at least one insulation batt covering at least one side wall of the plurality of side walls; and a liner, the at least one insulation batt positioned between the liner and the at least one side wall of the plurality of side walls.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

FIG. 17 is a perspective view of another aspect of the insulated box in accordance with another aspect of the present disclosure.

FIG. 18 is a perspective view of an outer sleeve of the modular box assembly in accordance with another aspect of the present disclosure.

DETAILED DESCRIPTION

Figure 1:
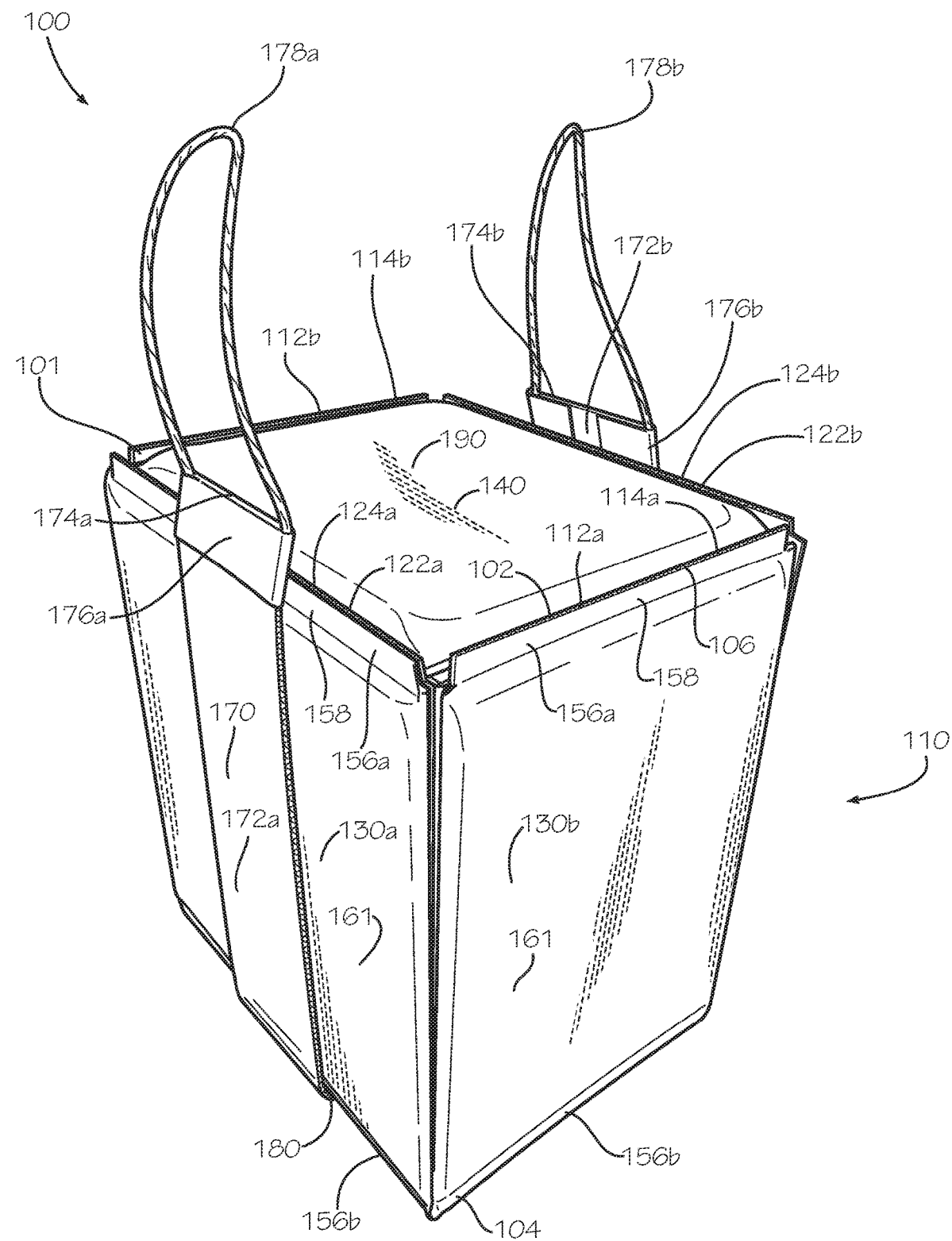
FIG. 1 is a perspective view of a modular box assembly comprising an insulated box, a box top, and a carrying accessory in accordance with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is an modular box assembly and associated methods, systems, devices, and various apparatus. The modular box assembly comprises a box, a box top, and a carrying accessory. It would be understood by one of skill in the art that the disclosed modular box assembly is described in but a few exemplary embodiments among many. No particular terminology or description should be considered limiting on the disclosure or the scope of any claims issuing therefrom.

FIG. 1 is a perspective view of a modular box assembly 100 in a closed position in accordance with one aspect of the present disclosure. The modular box assembly 100 can comprise a box 101 and a variety of accessories configured to adapt the box 101 for different applications, such as shipping hot goods, chilled goods, frozen goods, or goods at ambient temperature. FIGS. 1-23 depict these accessories as well as several different exemplary configurations for the box 101.

In the present aspect, the modular box assembly 100 can comprise the box 101, a carrying accessory 170, and a box top 190. The box 101 can be configured as one aspect of an insulated box 110 comprising a plurality of insulated panels 130a-d (insulated panels 130c,d shown in FIG. 3). The box 101 can comprise a rigid board material such as corrugated cardboard; however in other aspects, the box 101 can comprise other suitable rigid board materials, such as wood, plastic, metal, or any other material. The insulated box 110 can be configured to transport hot, chilled, or frozen goods, and the insulated panels 130a-d can maintain a desired temperature within the insulated box 110. In other aspects, the box 101 can be configured as an uninsulated box, such as when goods are transported at ambient temperature.

The box 101 can comprise a first pair of opposing side panels 112a,b and a second pair of opposing side panels 122a,b. The side panels 112a,b,122a,b can each be a rigid panel. The side panel 112a can be substantially parallel to the side panel 112b, and the side panel 122a can be substantially parallel to the side panel 122b. Each side panel 112a,b can be substantially perpendicular to both side panels 122a,b. The box 101 can define a rectangular or square cross-sectional shape; however, in other aspects, the box 101 can define a different cross-sectional shape such as a circular, triangular, pentagonal, or hexagonal, shape or any other desired shape.

The box 101 can define a top end 102 and a bottom end 104, and the top end 102 can be disposed opposite from the bottom end 104. The side panels 112a,b can define lips 114a,b, respectively, disposed proximate to the top end 102 of the insulated box 110. The side panels 122a,b can define lips 124a,b, respectively, disposed proximate to the top end 102 of the insulated box 110. The box 101 can define a box opening 106 at the top end 102. The box top 190 can be sized and shaped to fit between the lips 114a,b and the lips 124a,b to cover the box opening 106 when the box 101 is in the closed position. The box top 190 can comprise an insulated panel 140 which can be substantially identical in construction to the insulated panels 130a-d; however in other aspects, the insulated panel 140 can differ in construction from the insulated panels 130a-d.

The insulated panels 130a-d can be attached to the side panels 112a,b,122a,b. The insulated panels 130a,c (130c shown in FIG. 3) can be respectively attached to the side panels 112a,b, and the insulated panels 130b,d (130d shown in FIG. 3) can be respectively attached to the side panels 122a,b. Each insulated panel 130a-d can define a border 158 extending around the respective insulated panel 130a-d. An area encircled by the border 158 can define an insulated portion 161 of the respective insulated panel 130.

The border 158 of each insulated panel 130a-d can define a top seam 156a and a bottom seam 156b extending outwards from the insulated portion 161 of the respective insulated panel 130a-d. The top seam 156a can be attached to the adjacent side panel 112a,b,122a,b of the box 101 proximate the top end 102 of the box 101. In the present aspect, the top seam 156a of each insulated panel 130a-d can attach to the lip 114a,b,124a,b of the adjacent side panel 112a,b,122a,b. The bottom seam 156b of each insulated panel 130a-d can be attached to the adjacent side panel 112a,b,122a,b along the bottom end 104 of the box 101. The seams 156a,b can be attached by an adhesive such as a glue, cement, epoxy, mastic, double-sided tape, cohesive, or any other suitable material, and the seams 156a,b can secure the insulated panels 130a-d to the respective adjacent side panels 112a,b,122a,b.

The carrying accessory 170 can extend beneath the box 101 to facilitate hand carrying of the box 101. The carrying accessory 170 can define a U-shape. A middle portion 180 can extend beneath the box 101. A first side portion 172a can extend upwards from the middle portion 180 and can be adjacent to the insulated panel 130a. A second side portion 172b can extend upwards from the middle portion 180 and can be adjacent to the insulated panel 130c (shown in FIG. 3).

In the present aspect, the carrying accessory 170 can be attached to the box 101 or the insulated panels 130a,c such as with an adhesive, such as a glue, cement, epoxy, mastic, double-sided tape, cohesive, or any other suitable material. In other aspects, the carrying accessory 170 can be mechanically attached, such as with a hook-and-loop fastener, stitching, or staples, and the mechanical attachment of the carrying accessory 170 can be configured to be selectively attached and detached from the box 101 such as with hook-and-loop fasteners. In other aspects, the carrying accessory 170 may not be attached to the box 101. In some aspects, the side portions 172a,b can extend upwards adjacent to the insulated panels 130b,d. In some aspects, the carrying accessory 170 can have four side portions (not shown), and one side portion can be positioned adjacent to each of the four insulated panels 130a-d.

The side portions 172a,b can respectively define handles 178a,b. In the present aspect, handle 178a can be attached to an end 174a of the first side portion 172a by a base strip 176a. Handle 178b can be attached to an end 174b of the second side portion 172b by a base strip 176b. The handles 178a,b can comprise twisted paper rope, and the handles 178a,b can be laminated between two layers of the respective base strip 176a,b. In other aspects, the handles 178a,b can be integrally formed with the base strips 176a,b, and the handles 178a,b and the base strips 176a,b can comprise a common material. For example, the base strips 176a,b and the handles 178a,b can comprise a heavy kraft paper, plastic, posterboard, cardboard, or other suitable material. In other aspects, the handles 178a,b can comprise a fiber such as cotton, hemp, jute, or bamboo fiber.

The base strips 176a,b can be attached to the respective ends 174a,b with an adhesive such as a glue, cement, epoxy, mastic, double-sided tape, cohesive, or any other suitable material. The ends 174a,b and the handles 178a,b can extend upwards above the box opening 106. In other aspects, the handles 178a,b and the ends 174a,b may not extend above the box opening 106, and the handles 178a,b can be positioned adjacent to the insulated panels 130b,d. In other aspects, the handles 178a,b can have a different shape and can be attached directly to the respective side portions 172a,b. In some aspects, the handles 178a,b can be formed integrally with the respective side portions 172a,b, for example, by cutting a hand hole through the respective side portion 172a,b.

Figure 2:
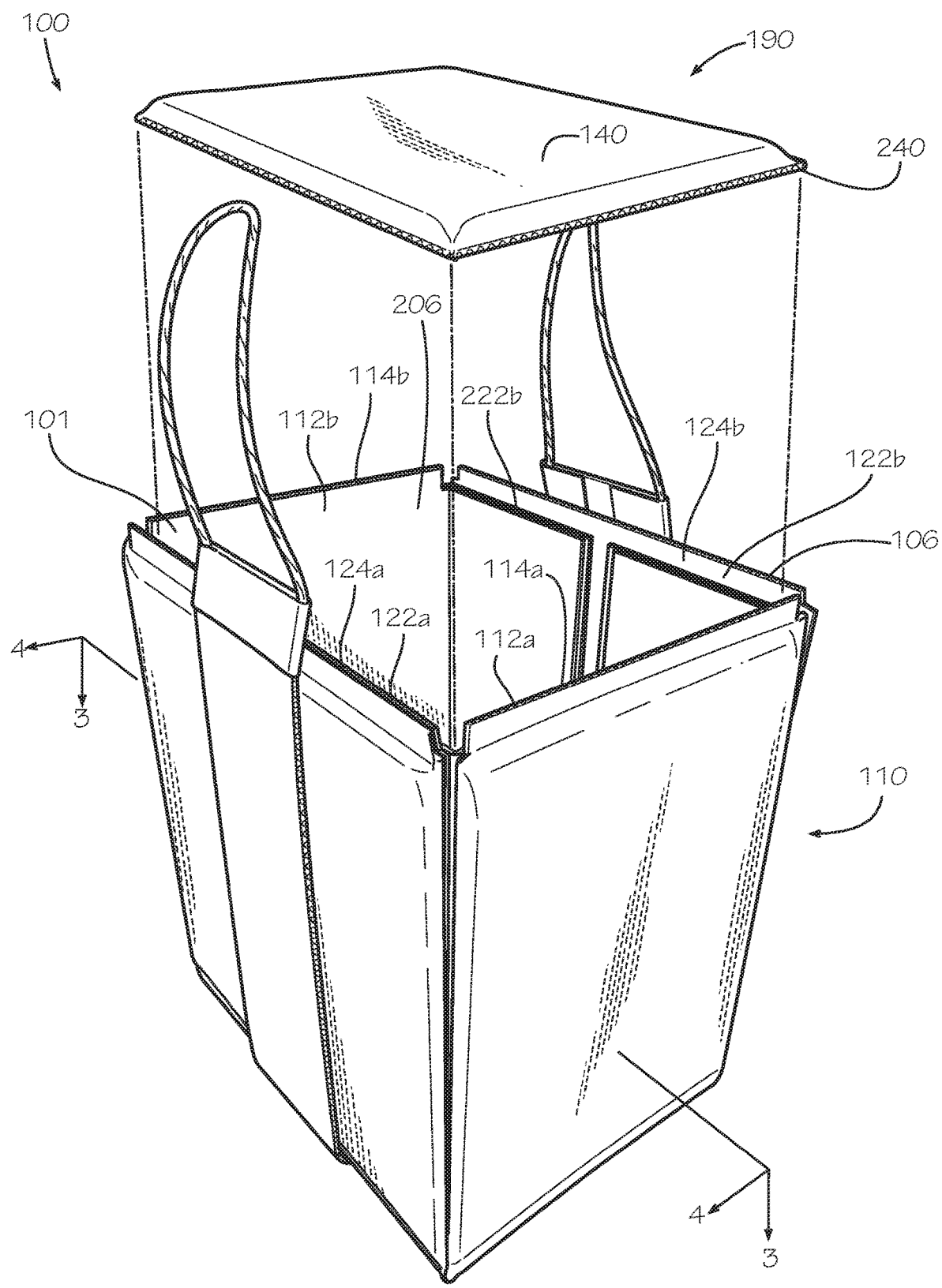
FIG. 2 is a perspective view of the modular box assembly of FIG. 1 with the insulated box of FIG. 1 in an open position.

FIG. 2 is a perspective view of the modular box assembly 100 of FIG. 1 with the box top 190 in an open position. In the open position, the box top 190 can be removed from the box opening 106, thereby exposing a box cavity 206 defined within the box 101. The first pair of opposing side panels 112a,b and the second pair of opposing side panels 122a,b of the box 101 can define the box cavity 206. A pair of shoulders 222a,b can extend inwards into the box cavity 206 from each of the side panels 122a,b, as represented by the shoulder 222b (shoulder 222a shown in FIG. 3). The shoulders 222a,b are configured to support the box top 190 when the box top 190 is positioned between the lips 114a,b,124a,b in the closed position. In the closed position, the box top 190 can cover the box opening 106 and enclose the box cavity 206.

In the present, aspect, the box top 190 can comprise the insulated panel 140 and a top panel 240. The top panel 240 can be a rigid panel. The insulated panel 140 can be attached to the top panel 240 and positioned atop the top panel 240 as shown. In other aspects, the box top 190 can be flipped, and the insulated panel 140 can be positioned beneath the top panel 240. In other aspects, the box top 190 can comprise a second insulated panel (not shown), and the box top 190 can be insulated on both sides for added insulation value. In other aspects, the box top 190 may not comprise the insulated panel 140, and the top panel 240 can be uninsulated. The top panel 240 can comprise corrugated cardboard in the present aspect; however, in other aspects the top panel 240 can be comprise a suitable rigid board material such as wood, plastic, metal, or any other material.

Figure 3:
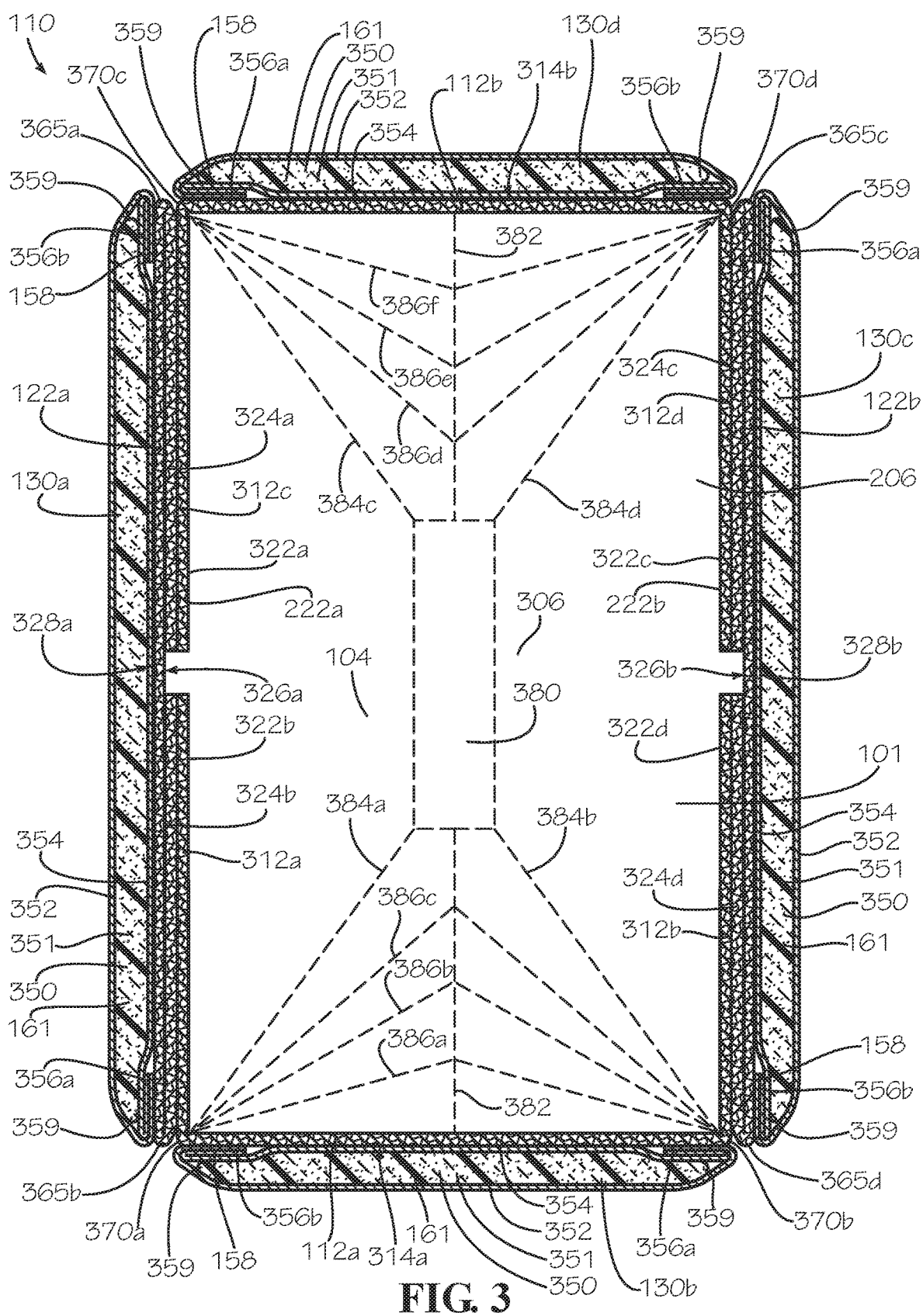
FIG. 3 is a cross-section of the insulated box of FIG. 1 taken along line 3-3 shown in FIG. 2.

FIG. 3 is a cross-section of the insulated box 110 of FIG. 1 taken along line 3-3 shown in FIG. 2, with the carrying accessory 170 and the box top 190 removed. As shown, each shoulder 222a,b can comprise two sub-shoulders 322. The shoulder 222a can comprise the sub-shoulders 322a,b, and the shoulder 222b can comprise the sub-shoulders 322c,d. The sub-shoulders 322a-d can be defined by a plurality of first wings 312a-d and a plurality of second wings 324a-d. The first wings 312a,b can be attached at opposite sides of the side panel 112a, and the first wings 312c,d can be attached at opposite sides of the side panel 112b. The second wings 324a,b can be attached at opposite sides of the side panel 122a, and the second wings 324c,d can be attached at opposite sides of the side panel 122b.

The second wing 324a can be folded inwards at a hinge 365a and positioned adjacent to an inner side surface 326a defined by the side panel 122a, and the first wing 312c can be folded at a hinge 370c and positioned adjacent to the second wing 324a. The second wing 324a and the first wing 312c can be secured in position, such as with an adhesive, to form the sub-shoulder 322a. The second wing 324b can be folded inwards at a hinge 365b and positioned adjacent to the inner side surface 326a, and the first wing 312a can be folded at a hinge 370a and positioned adjacent to the second wing 324b. The second wing 324b and the first wing 312a can be secured in position, such as with an adhesive, to form the sub-shoulder 322b.

For the sub-shoulder 322c of shoulder 222b, the second wing 324c can be folded inward at a hinge 365c and positioned adjacent to an inner side surface 326b defined by the side panel 122b. The first wing 312d can then be folded at a hinge 370d and positioned adjacent to the second wing 324c. The first wing 312d and the second wing 324c can be secured in position, such as with an adhesive, to form the sub-shoulder 322c. For the sub-shoulder 322d of shoulder 222b, the second wing 324d can be folded inward at a hinge 365d and positioned adjacent to the inner side surface 326b. The first wing 312b can then be folded at a hinge 370b and positioned adjacent to the second wing 324d. The first wing 312b and the second wing 324d can be secured in position, such as with an adhesive, to form the sub-shoulder 322d.

The formation of the sub-shoulders 322a-d can also secure each side panel 112a,b to each side panel 122a,b, thereby defining the square or rectangular horizontal cross-section of the box 101. The box 101 can further comprise a bottom panel 306. The bottom panel 306 can be a rigid panel. The bottom panel 306 can be disposed at the bottom end 104 of the box 101, and the bottom panel 306 can be attached to each of the side panels 112a,b,122a,b. The bottom panel 306 can further define the box cavity 206. The box 101 is but one example of a box, and the methods discussed below for insulating the box 101 to form the insulated box 110 can be applied to a box of another shape, size, or form.

In the present aspect, the bottom panel 306 can define a center subpanel 380 disposed at a center of the bottom panel 306. The center subpanel 380 can be substantially rectangular in shape. A center fold line 382 can extend between the center subpanel 380 and each side panel 112a,b, and the center fold line 382 can substantially bisect the bottom panel 306, with the exception of within the center subpanel 380. The center fold line 382 can also bisect each side panel 112a,b, as shown and further described with respect to FIG. 7. Four corner fold lines 384a-d can extend between the corners of the center subpanel 380 and the hinges 370a-d. The corner fold line 384a can extend from the hinge 370a to the center subpanel 380. The corner fold line 384b can extend from the hinge 370b to the center subpanel 380. The corner fold line 384c can extend from the hinge 370c to the center subpanel 380. The corner fold line 384d can extend from the hinge 370d to the center subpanel 380.

A plurality of V-shaped fold lines 386a-f can extend between the hinges 370a-d and the center fold line 382. The V-shaped fold lines 386a-c can each extend from the hinge 370a to center fold line 382 and then to the hinge 370b. The V-shaped fold lines 386a-c can be defined between the corner fold lines 384a and 384b. The V-shaped fold lines 386d-f can each extend from the hinge 370c to center fold line 382 and then to the hinge 370d. The V-shaped fold lines 386d-f can be defined between the corner fold lines 384c and 384d. The center subpanel 380, the center fold line 382, the corner fold lines 384a-d, and the V-shaped fold lines 386a-f can cooperate to collapse the insulated box 110 and to provide the bottom panel 306 with a truncated pyramidal shape when collapsed, as further discussed below with respect to FIG. 8.

The box 101 of the insulated box 110 can be clad with the insulated panels 130a-d. The insulated panel 130a can be attached to an outer side surface 328a defined by the side panel 122a. The insulated panel 130b can be attached to an outer side surface 314a defined by the side panel 112a. The insulated panel 130c can be attached to an outer side surface 328b defined by the side panel 122b. The insulated panel 130d can be attached to an outer side surface 314b defined by the side panel 112b. In the present aspect, the box 101 can be externally clad with the insulated panels 130a-d, however in other aspects, the box 101 can be internally clad, both internally and externally clad, or a mixed arrangement of partially internally clad and partially externally clad with insulated panels 130.

In the present aspect, each insulated panel 130*a*-*d* can comprise an insulation batt 350, a first sheet 352, and a second sheet 354. The insulation batt 350 can be encapsulated in a panel cavity 351 defined between the first sheet 352 and the second sheet 354. The insulation batt 350 can be encapsulated by the border 158 which can extend around a perimeter 359 of the insulation batt 350, thereby sealing the panel cavity 351. The panel cavity 351 containing the insulation batt 350 can define the insulated portion 161 of the respective insulated panel 130*a*-*d*. The border 158 can be a seam formed by attaching a perimeter portion of the first sheet 352 which overhangs the perimeter 359 of the insulation batt 350 with a perimeter portion of the second sheet 354 which also overhangs the perimeter 359 of the insulation batt 350. The first sheet 352 can be attached to the second sheet 354 with an adhesive such as a glue, cement, epoxy, mastic, cohesive, double-side tape or other suitable adhesive to form the border 158. In some aspects, the border 158 can be formed by mechanically fastening the first sheet 352 to the second sheet 354, such as by stapling, stitching, or any other suitable method of fastening.

The border 158 can further define a first side seam 356*a* and a second side seam 356*b*. In the present aspect, the first side seam 356*a* and the second side seam 356*b* can be vertically oriented seams. The first side seam 356*a* and the second side seam 356*b* of the border 158 can be folded inwards and disposed between the insulation batt 350 of the insulated portion 161 and the outer side surface 328*a*,*b* of the respective side panels 122*a*,*b* or the outer side surfaces 314*a*,*b* of the respective side panels 112*a*,*b*. The first side seam 356*a* and the second side seam 356*b* can be attached to the adjacent side panel 112*a*,*b*,122*a*,*b*, thereby further securing the insulated panel 130*a*-*d* to the adjacent side panel 112*a*,*b*,122*a*,*b* and enclosing the insulation batt 350 between the first sheet 352 and the adjacent side panel 112*a*,*b*,122*a*,*b*. By folding the first side seam 356*a* and the second side seam 356*b* inwards, the insulation batt 350 and the insulated portion 161 can extend completely across or nearly completely across the width of the adjacent side panel 112*a*,*b*,122*a*,*b* without leaving the first side seam 356*a* and the second side seam 356*b* sticking outwards beyond the side panel 112*a*,*b*,122*a*,*b*. This configuration can provide full insulation or nearly full insulation over the width of the adjacent side panel 112*a*,*b*,122*a*,*b*.

With the first side seam 356*a* and the second side seam 356*b* folded inwards, the first sheet 352 can be attached to the respective adjacent side panel 112*a*,*b*,122*a*,*b* with an adhesive such as a glue, cement, epoxy, mastic, double-sided tape, cohesive, or other suitable material. A portion of the second sheet 354 extending between the first side seam 356*a* and the second side seam 356*b* can also be in facing contact with the adjacent side panel 112*a*,*b*,122*a*,*b* and can optionally be attached with the adhesive. In other aspects, the insulated panels 130*a*-*d* may not comprise the second sheet 354, and either the insulation batt 350 can be in facing contact with the respective adjacent side panel 112*a*,*b*,122*a*,*b*, or the first sheet 352 can fully encapsulate the insulation batt 350.

Figure 4:
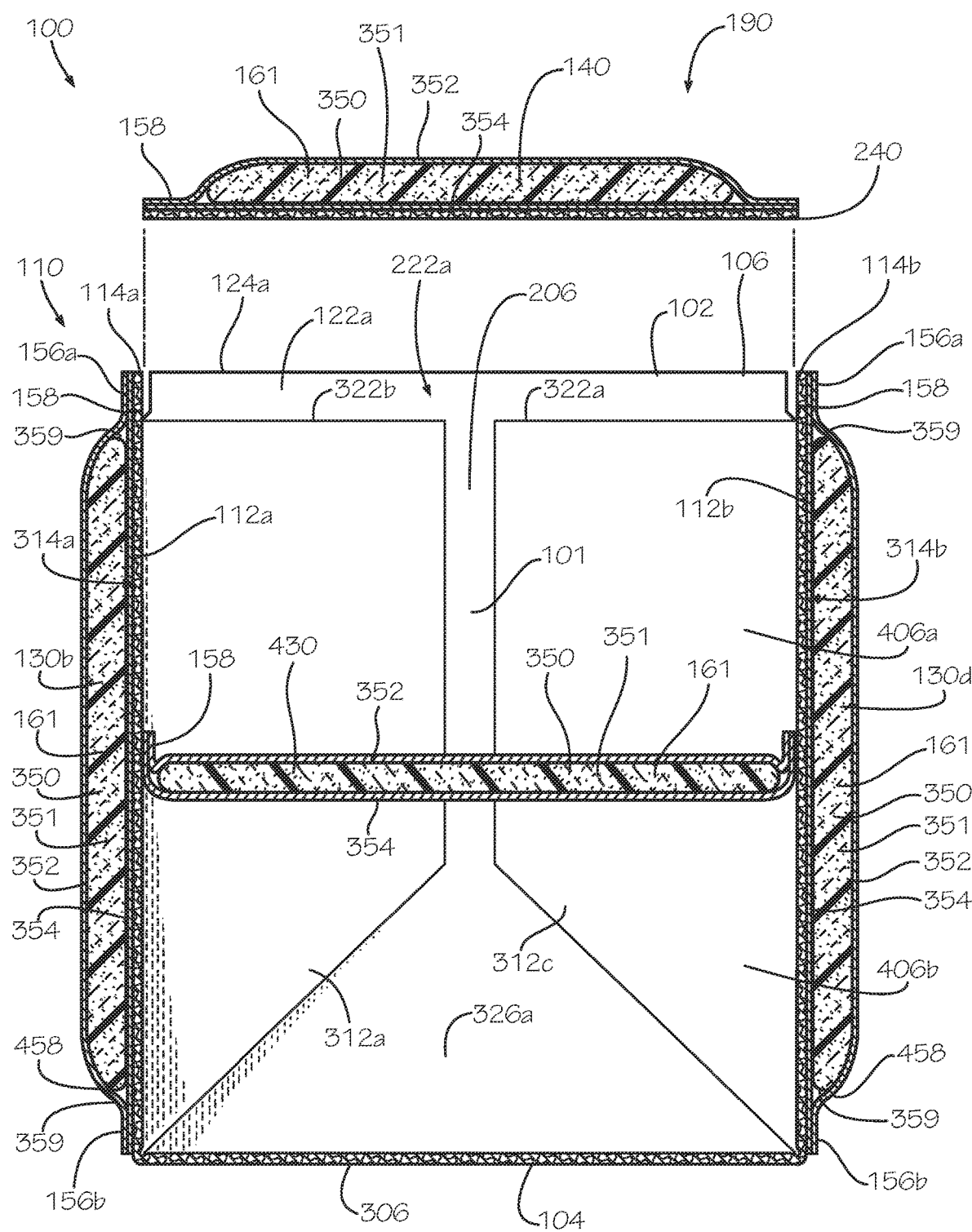
FIG. 4 is a cross-section of the modular box assembly of FIG. 1 taken along line 4-4 shown in FIG. 2.

FIG. 4 is a cross-section of the modular box assembly 100 of FIG. 1 taken along line 4-4 shown in FIG. 2. In the present view, the carrying accessory 170 has been removed. The modular box assembly 100 can further comprise an insulated cavity panel 430 which can be disposed within the box cavity 206. The insulated cavity panel 430 can be constructed similar to the insulated panels 130*a*-*d*,190; however, in the present aspect, the insulated cavity panel 430 can be a loose panel. The insulated portion 161 of the insulated cavity panel 430 can be shaped and sized complimentary to the horizontal cross-section of the box 101 in order to provide a close fit within the box cavity 206.

As shown, the insulated cavity panel 430 can divide the box cavity 206 into a first sub-compartment 406*a* and a second sub-compartment 406*b*. In the present aspect, the insulated cavity panel 430 can be horizontally oriented, and the first sub-compartment 406*a* can be an upper sub-compartment while the second sub-compartment 406*b* can be a lower sub-compartment. In other aspects, the insulated cavity panel 430 can be vertically oriented to divide the box cavity 206 into side-by-side compartments. In some aspects, the insulated box 110 can comprise multiple cavity panels 430 disposed within the box cavity 206 to divide the box cavity 206 into more than two compartments or no insulated cavity panels 430 so that the box cavity 206 is a single compartment. Dividing the box cavity 206 into sub-compartments can be desirable in order to package both hot and cold contents in the same insulated box 110 or other contents that should be stored at different temperatures.

In the present aspect, the bottom panel 306 can be uninsulated. Optionally, the insulated cavity panel 430 can be placed atop the bottom panel 306 to provide insulation for the bottom end 104 of the insulated box 110. In other aspects, the insulated box 110 can further comprise another insulated panel 130 (not shown) attached internally or externally to the bottom panel 306. In aspects in which the box top 190 can be uninsulated, the insulated cavity panel 430 can be positioned adjacent to the box top 190 to provide insulation for the top end 102 of the insulated box 110. In some aspects, the bottom panel 306 can be insulated and the insulated cavity panel 430 can be placed atop the bottom panel 306 in order to provide additional insulation for example. In some aspects, the modular box assembly 100 can comprise multiple insulated cavity panels 430 positioned within the box cavity 206. In other aspects, the modular box assembly 100 can comprise any or all of the insulated cavity panel 430, a bottom insulated panel 2130 (shown in FIG. 21), and a divider panel 2230 (shown in FIG. 22).

The bottom seam 156*b* and the top seam 156*a* of the border 158 of each insulated panel 130*a*-*d* can extend outwards from the perimeter 359 of the insulation batt 350 and the insulated portion 161. As previously discussed, the bottom seams 156*b* and the top seams 156*a* can be attached to the respective adjacent side panel 112*a*,*b*,122*a*,*b* with the adhesive in order to secure the insulated panels 130*a*-*d*, to the box 101 proximate the top end 102 and the bottom end 104. In such aspects, the second sheet 354 can be attached to the adjacent side panel 112*a*,*b*,122*a*,*b*, and the first sheet 352 may not contact the adjacent side panel 112*a*,*b*,122*a*,*b* at the bottom seam 156*b* and the top seam 156*a*; however, the insulation batt 350 remains enclosed between the first sheet 352 and the adjacent side panel 112*a*,*b*,122*a*,*b*. Optionally, portions of the second sheet 354 disposed between the top seams 156*a* and the bottom seam 156*b* can also be attached to the respective adjacent side panel 112*a*,*b*,122*a*,*b* with the adhesive.

The outward extending top seams 156*a* can leave the lips 114*a*,*b*,124*a*,*b* uninsulated; however, because the box top 190 rests below the box opening 106 on the shoulders 222*a*,*b* (should 222*b* shown in FIG. 3), the top end 102 of the insulated box 110 can remain fully insulated. Similarly, the bottom seams 156*b* can leave a portion of the side panels 112a,b,122a,b proximate the bottom panel 306 uninsulated. However, in aspects in which the insulated cavity panel 430 can be positioned atop the bottom panel 306, the insulated cavity panel 430 can fully insulate the bottom end 104 of the insulated box 110. In other aspects, either or both of the bottom seams 156b and top seams 156a can be folded inward towards the insulation batt 350 and the insulated portion 161, and the insulation batt 350 can fully cover the height of the side panels 112a,b,122a,b.

The outwardly extended bottom seams 156b can define a bottom taper 458 extending around the insulated box 110 proximate the bottom end 104. The bottom taper 458 can cooperate with the lips 114a,b,124a,b to securely stack multiple insulated boxes 110 on top of one another. The lips 114a,b,124a,b of a lower insulated box of the stack of insulated boxes can deflect outwards allowing the bottom taper 458 of an upper insulated box to nest between the lips 114a,b,124a,b and atop the box top 190 of the lower insulated box. By nesting between the lips 114a,b,124a,b, the lips 114a,b,124a,b can prevent the upper insulated box from sliding sideways off the top end 102 of the lower insulated box. The insulated boxes 110 can also be conveyable, such as on a conveyor belt, and the insulated boxes 110 can be rigid and strong enough to resist collapse on the conveyor belt. In other aspects, the lips 114a,b,124a,b can be configured to be flush with the top panel 240 of the box top 190 when the box top 190 is in the closed position.

Figure 5:
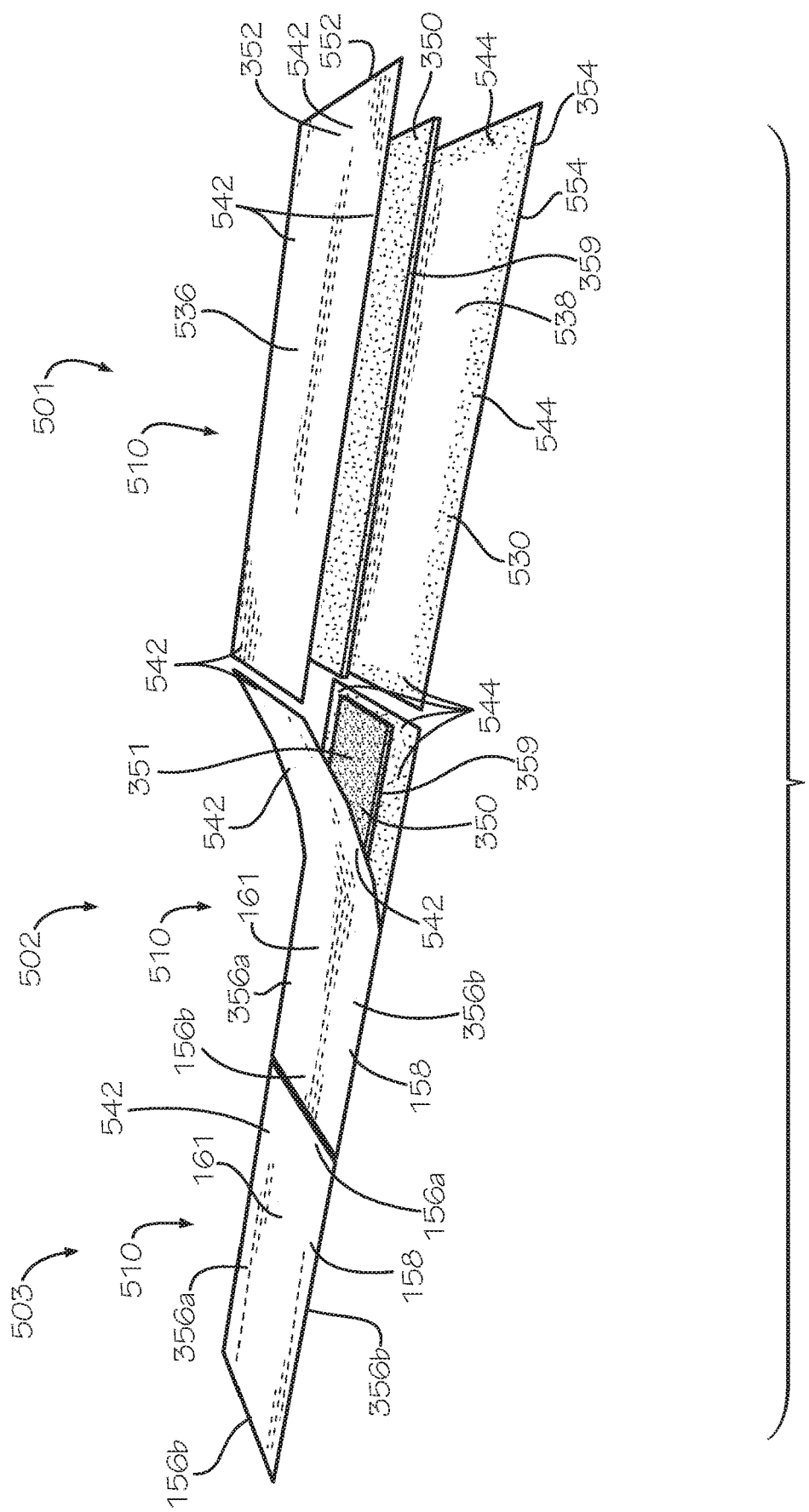
FIG. 5 is a perspective view of a method for manufacturing an insulated panel in accordance with another aspect of the current disclosure.

FIG. 5 is a perspective view of a method of manufacturing for an insulated panel 510. The method can apply to the manufacture of the insulated panels 130a-d,140,430 or an insulation wrap 1730 (shown in FIG. 17). In a step 501, the insulation batt 350 can be positioned between the first sheet 352 and the second sheet 354. The first sheet 352 and the second sheet 354 can be sized and shaped complimentary to each other; however in some aspects, the sheets 352,354 can differ in size and shape. The insulation batt 350 and the sheets 352,354 can each be flat and substantially planar before assembly. In the present aspect, the insulation batt 350 can be approximately ⅜" thick; however this thickness is not limiting. The thickness can range from 1/16" to over 2" with a preferred range of ¼" to ½".

The first sheet 352 can define a first outer edge 552, and a portion of the first sheet 352 proximate the first outer edge 552 can define a first perimeter portion 542. The second sheet 354 can define a second outer edge 554, and a portion of the second sheet 354 proximate the second outer edge 554 can define a second perimeter portion 544. The sheets 352,354 can be sized to overhang the insulation batt 350 on all sides with the first perimeter portion 542 and the second perimeter portion 544 extending beyond the perimeter 359 of the insulation batt 350. The first perimeter portion 542 can encompass a first interior portion 536 of the first sheet 352, and the second perimeter portion 544 can encompass a second interior portion 538 of the second sheet 354. The interior portions 536,538 can be sized and shaped complimentary to the insulation batt 350.

Surfaces of the sheets 352,354 facing one another can be treated with an adhesive 530 such as a cohesive. In various aspects, the adhesive can be a glue, epoxy, cement, double-sided tape, or other suitable adhesive. The surfaces can be entirely treated with the adhesive 530 or selectively treated with the adhesive 530. In the aspect shown, the perimeter portions 542,544 can be selectively treated with the adhesive 530. In some aspects, the insulation batt 350 can also be adhered to the interior portions 536,538 of the sheets 352, 354.

In a step 502, the sheets 352,354 can be aligned and positioned in facing engagement wherein the first perimeter portion 542 can be attached to the second perimeter portion 544 by the adhesive 530. The insulation batt 350 can be aligned between the interior portions 536,538. Attaching the perimeter portions 542,544 can form the border 158 of the insulated panel 510 around the perimeter 359 of the insulation batt 350. As depicted in step 502, the bottom seam 156b has been formed, the first side seam 356a and the second side seam 356b are partially formed, and the top seam 156a is yet to be formed.

The border 158 can seal the insulation batt 350 within the panel cavity 351 defined between the interior portions 536,538 of the sheets 352,354, respectively. Portions of the insulated panel 510 containing the insulation batt 350 can define the insulated portion 161 of the insulated panel 510. In some aspects, the insulation batt 350 can be aligned off-center from the sheets 352,354 wherein the border 158 can extend outwards further in some areas than others. In some aspects, the first side seam 356a, the second side seam 356b, the bottom seam 156b, and the top seam 156a can define different widths from one another. For example and without limitation, the first side seam 356a can extend outwards from the insulation batt 350 further than the bottom seam 156b or vice versa.

In a step 503, the first perimeter portion 542 has been fully attached to the second perimeter portion 544, thereby forming the completed border 158. Each of the first side seam 356a, the second side seam 356b, the bottom seam 156b, and the top seam 156a are fully formed. Manufacturing of the insulated panel 510 is thus completed; however in some aspects, the method can comprise additional steps such as cutting slots into the border 158. The border 158 can fully encapsulate the insulation batt 350 within the panel cavity 351; however in some aspects, the insulation batt 350 may not be fully encapsulated. In some aspects, the insulation batt 350 can define a complex shape which can comprise curves, notches, cutouts, or other features which can be reflected by complimentary shapes of the border 158 and the insulated portion 161.

In other aspects, the border 158 may not fully encompass and encapsulate the insulation batt 350. In some aspects, some portions of the perimeter 359 may be exposed at an unfinished side or a cutout of the border 158. In some aspects, the insulated panel 510 may not define the border 158 on any portion of the perimeter of the insulated panel 510, and the entire perimeter can define an unfinished edge. In such aspects, the insulated panel 510 can comprise pre-laminated paper and each of the sheets 352,354 can be attached in facing contact with the insulation batt 350 with, for example and without limitation, an adhesive. In some aspects in which the insulated panel 510 defines the border 158, the insulation batt 350 can also be attached in facing contact with one or both of the sheets 352,354. In some aspects, the pre-laminated paper can be provided in a roll, and the insulated panels 510 can be cut to size from the roll. In other aspects, the first sheet 352 and the second sheet 354 can be halves of a single sheet (not shown) which can be folded substantially in half. In such aspects, the insulation batt 350 can be encapsulated between the two halves of the single sheet. In other aspects, the second sheet 354 can be a board (not shown), such as a piece of cardboard, and the insulation batt 350 can be encapsulated between the first sheet 352 and the board.

Figure 21:
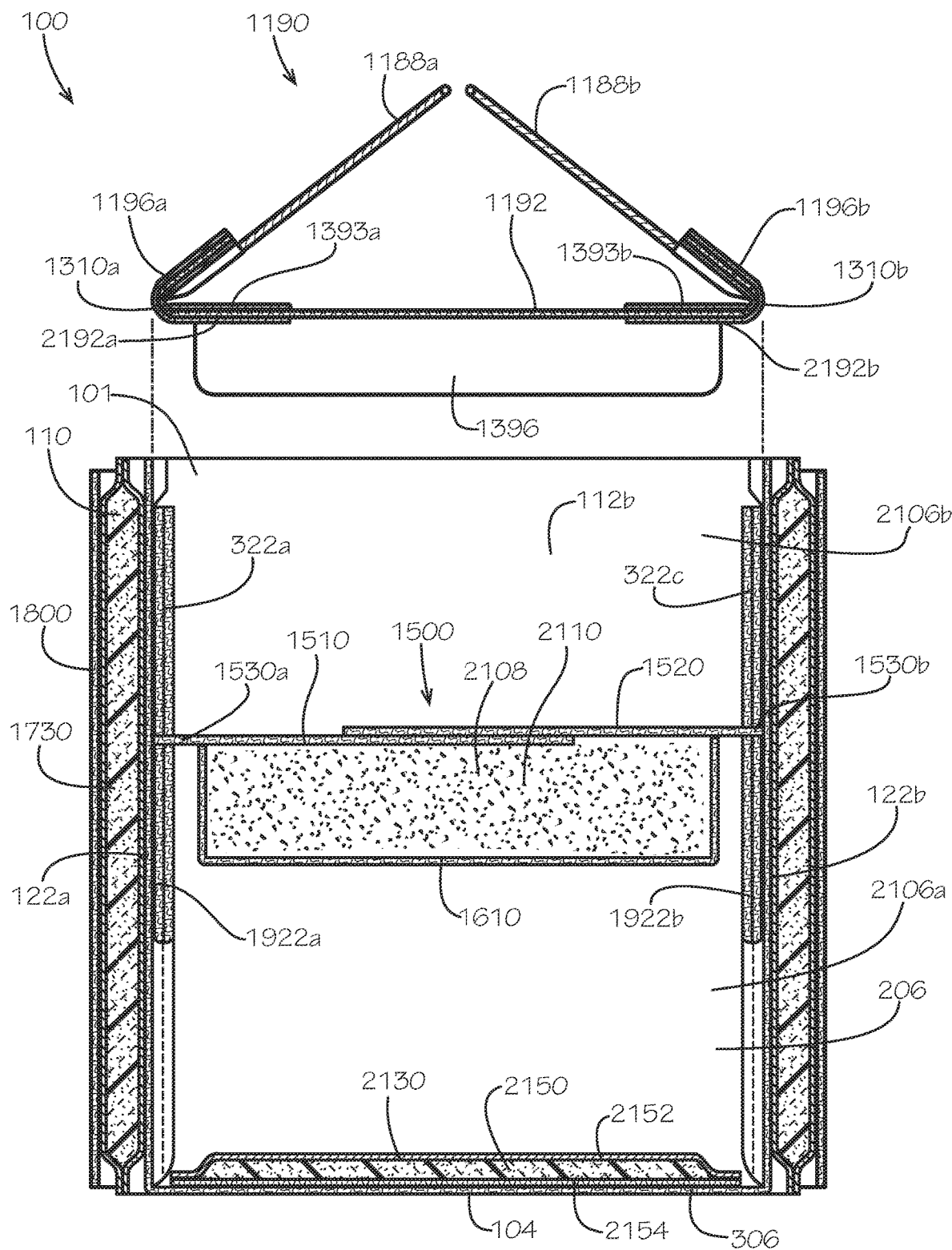
FIG. 21 is a side cross-section of the modular box assembly of FIG. 20, further comprising the handle top of FIG. 11 and a bottom insulated panel in accordance with another aspect of the present disclosure.

In some aspects, either the second sheet 354 can be a board 2154 (shown in FIG. 21). In such applications, the board 2154 can be rigid and the first sheet 352 can laminate and encapsulate the insulation batt 350 to the board 2154 to provide a rigid insulated panel, such as the bottom insulated panel 2130.

Figure 6A:
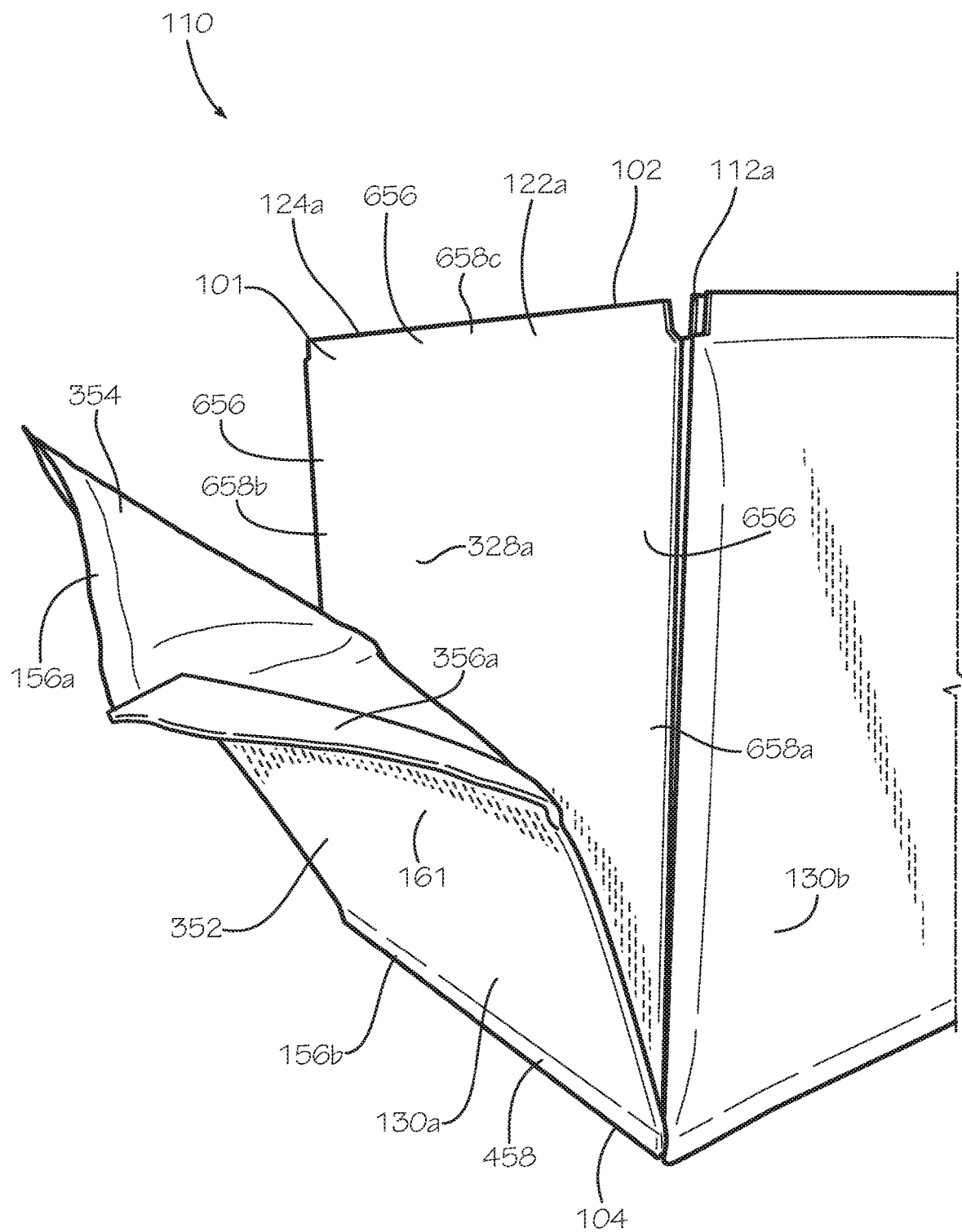
FIG. 6A is a perspective view of another aspect of an insulated panel in accordance with another aspect of the current disclosure prepared for installation on the insulated box of FIG. 1.
Figure 6B:
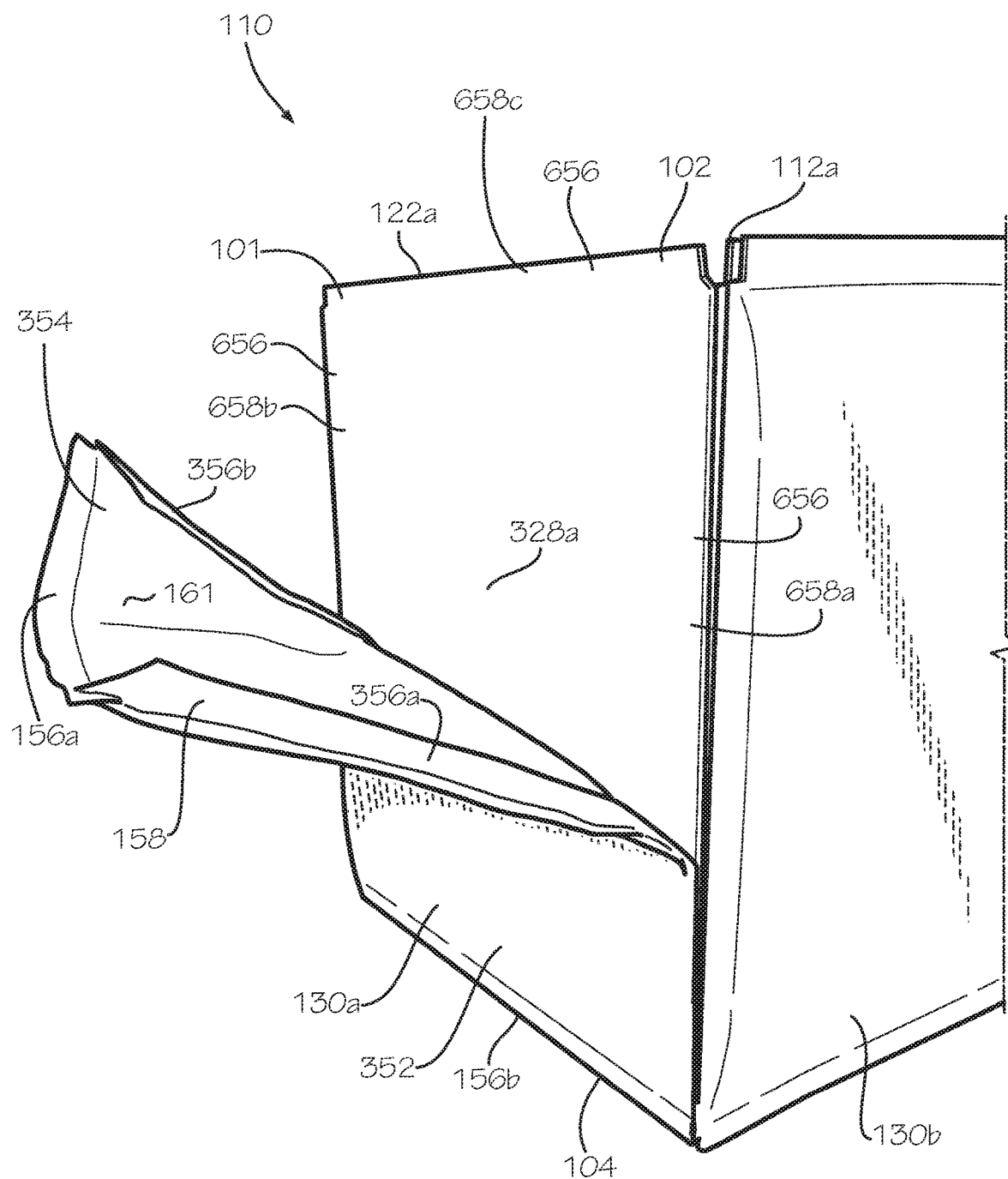
FIG. 6B is a perspective view of the insulated panel of FIG. 6A partially installed on the insulated box of FIG. 1.
Figure 6C:
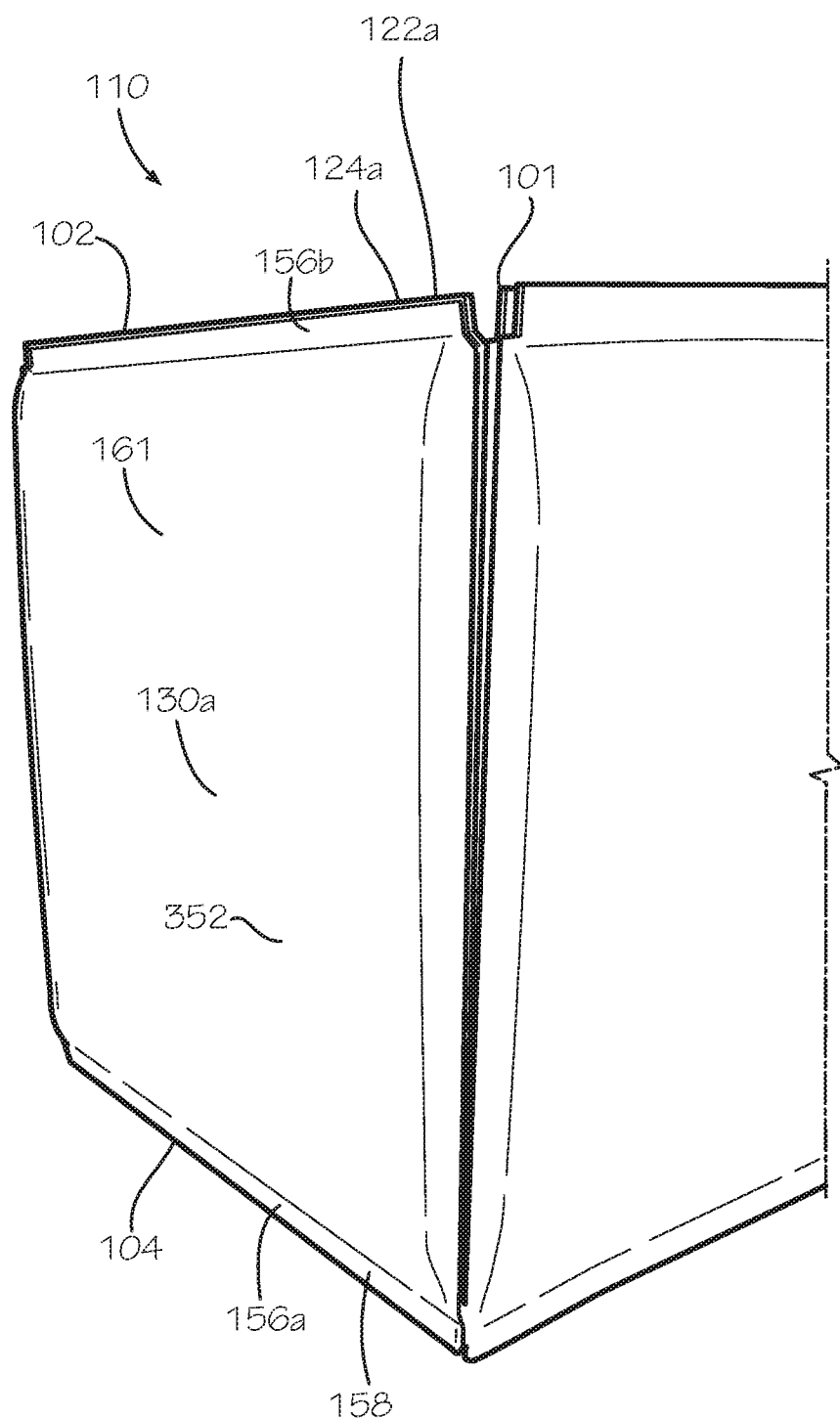
FIG. 6C is a perspective view of the insulated panel of FIG. 6A completely installed on the insulated box of FIG. 1.

FIGS. 6A-C show perspective views of a method for attaching the insulated panel 130a to the side panel 122a. In FIG. 6A, the insulated panel 130a is shown partially attached to the side panel 122a. In the present aspect, the insulated panel 130a and the adjacent insulated panel 130b can be separate and isolated insulation panels 130 which are not connected together. By using separate insulated panels 130, manufacturing stress around corners of the insulated box 110 can be reduced during assembly of the insulated box 110, thereby reducing the likelihood of ripping or tearing the insulated panels 130 during assembly. The insulated panel 130a can be positioned adjacent to the side panel 122a, and the bottom seam 156b can be attached to a perimeter area 656 of the outer side surface 328a. The perimeter area 656 can extend around the edges of the side panel 122a. Specifically, the bottom seam 156b can be attached to a bottom portion (not shown) of the perimeter area 656 extending along the bottom end 104 of the side panel 122a. The perimeter area 656 can also define a first portion 658a and a second portion 658b extending upwards from the bottom portion to a top portion 658c. The top portion 658c can extend along the lip 124a proximate the top end 102 of the side panel 122a.

The bottom seam 156b of the border 158 can extend outwards from the insulated portion 161 of the insulated panel 130a, and the second sheet 354 of the bottom seam 156b can be attached to the outer side surface 328a. In other aspects, the bottom seam 156b can be folded inwards towards the insulation batt 350 (not shown) encapsulated within the insulated portion 161. The bottom seam 156b can be attached in facing contact with the side panel 122a by an adhesive such as a glue, epoxy, cement, mastic, or any other suitable adhesive. In other aspects, the bottom seam 156b can be mechanically attached to the side panel 122a such as with a hook-and-loop fastener, stitching, or staples, or other suitable fasteners. In the present aspect, the first side seam 356a and the second side seam 356b (shown in FIG. 6B) can be folded inwards towards the insulation batt 350 (not shown) encapsulated within the insulated portion 161. The first side seam 356a can be attached to the bottom portion (not shown) at an intersection between the bottom portion and the first portion 658a of the perimeter area 656. The second side seam 356b can be attached to the bottom portion (not shown) at an intersection between the bottom portion and the second portion 658b of the perimeter area 656.

In FIG. 6B, the insulated panel 130a is shown with the bottom seam 156b attached to the side panel 122a, and the first side seam 356a and the second side seam 356b partially attached to the first portion 658a and the second portion 658b of the perimeter area 656, respectively. The first sheet 352 of the first side seam 356a and the second side seam 356b can be attached in facing contact to the perimeter portion 656 of the outer side surface 328a by an adhesive such as a glue, epoxy, cement, mastic, double-sided tape, cohesive, or other suitable adhesive. In other aspects, the first sheet 352 of the first side seam 356a and the second side seam 356b can be mechanically attached to the perimeter portion 656 of the outer side surface 328a, such as with a hook-and-loop fastener, stitching, or staples, or other suitable fasteners. In the aspect shown, the insulated panel 130a is shown as first attached proximate the bottom end 104 and then subsequently attached upwards along the first side seam 356a and the second side seam 356b towards the top end 102; however, this sequence and direction of attachment are not limiting. The insulated panel 130a can first be attached at the first side seam 356a, the second side seam 356b, or the top seam 156a and further attached in a sideways or downwards direction, or in any other suitable sequence. In some aspects, the second sheet 354 of the insulated portion 161 can also be attached to the outer side surface 328a by an adhesive such as a glue, epoxy, cement, mastic, or any other suitable adhesive.

FIG. 6C shows the insulated panel 130a completely attached to the side panel 122a. The first side seam 356a (shown in FIG. 6B) can be completely attached to the first portion 658a (shown in FIG. 6B) of the perimeter area 656 (shown in FIG. 6B) from the bottom end 104 to the top end 102. The second side seam 356b (shown in FIG. 6B) can be completely attached to the second portion 658b (shown in FIG. 6B) of the perimeter area 656 (shown in FIG. 6B) from the bottom end 104 to the top end 102. The top seam 156a can be fully attached to the top portion 658c (shown in FIG. 6B) by an adhesive such as a glue, epoxy, cement, mastic, double-sided tape, cohesive, or any other suitable adhesive. In other aspects, the top seam 156a can be mechanically attached to the top portion 658c, such as with a hook-and-loop fastener, staples, or stitching, or other suitable fasteners.

One method for attaching the insulated panel 130a to the side panel 122a shown in FIGS. 6A-C can apply to any of the insulated panels 130a-d,140 and any of the adjacent panels 112a,b,122a,b,240. The method can also be used to attach the insulated panels 130a-d to an inner surface, such as inner side surfaces 326a,b, within the box cavity 206. The method is demonstrated on the assembled box 101, and the method is exemplary and not limiting. The various panels 112a,b,122a,b,306 of the box 101 can also be clad with individual insulated panels 130a-d prior to assembly of the box 101. For example, the insulated panels 130a-d, can be attached to the respective panels 112a,b,122a,b of an unfolded box blank 710 (shown in FIG. 7). It can be desirable to attach the insulated panels 130a-d to the unfolded box blank 710 prior to assembly in order to reduce mechanical handling of the box 101. In another aspect, the insulated box 110 can be formed by wrapping the insulation wrap 1730 around the box 101 as described relative to FIG. 17.

Figure 7:
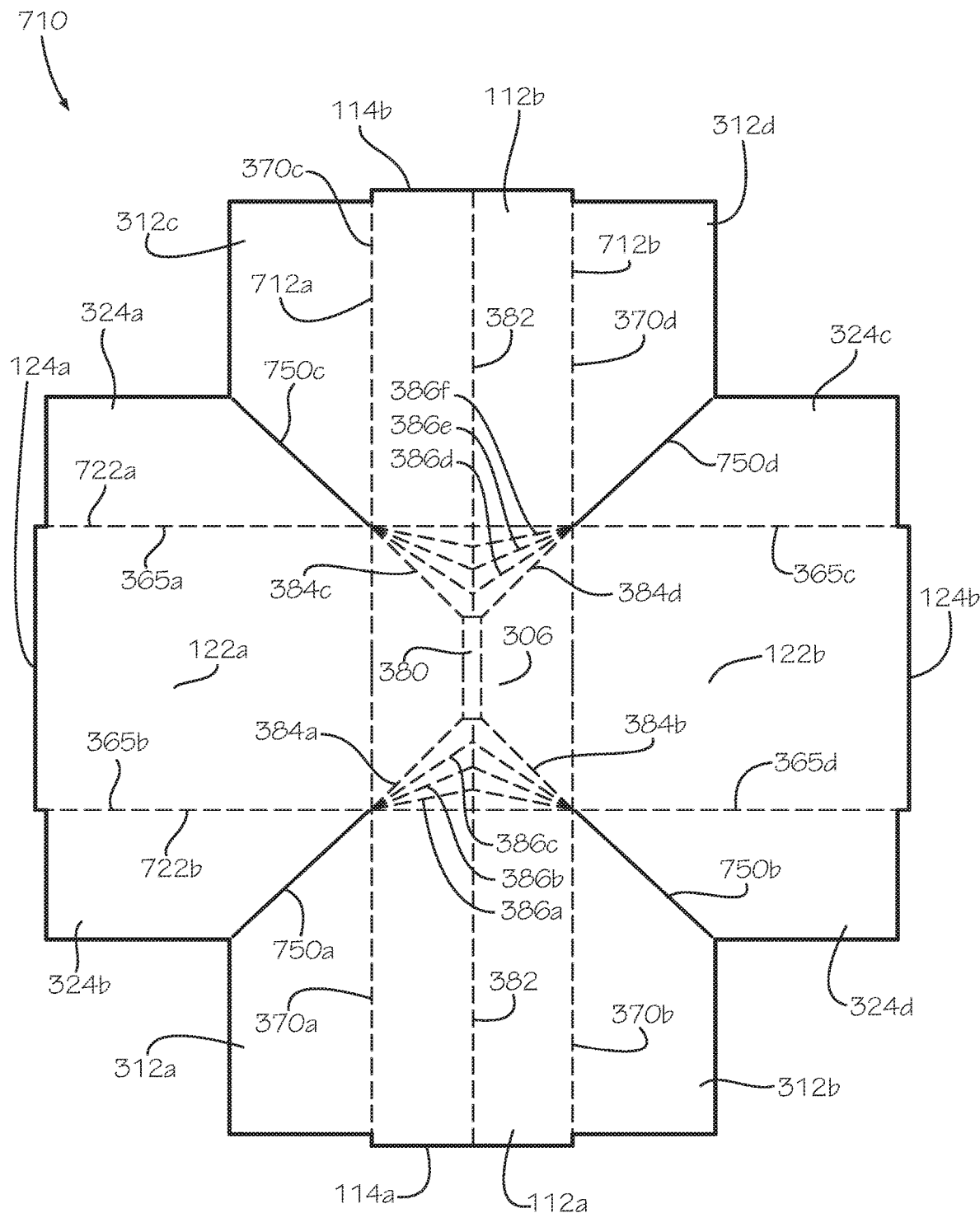
FIG. 7 is a top view of a box blank of the insulated box of FIG. 1 without insulated panels.

FIG. 7 is a top view of the box blank 710 which can be assembled to form the box 101 of the insulated box 110. The box blank 710 can further define four corner fold lines 750a-d, such as a scored crease. In other aspects, the box blank 710 can define cuts in place of the corner fold lines 750a-d. A first corner fold line 750a can extend outwards from the bottom panel 306 to separate the first wing 312a from the second wing 324b. A second corner fold line 750b can extend outwards from the bottom panel 306 to separate the first wing 312b from the second wing 324d. A third corner fold line 750c can extend outwards from the bottom panel 306 to separate the first wing 312c from the second wing 324a. A fourth corner fold line 750d can extend outwards from the bottom panel 306 to separate the first wing 312d from the second wing 324c. In the present aspect, the adjacent wings 312a-d,324a-d can be hingedly connected by the corner fold lines 750a-d. In other aspects, the corner fold lines 750a-d can be cuts which separate the adjacent wings 312a-d,324a-d.

The box blank 710 can define a first length fold line 712a and a second length fold line 712b extending from the side panel 112a to the side panel 112b. The first length fold line 712a can facilitate folding of the first wing 312a relative to the side panel 112a, the side panel 122a relative to the bottom panel 306, and the first wing 312c relative to the second side panel 112b. The second length fold line 712b can facilitate folding of the first wing 312b relative to the side panel 112a, the side panel 122b relative to the bottom panel 306, and the first wing 312d relative to the side panel 112b.

The box blank 710 can further define a first width fold line 722a and a second width fold line 722b. The width fold lines 722a,b can be defined substantially perpendicular to the length fold lines 712a,b. The first width fold line 722a can facilitate folding of the second wing 324a relative to the side panel 122a, the side panel 112b relative to the bottom panel 306, and the second wing 324c relative to the side panel 122b. The second width fold line 722b can facilitate folding of the second wing 324b relative to the side panel 122a, the side panel 112a relative to the bottom panel 306, and the second wing 324d relative to the side panel 122b.

The center fold line 382 can extend across and bisect each side panel 112a,b. The center fold line 382 facilitates each of the side panels 112a,b folding inwards about the center fold line 382 and towards the bottom panel 306 to facilitate collapsing the insulated box 110 as shown in FIG. 8.

In some aspects, the insulated panels 130a-d can be attached to the side panels 112a,b,122a,b to the unfolded box blank 710 prior to assembly. In other aspects, a single insulated panel 130a,b can be attached to the unfolded box blank 710 to cover the side panels 112a,b,122a,b, and in some aspects, the bottom panel 306 as well. In some aspects, the entire unfolded box blank 710 can be covered by a single insulated panel.

Figure 8:
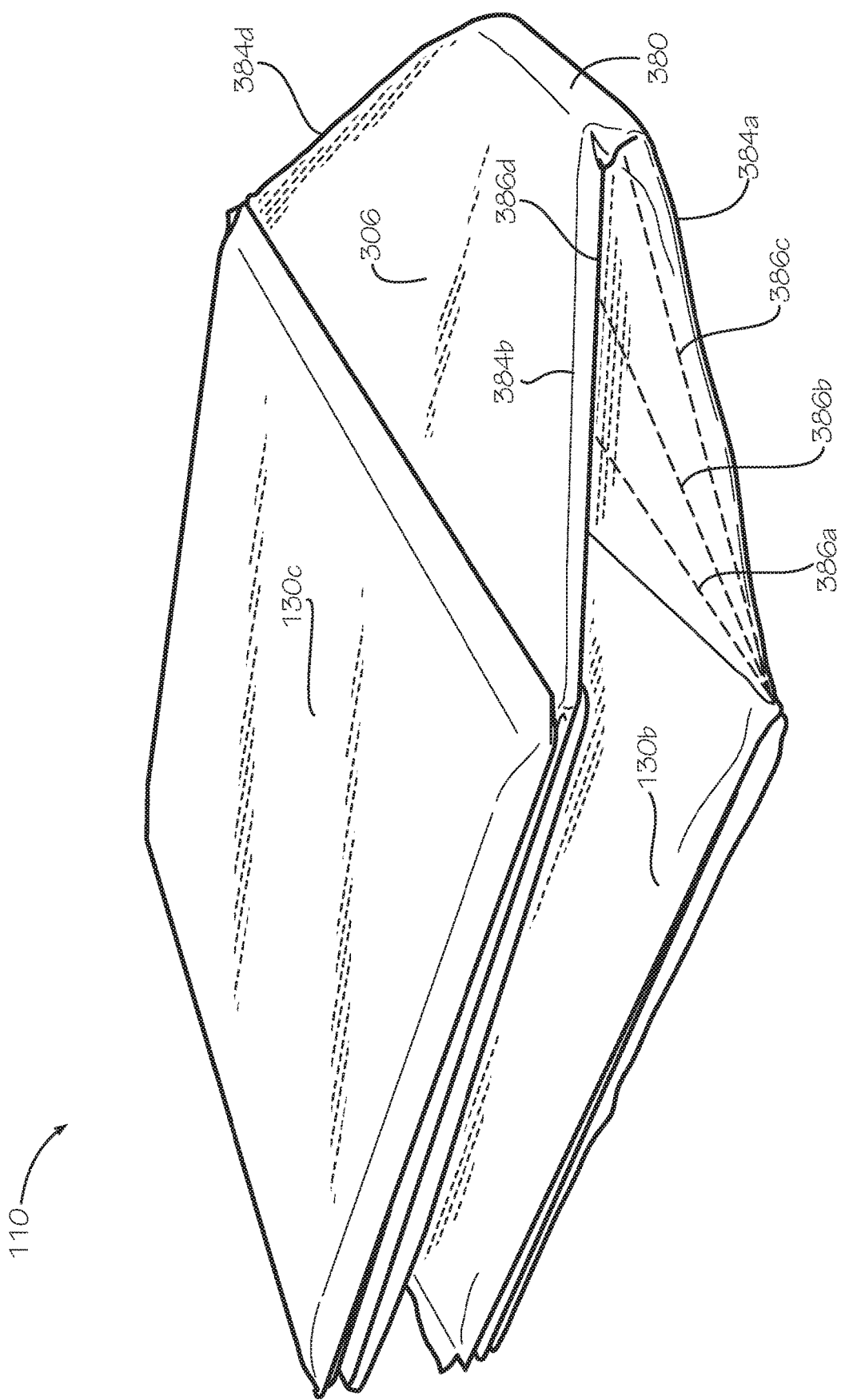
FIG. 8 is a perspective view of the insulated box of FIG. 1 in a collapsed configuration.

FIG. 8 is a perspective view of the insulated box 110 of FIG. 1 in a collapsed configuration. In the present view, the carrying accessory 170 is removed to better show the details of the bottom panel 306. As the insulated box 110 collapses, the side panels 122a,b (side panels 122a,b shown in FIG. 1) move inwards together and towards one another, and the side panels 112a,b fold inwards towards one another (side panels 112a,b shown in FIG. 1). The V-shaped fold lines 386a-f (V-shaped fold lines 386e,f shown in FIG. 7) cooperate to transition the bottom panel 306 from a substantially planar shape to the truncated pyramidal shape. In the truncated pyramidal shape, the center subpanel 380 extends outwards and away from the side panels 112a,b and the side panels 122a,b (shown in FIG. 7). Exerting a force upon the center subpanel 380, such as by pushing the box 101 against the ground can cause the insulated box 110 to self-expand into an expanded configuration (shown in FIG. 1) with a substantially rectangular prism shape. The self-expanding action can be desirable to allow for quick and easy reconfiguration of the insulated box 110, unlike many boxes which must be folded and taped together. The insulated boxes 110 can be shipped and stored in the collapsed configuration for space-efficient packing, and a user can simply press upon the center subpanel 380, such as by pressing the center subpanel 380 against the ground, and the insulated box 110 can reconfigure to the expanded configuration.

Figure 9:
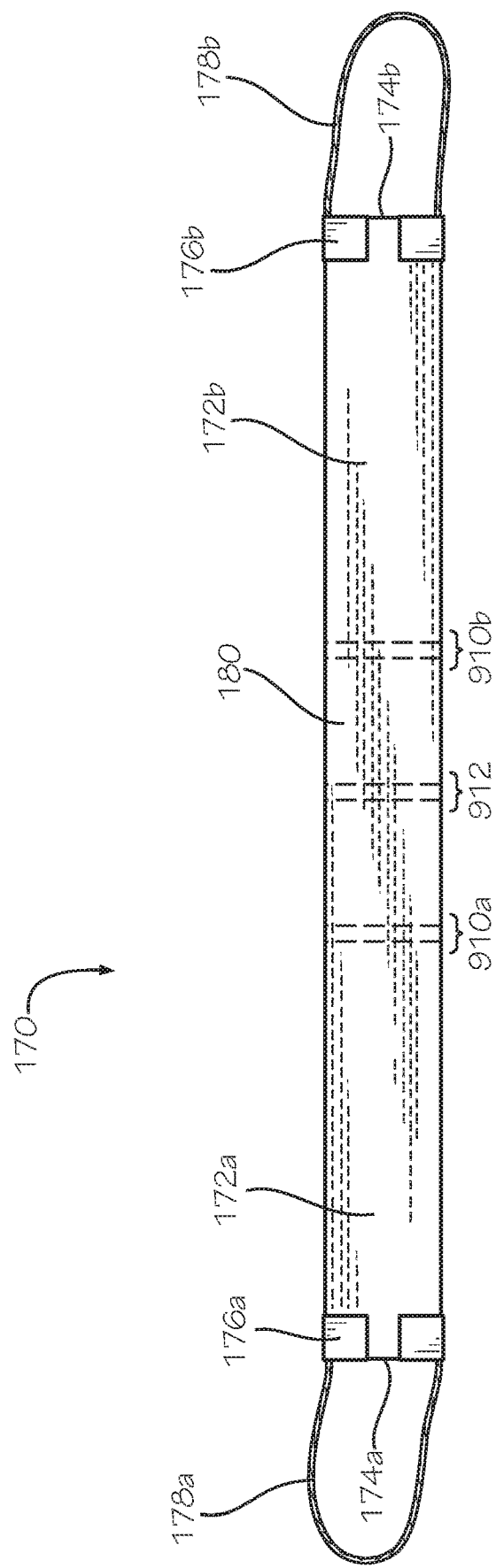
FIG. 9 is a top view of the carrying accessory of the modular box assembly of FIG. 1.

FIG. 9 is a top view of the carrying accessory 170 of FIG. 1. As previously described, the carrying accessory 170 can be configured to extend beneath the insulated box 110 (shown in FIG. 1) to facilitate hand carrying of the insulated box 110. The carrying accessory 170 can define two pairs of fold lines 910a,b. A first pair of fold lines 910a can be defined between the first side portion 172a and the middle portion 180, and a second pair of fold lines 910b can be defined between the second side portion 172b and the middle portion 180. The fold lines of each pair of fold lines 910a,b can be placed closely together, such as an inch apart or less, and can be substantially parallel to one another. The pairs of fold lines 910a,b configure the carrying accessory 170 to closely conform to the bottom taper 458 (shown in FIG. 3) of the bottom end 104 of the insulated box 110. The middle portion 180 of the carrying accessory 170 can also define a pair of middle fold lines 912. The middle fold lines 912 can configure the carrying accessory 170 to closely conform to the truncated pyramidal shape of the bottom panel 306 (shown in FIG. 8) when the insulated box 110 is in the collapsed configuration as shown in FIG. 8. In other aspects each or any of the pairs of fold lines 910a,b and 912 can be substituted with single fold lines as desired.

Figure 10:
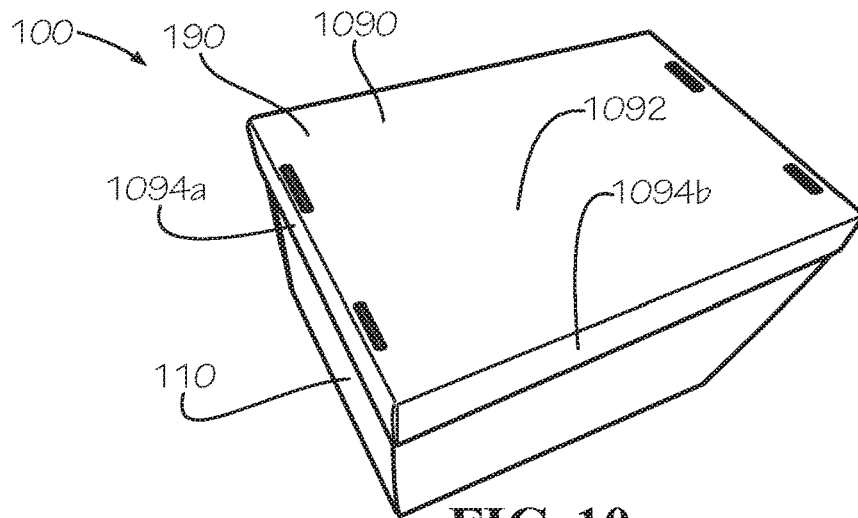
FIG. 10 is a perspective view of the modular box assembly comprising the insulated box of FIG. 1 and another aspect of a box top in accordance with another aspect of the present disclosure.

FIG. 10 is a perspective view of the modular box assembly 100 comprising the insulated box 110 of FIG. 1 and another aspect of a box top 190 in accordance with another aspect of the present disclosure. In the present aspect, the box top 190 can be a tray top 1090. The tray top 1090 can comprise a top panel 1092 and four side panels, as represented by side panels 1094a,b, extending down from the top panel 1092. The tray top 1090 can be configured to fit over the top end 102 of the box 101 (shown in FIG. 1). The side panels 1094 can fit over the lips 114a,b,124a,b (shown in FIG. 1) to enclose the box cavity 206 (shown in FIG. 2).

Figure 11:
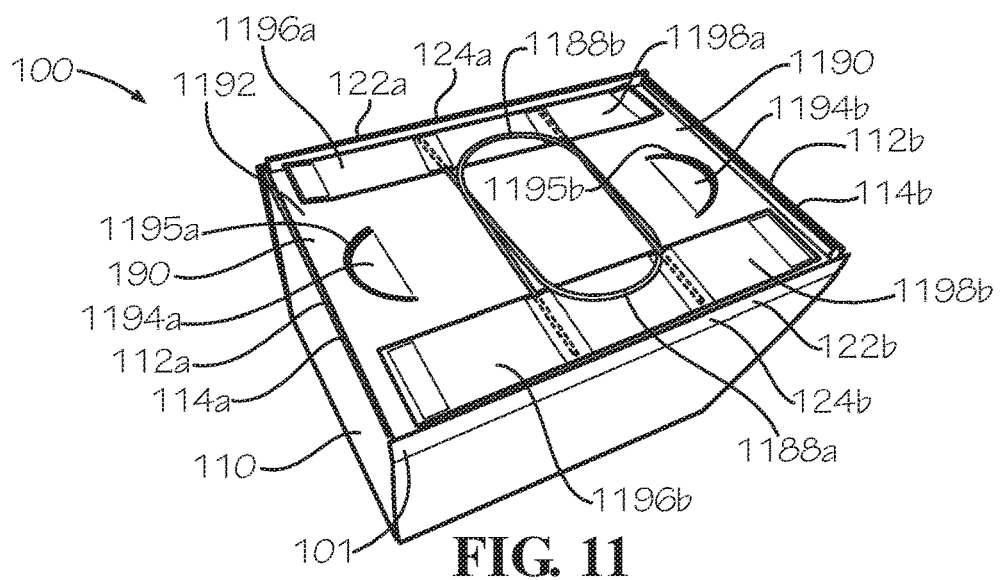
FIG. 11 is a perspective view of the modular box assembly comprising the insulated box of FIG. 1 and another aspect of a box top in accordance with another aspect of the present disclosure.

FIG. 11 is a perspective view of the modular box assembly 100 comprising the insulated box 110 of FIG. 1 and another aspect of a box top 190 in accordance with another aspect of the present disclosure. In the present aspect, the box top 190 can be a handle panel 1190. The handle top 1190 can comprise a top panel 1192 and a pair of side panels 1196a,b attached at opposite sides of the top panel 1192. In the present aspect, the top panel 1192 can be positioned between the lips 114a,b,124a,b of the box 101, and the side panels 1196a,b can be positioned adjacent to the side panels 122a,b. The side panels 1196a,b can be hingedly attached to the top panel 1192. The handle top 1190 can further comprise a pair of side tabs 1396a,b (shown in FIG. 13) which can be attached to the top panel 1192 and which can extend downwards into the box cavity 206 (shown in FIG. 2), adjacent to the side panels 112a,b. In some aspects, the side tabs of the handle top 1190 can be glued to either the inside or the outside of the side panels 112a,b to secure the handle top 1190 to the insulated box 110. In other aspects, the handle top 1190 can be secured to the insulated box 110 by tape, banding, a strap, or other restraint mechanism.

A handle loop 1188a,b can be attached to each side panel 1196a,b, respectively, by a tape strip 1198a,b. In the present aspect, the tape strips 1198a,b can extend completely around the respective side panel 1196a,b to secure the handle loop 1188a,b to the side panel 1196a,b. In the present aspect, the handle loops 1188a,b can be rope loops. The handle loops 1188a,b can allow a user to carry the modular box assembly 100. In the present aspect, each handle loop 1188a,b can comprise a rope, such as a paper rope, a hemp rope, a manila rope, a cotton rope, a flax rope, a plastic rope, or any other suitable type of rope.

In the present aspect, the top panel 1192 can further comprise a pair of folding tabs 1194a,b. The folding tabs 1194a,b can cover a pair of hand holes 1195a,b, respectively. The folding tabs 1194a,b can be hingedly connected to the top panel 1192, and the folding tabs 1194a,b can be pressed inwards towards the box cavity 206. With the folding tabs 1194a,b pressed inwards, a user can put a finger or fingers through each of the hand holes 1195a,b to pick up the modular box assembly 100. In some aspects, the hand holes 1195a,b can be positioned close enough together that a user can insert a thumb through a first of the hand holes 1195a,b and a finger through the second of the hand holes 1195*a,b* to pick up the modular box assembly 100 with one hand. In some aspects, the handle top 1190 can comprise the handle loops 1188*a,b* but may not comprise the folding tabs 1194*a,b* or define the hand holes 1195*a,b*. In other aspects, the handle top 1190 can comprise the folding tabs 1194*a,b* and define the hand holes 1195*a,b* but may not comprise the handle loops 1188*a,b*.

Figure 12:
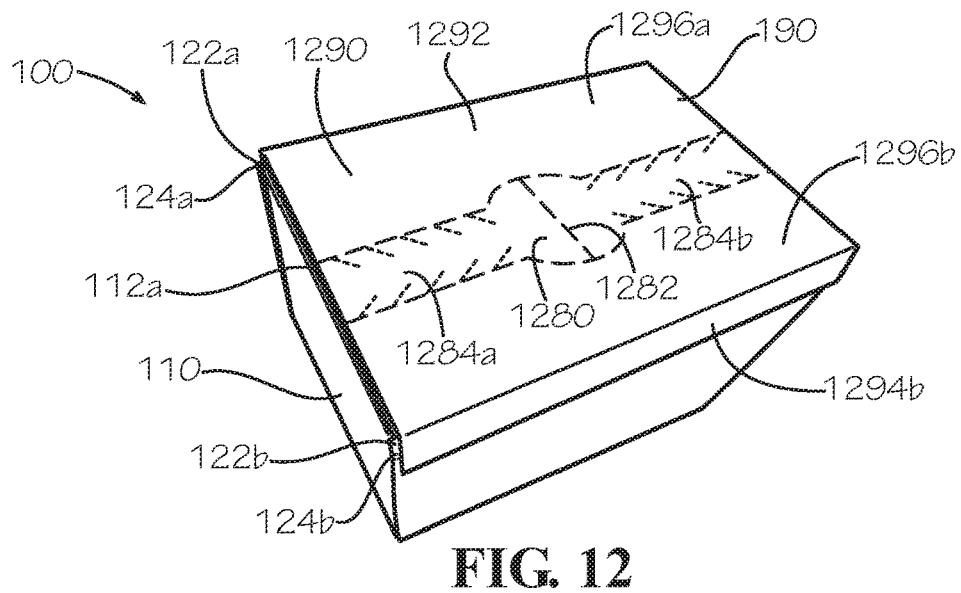
FIG. 12 is a perspective view of the modular box assembly comprising the insulated box of FIG. 1 and another aspect of a box top in accordance with another aspect of the present disclosure.

FIG. 12 is a perspective view of the modular box assembly 100 comprising the insulated box 110 of FIG. 1 and another aspect of a box top 190 in accordance with another aspect of the present disclosure. The box top 190 can be a zipper top 1290. The zipper top 1290 can comprise a top panel 1292 and a pair of side panels 1294, as represented by the side panel 1294*b*. The side panels 1294 can be hingedly attached to the top panel 1292. In the present aspect, the side panels 1294 can overlaps the lips 124*a,b* of the side panels 122*a,b* of the insulated box 110. The side panels 1294 can be attached to the side panels 122*a,b* by an adhesive, such as a glue, mastic, epoxy, cement, double-sided tape, or any other suitable material. In the present aspect, a strip of adhesive (not shown) can be covered by a backing strip (not shown), and the backing strip can be removed to adhere the side panels 1294 to the side panels 122*a,b*. The zipper top 1290 can further comprise a pair of tabs (not shown) which can be inserted into the box cavity 206 (shown in FIG. 2) and positioned adjacent to the side panels 112*a,b* (side panel 112*b* shown in FIG. 1). In other aspects, the tabs can be disposed external to the side panels 112*a,b*, similar to the side panels 1294. The tabs can be attached to the side panels 112*a,b* by the adhesive or the adhesive strip, and the tabs can seal the box cavity 206.

The top panel 1292 can define a zipper 1280 which can be defined by a perforations extending around the zipper 1280. The zipper 1280 can extend across the top panel 1292 and divide the top panel 1292 into a first top panel portion 1296*a* and a second top panel portion 1296*b*. The zipper 1280 can be divided into a first zipper portion 1284*a* and a second zipper portion 1284*b* by a center perforation line 1282. A user can press inwards on the center perforation line 1282 to separate the first zipper portion 1284*a* from the second zipper portion 1284*b*. Each zipper portion 1284*a,b* can then be ripped out of the top panel 1292 along the perforations, thereby detaching the first top panel portion 1296*a* from the second top panel portion 1296*b*. With the top panel portions 1296*a,b* detached, the top panel 1292 can be opened to allow access to contents within the box cavity 206.

Figure 13:
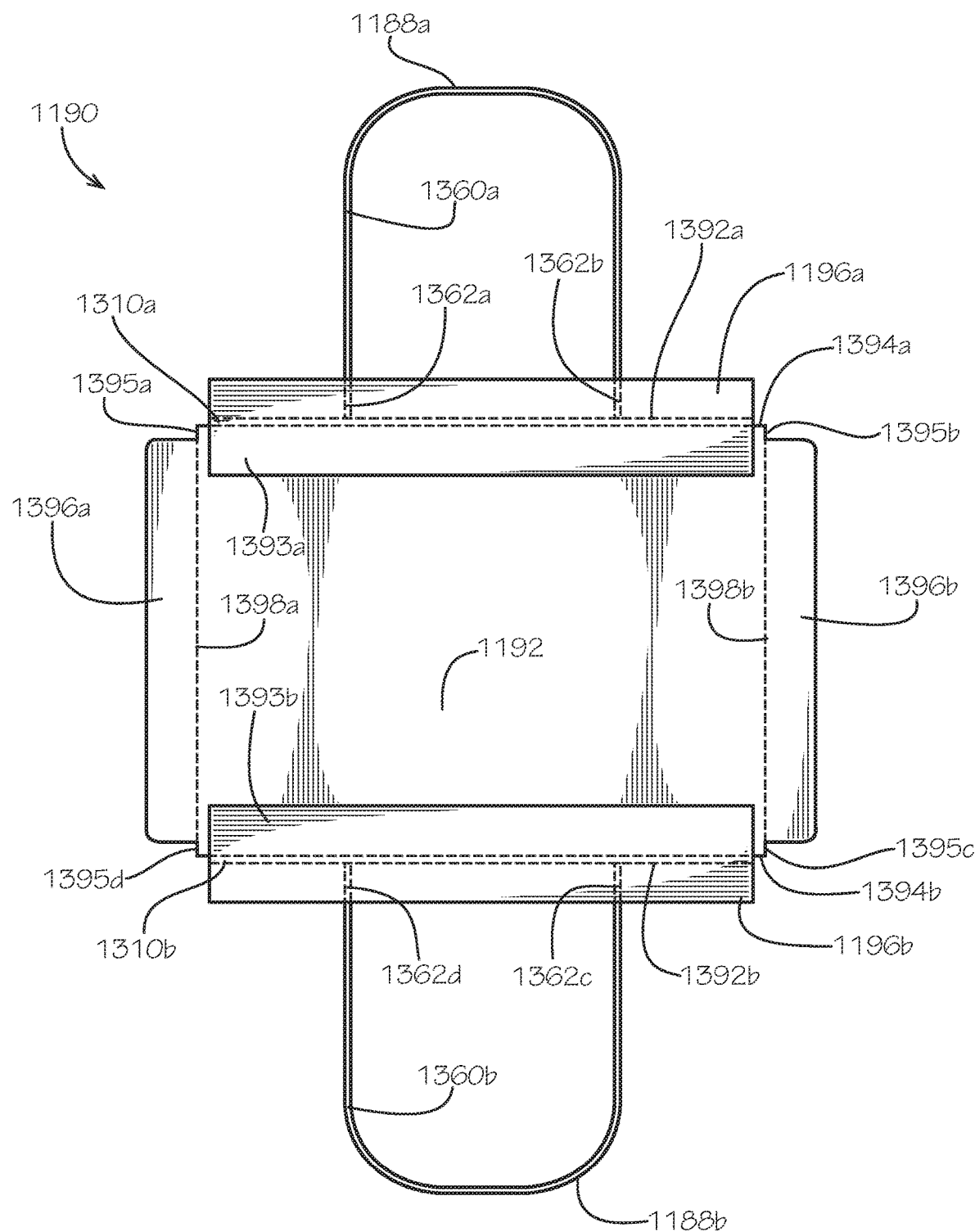
FIG. 13 is a top view of a handle top in accordance with another aspect of the present disclosure.

FIG. 13 is a top view of another aspect of the handle top 1190 in accordance with another aspect of the present disclosure. In the present aspect, the handle top 1190 may not define the folding tabs 1194*a,b* and the hand holes 1195*a,b* of the aspect of the handle top 1190 of FIG. 11. The side panel 1196*a* can be attached at a first side edge 1394*a* of the top panel 1192 by a tape strip 1393*a* and a tape strip 2192*a* (shown in FIG. 21) attached at opposite sides of the side panel 1196*a* and the top panel 1192. An inner edge 1392*a* of the side panel 1196*a* can be spaced apart from the first side edge 1394*a*, and the tape strips 1393*a*,2192*a* can define a living hinge 1310*a* between the side panel 1196*a* and the top panel 1192. The side panel 1196*b* can be attached at a second side edge 1394*b* of the top panel 1192 by a tape strip 1393*b* and a tape strip 2192*b* (shown in FIG. 21) attached at opposite sides of the side panel 1196*b* and the top panel 1192. An inner edge 1392*b* of the side panel 1196*b* can be spaced apart from the second side edge 1394*b*, and the tape strips 1393*b*,2192*b* can define a living hinge 1310*b* between the side panel 1196*b* and the top panel 1192.

The living hinges 1310*a,b* formed by the tape strips 1393*a,b*,2192*a,b* can be more flexible than hinges defined into the top panel 1192, such as by a scored crease line. Hinges defined by a scored crease line can demonstrate positional memory which can resist folding completely in half, thereby preventing the side panels 1196*a,b* from resting flat against the top panel 1192. With the living hinges 1310*a,b*, the side panels 1196*a,b* and handle loops 1188*a,b* can lie flat on the top panel 1192 which can be desirable for storage or stacking, for example. In other aspects, the side panels 1196*a,b* can be attached directly to the top panel 1192 by hinges defined by scored crease lines.

The handle loop 1188*a* can define a handle portion 1360*a* and two base portions 1362*a,b*. The base portions 1362*a,b* of the handle loop 1188*a* can be laminated to the side panel 1196*a* by the tape strips 1393*a*, 2192*a*, thereby attaching the handle loop 1188*a* to the side panel 1196*a*. The handle loop 1188*b* can define a handle portion 1360*b* and two base portions 1362*c,d*. The base portions 1362*c,d* of the handle loop 1188*b* can be laminated to the side panel 1196*b* by the tape strips 1393*b*, 2192*b*, thereby attaching the handle loop 1188*b* to the side panel 1196*b*.

In other aspects, the base portions 1362*a,b,c,d* can be laminated in anchor strips (not shown) which can be laminated to the side panels 1196*a,b* by the tape strips 1393*a,b*,2192*a,b*. The anchor strips can provide increased surface area for the tape strips 1393*a,b*,2192*a,b* to adhere to. In some aspects, the anchor strip can extend between the respective base portion pairs 1362*a,b* and 1362*c,d*; however in other aspect, each base portion 1362*a,b,c,d* can be laminated in a separate anchor strip.

The side tabs 1396*a,b* can be attached to opposite ends of the top panel 1192. The side tab 1396*a* can be attached by a hinge 1398*a*, and the side tab 1396*b* can be attached by a hinge 1398*b*. In the present aspect, hinges 1398*a,b* can be defined by a scored line which can facilitate folding relative to the top panel 1192. The side tab 1396*a* can be inset from the first side edge 1394*a* by a side tab shoulder 1395*a* and inset from the second side edge 1394*b* by a side tab shoulder 1395*d*. The side tab 1395*b* can be inset from the first side edge 1394*a* by a side tab shoulder 1395*b* and inset from the second side edge 1394*b* by a side tab shoulder 1395*c*. The side tabs 1396*a,b* can be inset from the side edges 1394*a,b* to provide clearance for the side tabs 1396*a,b* to fit along the side panels 112*a,b* (shown in FIG. 2) and between the shoulders 222*a,b* (shown in FIG. 2).

In the present aspect, the handle top 1190 can be uninsulated; however in other aspects, the top panel 1192 can be insulated. For example, in some aspects, the top panel 1192 can comprise the insulated panel 140 (shown in FIG. 1) which can be attached to a top or a bottom surface of the top panel 1192, similar to the box top 190 of FIG. 1.

Figure 14:
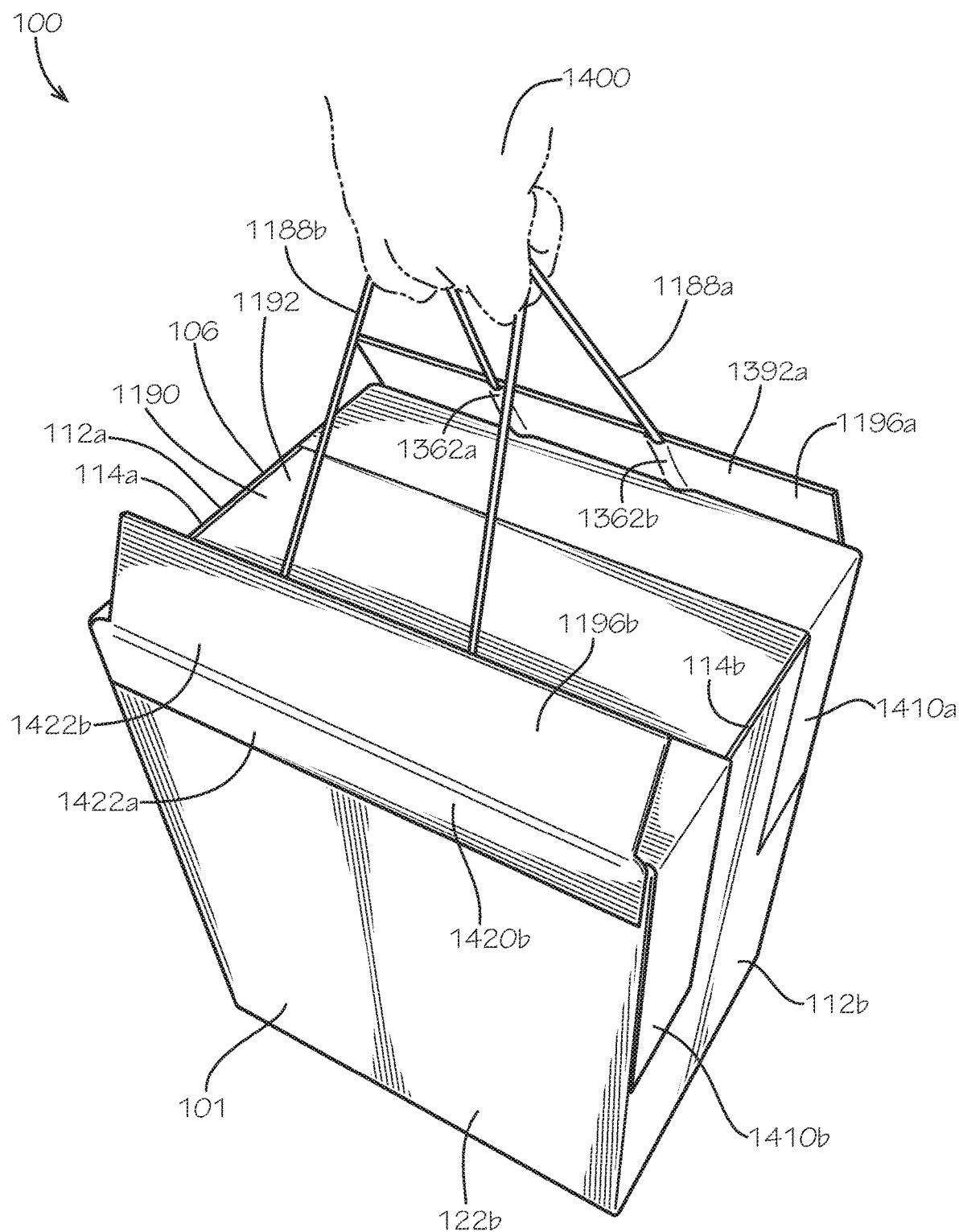
FIG. 14 is a perspective view of another aspect of the modular box assembly in accordance with another aspect of the present disclosure comprising the box of the insulated box of FIG. 1 and the handle top of FIG. 13.

FIG. 14 is a perspective view of another aspect of the modular box assembly 100 comprising the box 101 of FIG. 1 and the handle top 1190 of FIG. 13. The handle top 1190 can be positioned to cover the box opening 106. In the present aspect, the lips 114*a,b*,124*a,b* (lips 124*a,b* shown in FIG. 1) can extend upwards from the shoulders 222*a,b* (shown in FIG. 3) by a height equal to a thickness of the top panel 1192 such that the top panel 1192 rests flush with the lips 114*a,b*,124*a,b*. In other aspects, such as the aspect of FIG. 1, the lips 114*a,b*,124*a,b* can extend upwards beyond the top panel 190 (shown in FIG. 1).

Tape strips 1410*a,b* can extend from the side panel 112*a*, over the top panel 1192, and down the side panel 112*b* to secure the top panel 1192 to the box 101. The tape strip 1410*a* can be positioned proximate to the side panel 1196*a* of the handle top 1190, and the tape strip 1410*b* can be positioned proximate to the side panel 1196*b* of the handle top 1190 to prevent the side panels 1196*a,b* from pulling away from the box opening 106 when the handle loops 1188*a,b* are held by a user 1400.

Additionally tape strips 1420, as represented by tape strip 1420*b*, can attach the side panels 1196*a,b* to the side panels 122*a,b* (side panel 122*a* shown in FIG. 1). As shown, tape strip 1420*b* can define a first portion 1422*a* and a second portion 1422*b*. The first portion 1422*a* of the tape strip 1420*b* can be attached to the side panel 122*b*, and the second portion 1422*b* of the tape strip 1420*b* can be attached to the side panel 1196*b* to prevent the side panel 1196*b* from pulling away from the box opening 106, particularly when the box 101 contains heavy contents. The tape strips 1420 can transfer a load from the handle loops 1188*a,b* to the side panels 122*a,b*. In other aspects, the handle top 1190 can be secured to the box 101 by a different method or a different arrangement of tape strips 1410*a,b*,1420*b*.

Figure 15:
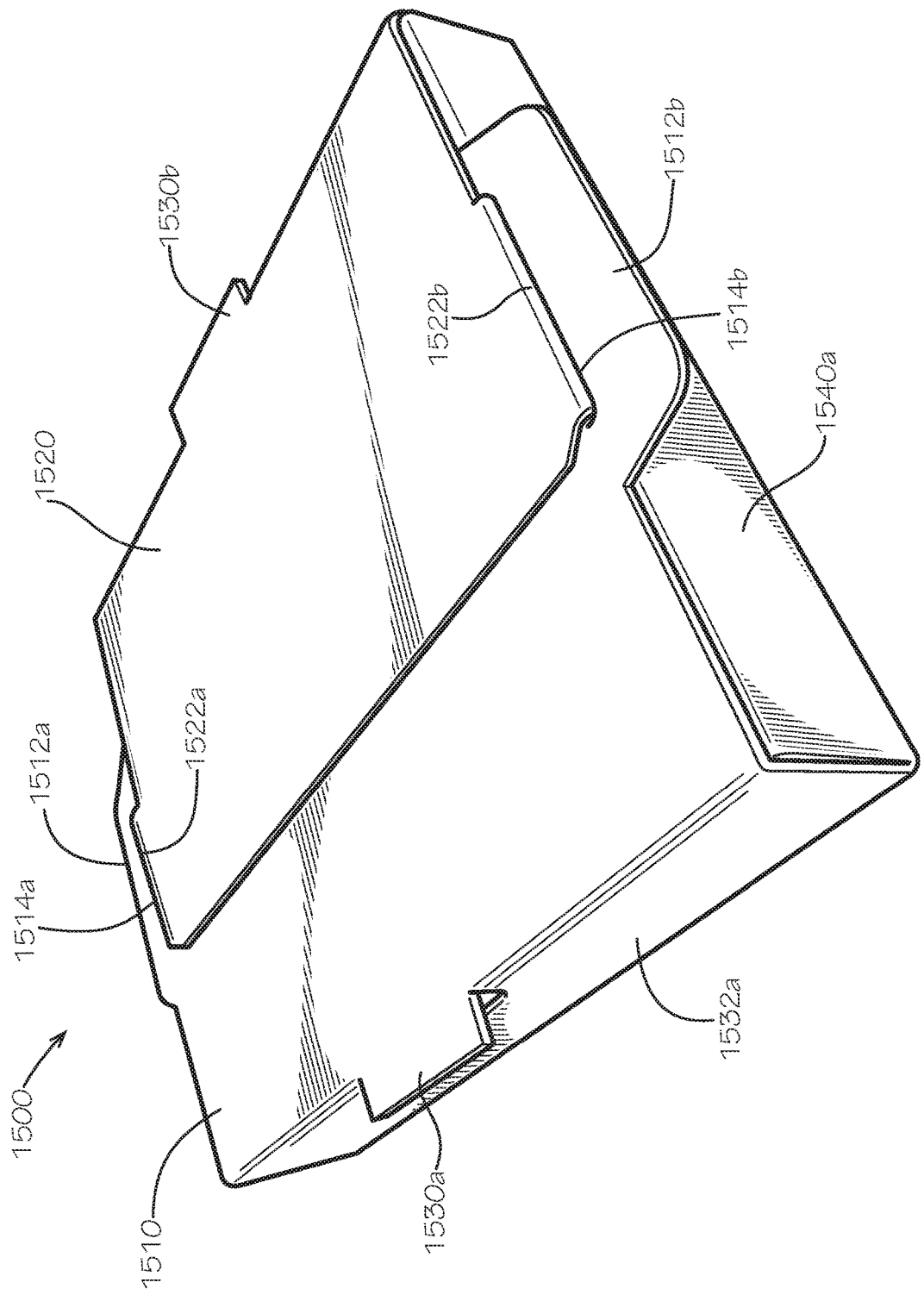
FIG. 15 is a perspective view of an inner box in accordance with one aspect of the present disclosure.
Figure 16:
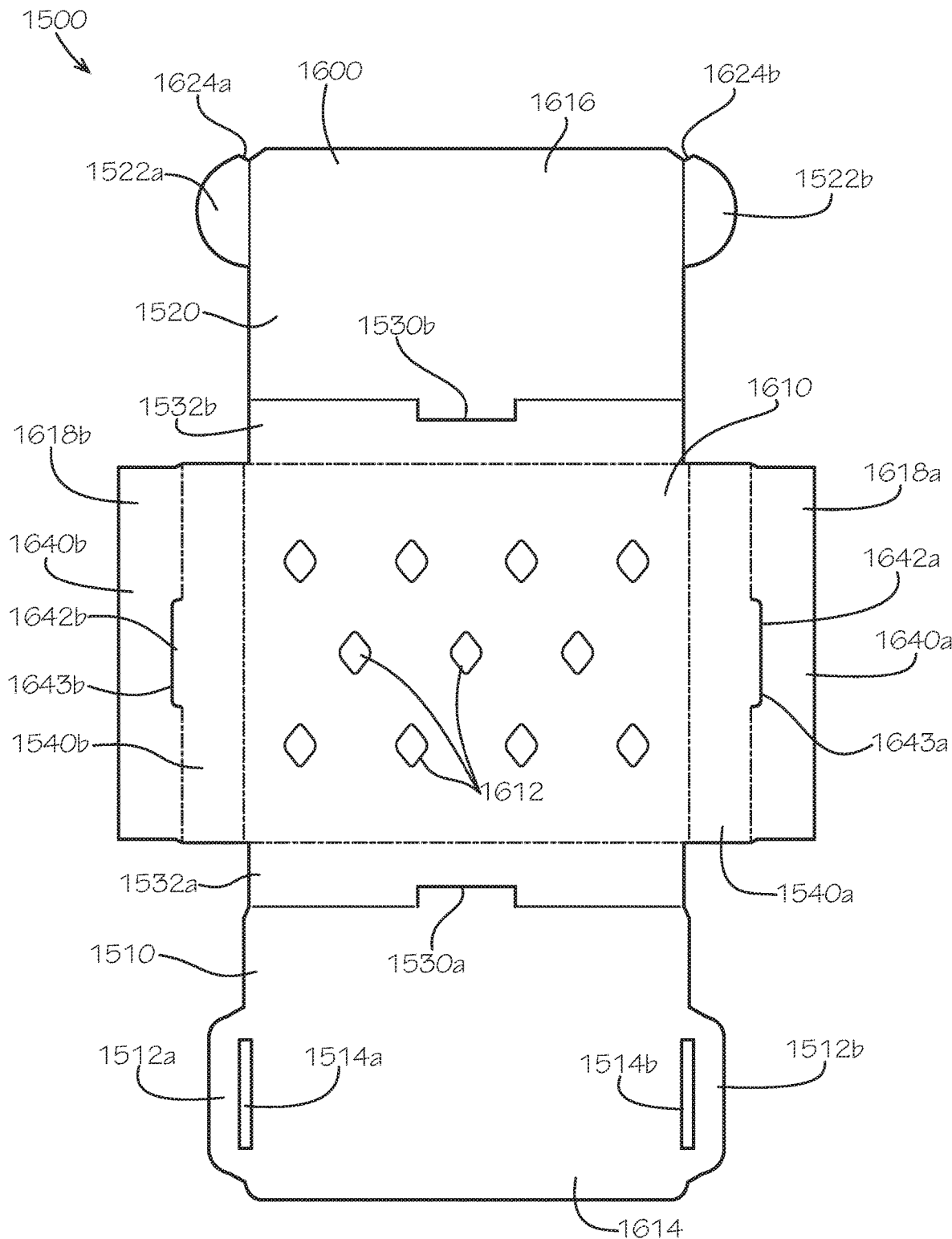
FIG. 16 is a top view of an inner box blank of the inner box of FIG. 15.

FIG. 15 is a perspective view of an inner box 1500, and FIG. 16 is a top view of an inner box blank 1600 of the inner box 1500. The inner box blank 1600 can comprise a center panel 1610, a pair of side flap panels 1618*a,b* attached at opposite ends of the center panel 1610, and a first locking panel 1614 and a second locking panel 1616 disposed at opposite ends of the center panel 1610. Each side flap panel 1618*a,b* can comprise a side subpanel 1540*a,b* respectively attached to the center panel 1610 and a flap subpanel 1640*a,b* disposed opposite from the center panel 1610. Each side subpanel 1540*a,b* can comprise a side tab 1642*a,b*, respectively. Each side tab 1642*a,b* can be cut out from the respective flap subpanel 1640*a,b* by a side tab cutout 1643*a, b*, respectively. Each side tab 1642*a,b* can be configured to extend outwards from the flap subpanel 1640*a,b* when the side tabs 1642*a,b* are folded relative to the flap subpanels 1640*a,b*.

The first locking panel 1614 can comprise a side subpanel 1532*a* attached to the center panel 1610 and a first locking subpanel 1510 disposed opposite from the center panel 1610. The first locking subpanel 1510 can comprise a pair of wings 1512*a,b*, and each wing 1512*a,b* can define a locking slot 1514*a,b*. The first locking subpanel 1510 can also comprise a channel tab 1530*a* which can be cut out from the side subpanel 1532*a*. The channel tab 1530*a* can be configured to extend outwards from the side subpanel 1532*a* when the first locking subpanel 1510 is folded relative to the side subpanel 1532*a*.

The second locking panel 1616 can comprise a side subpanel 1532*b* attached to the center panel 1610 and a second locking subpanel 1520 disposed opposite from the center panel 1610. The second locking subpanel 1520 can comprise a pair of locking tabs 1522*a,b* which can be hingedly attached to the second locking subpanel 1520. A pair of locking notches 1624*a,b* can be defined between the second locking subpanel 1520 and the locking tabs 1522*a,b*. The second locking subpanel 1520 can also comprise a channel tab 1530*b* which can be cut out from the side subpanel 1532*b*. The channel tab 1530*b* can be configured to extend outwards from the side subpanel 1532*b* when the second locking subpanel 1520 is folded relative to the side subpanel 1532*b*.

In an assembled configuration shown in FIG. 15, the side subpanels 1532*a,b*,1540*a,b* can define four sides of the inner box 1500. The center panel 1610 can define a bottom panel of the inner box 1500. The first locking subpanel 1510 and the second locking subpanel 1520 can overlap to define a top panel of the inner box 1500. The side flap panels 1618*a,b* can be folded inwards so that the flap subpanels 1640*a,b* lie flat against the first locking subpanel 1510 and the second locking subpanel 1520. The side tabs 1642*a,b* can engage the locking slots 1514*a,b* of the first locking subpanel 1510 to prevent the side flap panels 1618*a,b* from unfolding. Additionally, locking tabs 1522*a,b* can extend through the locking slots 1514*a,b* and through openings defined by the side tap cutouts 1643*a,b* to prevent the side flap panels 1618*a,b* from unfolding.

With the locking tabs 1522*a,b* extending through the locking slots 1514*a,b*, the first locking subpanel 1510 can be secured to the second locking subpanel 1520. The locking notches 1624*a,b* can engage the locking slots 1514*a,b* to prevent withdrawal of the locking tabs 1522*a,b* from the locking slots 1514*a,b*. The second locking subpanel 1520 can be positioned overlapping the first locking subpanel 1510, and the locking tabs 1522*a,b* can be inserted through the locking slots 1514*a,b* to secure the first locking subpanel 1510 to the second locking subpanel 1520.

The inner box 1500 can contain a temperature maintaining material 2110 (shown in FIG. 21) within a cavity 2108 (shown in FIG. 21) of the inner box 1500, and the inner box 1500 can be configured to secure the temperature maintaining material 2110 within the insulated box 110. In some aspects, the inner box 1500 can contain a cooling material, such as carbon dioxide dry ice for example and without limitation, configured to keep contents of the insulated box 110 cold or frozen. In such aspects, as the dry ice sublimes into carbon dioxide gas, the cold carbon dioxide gas can pass downwards from the inner box 1500 through a plurality of vents 1612 defined by the center panel 1610, which can be oriented as the bottom panel. The inner box 1500 can prevent a user from making direct contact with the dry ice by which can cause burns to bare skin. In other aspects, the inner box 1500 can contain a different temperature maintaining material configured to cool the insulated box 110. For example, in some aspects, the temperature maintaining material 2110 can be a mixture of materials configured to undergo a controlled endothermic reaction. For example and without limitation, the temperature maintaining material 2110 can comprise water, ammonium nitrate, calcium ammonium nitrate, and/or urea in a container which can undergo an endothermic reaction as the water dissolves solid material in the container, as commonly used in so-called "instant ice packs". In such aspects, the temperature maintaining material 2110 can absorb heat through the endothermic reaction.

In other aspects, the temperature maintaining material 2110 can be a heat emitting material configured to keep contents of the insulated box 110 warm or hot. For example and without limitation, the inner box 1500 can contain heat packs which emit residual heat from a heated material defining a high specific heat capacity. For example, a heated water bottle or bag can emit residual heat over time. In other aspects, the inner box 1500 can contain a heat emitting material which can undergo a controlled exothermic reaction to produce heat within the insulated box 110. One example can include a pouch of supersaturated crystallizing solution, such as sodium acetate for example and without limitation, which release heat as crystallization occurs as seen in some hand warmers. Another example can be a mixture which is commonly used in hand warmers which can comprise cellulose, iron, activated carbon, vermiculite, and/or salt which can release heat as oxygen oxidizes the iron as seen in other hand warmers. In such aspects, the temperature maintaining material 2110 can produce heat through the exothermic reaction.

FIG. 17 is a perspective view of another aspect of the insulated box 110 in accordance with another aspect of the present disclosure. In the present aspect, the insulated box 110 can comprise the insulation wrap 1730 configured to wrap or extend around the side panels 112*a,b*,122*a,b* of the box 101. In the present aspect, the insulation wrap 1730 may not cover the bottom end 104 of the box 101; however, in other aspects, the insulation wrap 1730 can cover the bottom end 104 as well. The insulation wrap 1730 can comprise an insulation batt 2051 (shown in FIG. 20) which can be thicker than the insulation batt 350 (shown in FIG. 3) of the insulation panels 130*a-d* (shown in FIG. 3). In some aspects, the insulation batt 2051 can be 2" in thickness or greater.

In the present aspect, the insulation wrap 1730 can be defined by one insulated panel 510 (shown in FIG. 5); however, in other aspects, the insulation wrap 1730 can comprise a plurality of insulated panels 510 attached together to encircle the box 101. In other aspects, the insulation wrap 1730 can be formed differently from the insulated panels 510. In the present aspect, opposite ends of the insulation wrap 1730 can be attached together to form a seam 1732 which secures the insulation wrap 1730 around the box 101. In the present aspect, the insulation wrap 1730 can fit snuggly around the box 101, and friction between the insulation wrap 1730 and the box 101 can prevent the insulation wrap 1730 from slipping off of the box 101. In other aspects, the insulation wrap 1730 can be attached to the box 101 through a mechanism such as staples, an adhesive, tape, hook-and-loop fasteners, or any other suitable attachment mechanism.

FIG. 18 is a perspective view of an outer sleeve 1800 of the modular box assembly 100. The outer sleeve 1800 can be configured to fit over the insulated box 110 of FIG. 1, FIG. 17, or any other aspect. With the outer sleeve 1800 fit over the insulated box 110, the insulation wrap 1730 (shown in FIG. 17) or insulated panel 130*a-d* (shown in FIG. 3) can be positioned between the box 101 and the outer sleeve 1800. The outer sleeve 1800 can comprise four sides 1812*a,b*, 1822*a,b* configured to align with the side panels 112*a,b*, 122*a,b*, respectively. In the present aspect, the side 1822*a* can comprise a pair of side subpanels 1824*a,b* joined by a seam 1830. In other aspects, the seam 1830 can be positioned at a corner of the outer sleeve 1800.

In the present aspect, the outer sleeve 1800 can comprise a rigid material, such as corrugated cardboard for example and without limitation. The outer sleeve 1800 can provide protection to the insulated box 110, particularly the insulated panels 130*a-d* or insulation wrap 1730 of the insulated box 110. In the present aspect, the insulated panels 130*a-d* and the insulation wrap 1730 can each comprise sheets of material, such as kraft paper for example and without limitation, and the outer sleeve 1800 can prevent the sheets of material from being damaged or torn during shipping or handling of the modular box assembly 100. The outer sleeve 1800 can also provide substantially flat surfaces which can define graphics or indicia, such as logos, advertisements, decorations, indications of the contents, handling warnings such as "Fragile" or "This Side Up", or any other indicia for example and without limitation. The outer sleeve 1800 can also provide additional insulation value to the insulated box 110.

Figure 19:
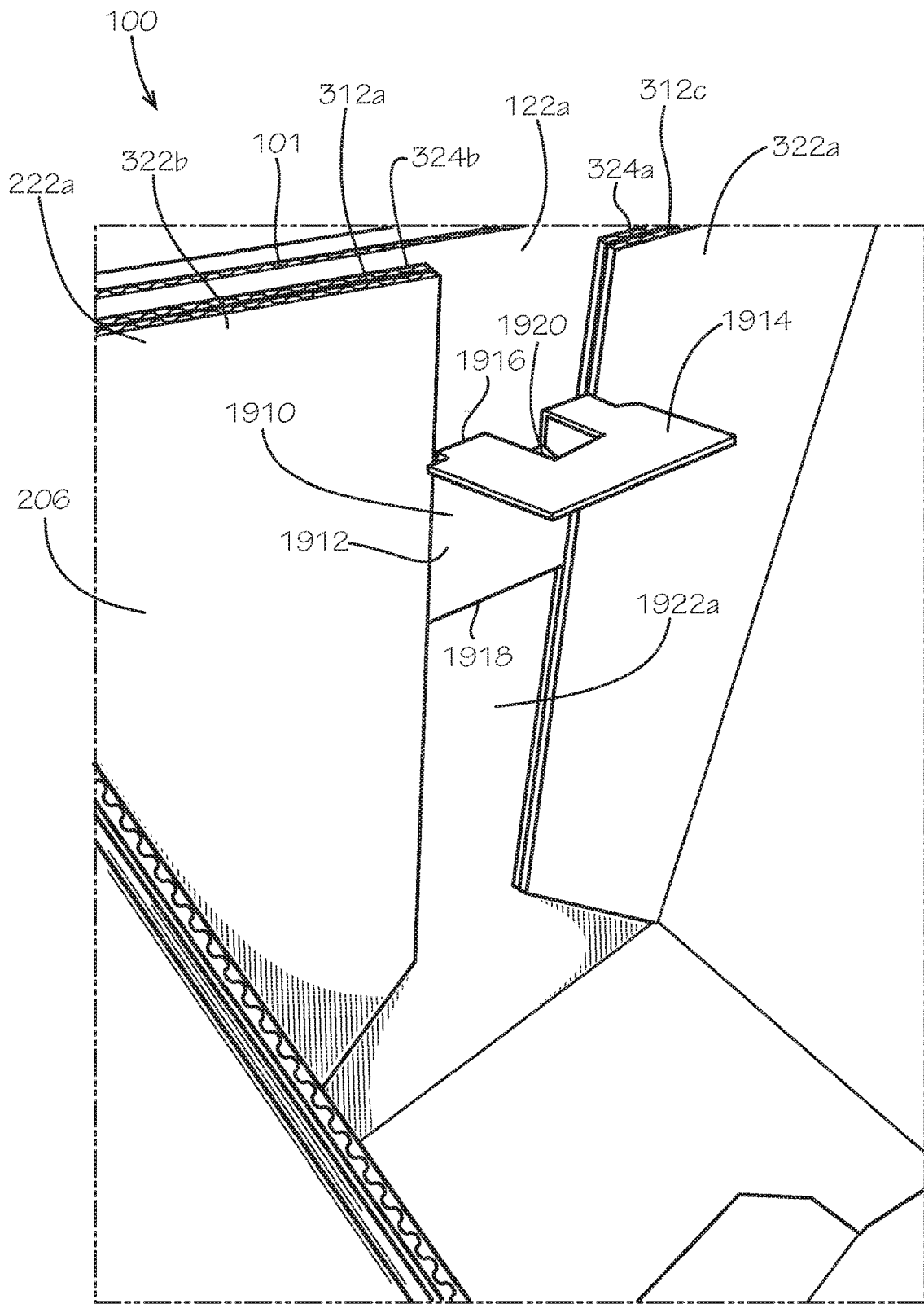
FIG. 19 is a perspective view of a support bracket of the modular box assembly in accordance with another aspect of the present disclosure.

FIG. 19 is a perspective view of a support bracket 1910 of the modular box assembly 100 mounted within the box cavity 206 of the box 101. The support bracket 1910 can be configured to support items within the box cavity 206 such as the insulated cavity panel 430, the inner box 1500, the divider panel 2230 (shown in FIG. 22), or any other item, partition, insulation, or barrier. As demonstrated by the shoulder 222*a*, each shoulder 222*a,b* (shoulder 222*b* shown in FIG. 20) can define a shoulder channel 1922*a,b* (shoulder channel 1922*b* shown in FIG. 20). The shoulder channel 1922*a* can be representative of both shoulder channels 1922*a,b*. The shoulder channel 1922*a* can be defined by the side panel 122*a* and the two sub-shoulders 322*a,b* of the shoulder 222*a*.

The bracket 1910 can comprise a channel tab 1912 and a support shelf 1914, and the channel tab 1912 can be folded to be substantially perpendicular to the support shelf 1914. In the aspect shown, the bracket 1910 can further comprise a brace 1920 which can extend between the support shelf 1914 and the channel tab 1912. The brace 1920 can be folded inward between the channel tab 1912 and the support shelf 1914 to prevent the support shelf 1914 from folding in half towards the channel tab 1912 when a downward load is applied to the support shelf 1914.

The channel tab 1912 can be configured to frictionally engage the sub-shoulders 322*a,b* to secure the bracket 1910 within the shoulder channel 1922*a*. The channel tab 1912 can define a top end 1916 and a bottom end 1918. The support shelf 1914 can be attached to the channel tab 1912 at the top end 1916 in the present aspect. In some aspects, the channel tab 1912 can taper from the top end 1916 to the bottom end 1918. The taper can ensure that the bottom end 1918 can easily be inserted into the shoulder channel 1922*a* while still providing sufficient friction between the sub-shoulders 322*a,b* and the channel tab 1912 to secure the channel tab 1912 within the shoulder channel 1922*a*.

In the present aspect, the first wings 312*a,c* can be substantially flush with the second wings 324*a,b* of the sub-shoulders 322*a,b*. In other aspects, the first wings 312*a,c* can extend further into the support channel 1922*a* than the second wings 324*a,b* to provide a groove (not shown) between the first wing 312*a*, the second wing 324*b*, and the side panel 122*a* and another groove between the first wing 312*c*, the second wing 324*b*, and the side panel 122*a*. In such aspects, the grooves can capture the channel tab 1912 such that a portion of the channel tab 1912 is positioned between the first wing 312*a* and the side panel 122*a* and another portion of the channel tab 1912 is positioned between the first wing 312*c* and the side panel 122*a*. By capturing the channel tab 1912, the grooves can prevent the bracket 1910 from being pulled outwards from the shoulder channel 1922*a* in a direction away from the side panel 122*a*.

Figure 20:
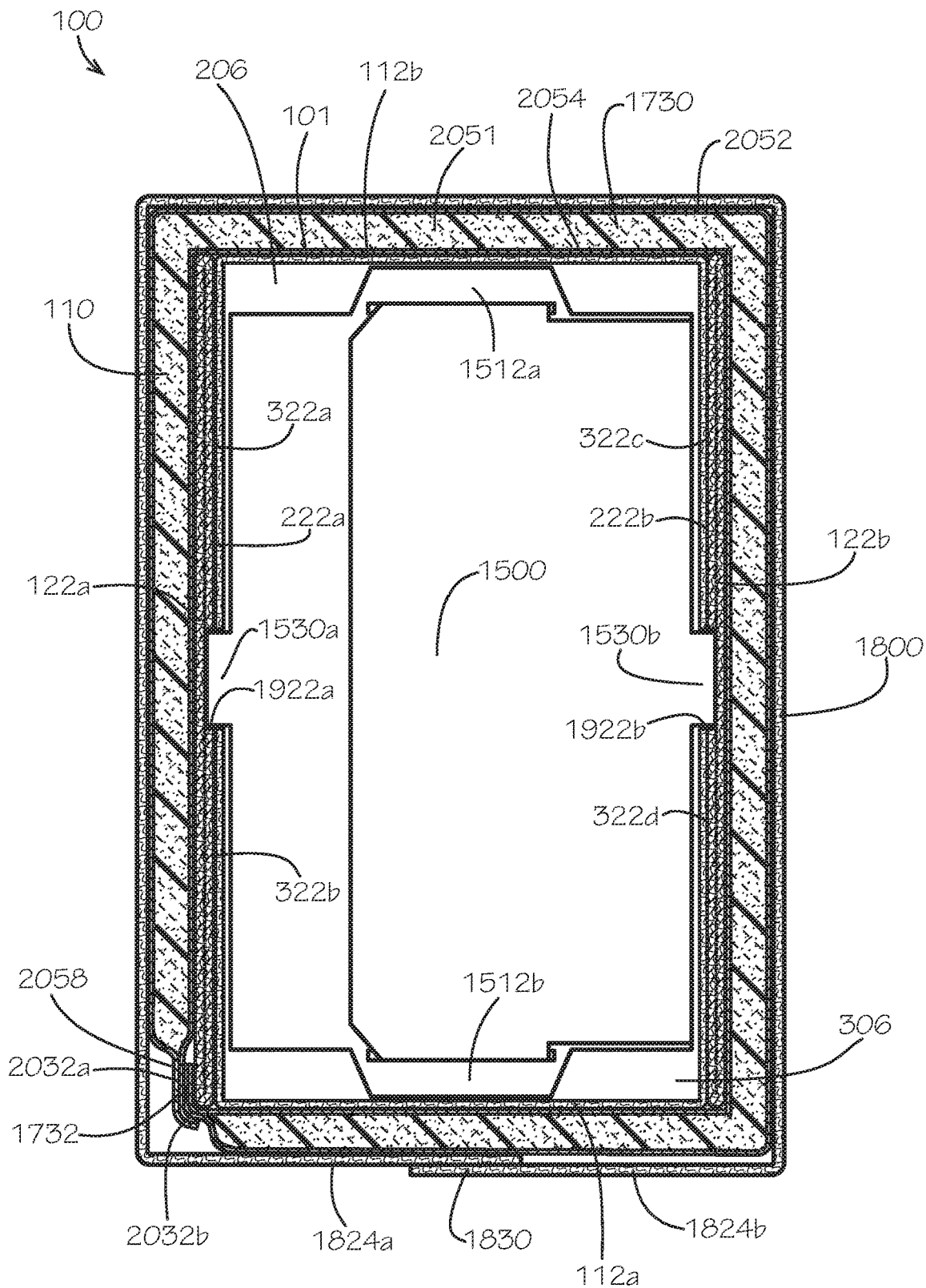
FIG. 20 is a downward cross-section of another aspect of the modular box assembly comprising the inner box of FIG. 15, the insulated box of FIG. 17, and the outer sleeve of FIG. 18 in accordance with another aspect of the present disclosure.

FIG. 20 is a downward cross-section of another aspect of the modular box assembly 100. In the present aspect, the modular box assembly 100 can comprise the insulated box 110 of FIG. 17 which can be nested within the outer sleeve 1800 of FIG. 18. The inner box 1500 of FIG. 15 can be disposed within the box cavity 206 of the box 101 of the insulated box 110. The aspect of FIG. 20 is but one possible combination of elements which demonstrates the modularity and flexibility of the modular box assembly 100.

The insulation wrap 1730 of the insulated box 110 can be positioned between the box 101 and the outer sleeve 1800 in the present aspect. The insulation wrap 1730 can comprise the insulation batt 2051 which can be encapsulated between a first sheet 2052 and a second sheet 2054 of the insulation wrap 1730 by a border 2058. The border 2058 can attach the first sheet 2052 to the second sheet 2054, and the border 2058 can fully enclose the insulation batt 2051. A first border portion 2032*a* of the border 2058 can be attached to a second border portion 2032*b* of the border 2058 to form the seam 1732 which can secure the insulation wrap 1730 around the box 101. The first border portion 2032a and the second border portion 2032b can be defined at opposite ends of the insulation wrap 1730.

In the present aspect, the first sheet 2052 can be in facing contact with the outer sleeve 1800, and the second sheet 2054 can be in facing contact with the box 101. In some aspects, the second sheet 2054 of the second border portion 2032b can be attached to the box 101, such as with an adhesive, and then the first border portion 2032a can be attached to the second border portion 2032b, such as with an adhesive, to secure the insulation wrap 1730 around the box 101.

The inner box 1500 can be sized to fit closely within the box cavity 206. The wings 1512a,b can contact the side panels 112a,b. The channel tabs 1530a,b can extend outwards from the inner box 1500 and into the shoulder channels 1922a,b. The channel tabs 1530a,b can be sized and configured to frictionally engage the shoulder channels 1922a,b to secure and suspend the inner box 1500 within the box cavity 206, as further shown in FIG. 21.

FIG. 21 is a side cross-section of the modular box assembly 100 of FIG. 20, further comprising the handle top 1190 of FIG. 11. As described above, the inner box 1500 can be suspended within the box cavity 206, and the inner box 1500 can divide the box cavity 206 into a first sub-compartment 2106a and a second sub-compartment 2106b. In aspects in which the temperature maintaining material 2110 can be a cooling material, such as dry ice, the first sub-compartment 2106a can contain frozen goods, and the second sub-compartment 2106b can contain chilled goods. Dense, cold air from the temperature maintaining material 2110 can descend downwards from the temperature maintaining material 2110 through the vent holes 1612 (shown in FIG. 16) into the first sub-compartment 2106a to maintain a colder temperature in the first sub-compartment 2106a compared to the second sub-compartment 2106b.

In aspects in which the temperature maintaining material 2110 can be a heat emitting material, the second sub-compartment 2106b can maintain a temperature higher than the first sub-compartment 2106a due to rising hot air from the temperature maintaining material 2110. In such aspects, the inner box 1500 can be turned upside down with the center panel 1610 facing upwards to promote convection through the vent holes 1612 within the second sub-compartment 2106b. In some aspects, the insulated cavity panel 430 (shown in FIG. 4) can be placed beneath the handle top 1190 to resist heat transfer through the handle top 1190.

As shown, a portion of the first tape strip 1393a can attach to a portion of the second tape strip 2192a between the side panel 1196a and the top panel 1192 to form the living hinge 1310a of the handle top 1190. A portion of the first tape strip 1393b can attach to a portion of the second tape strip 2192b between the side panel 1196b and the top panel 1192 to form the living hinge 1310b.

In the present aspect, the modular box assembly 100 can further comprise the bottom insulated panel 2130. The bottom insulated panel 2130 can comprise a sheet 2152, a board 2154, and an insulation batt 2150. In the present aspect, the insulation batt 2150 can be encapsulated and laminated to the board 2154 by the sheet 2152. The sheet 2152 can comprise a thin, flexible material such as a film, a paper, a fabric, a mesh, or any other suitable material. The board 2154 can comprise a rigid material, such as cardboard, a plastic, a metal, a rigid foam, or any other suitable material. The bottom insulated panel 2130 can rest atop the bottom panel 306 of the box 101, and the bottom insulated panel 2130 can provide insulation for the bottom end 104 of the box 101.

The rigidity of the board 2154 can be desirable to prevent collapse of the box 101 or insulated box 110 during shipping or handling of the box 101 or insulated box 110. Collapse of one aspect of the insulated box 110 is demonstrated in FIG. 8. Inadvertent or accidental collapse of the box 101 or insulated box 110 during shipping or handling can crush or damage the contents of the box 101 or insulated box 110. By placing the board 2154 against the bottom panel 306, the rigidity of the board 2154 can prevent folding of the bottom panel 306 along the center fold line 382 (shown in FIG. 7), the corner fold lines 384a-d (shown in FIG. 7), and the V-shaped fold lines 386a-f (shown in FIG. 7), thereby preventing collapse of the insulated box 110 or box 101. In some applications, the board 2154, without the insulation batt 2150 and sheet 2152, can be placed atop the bottom panel 306 to prevent collapse as shown in FIG. 22.

Figure 22:
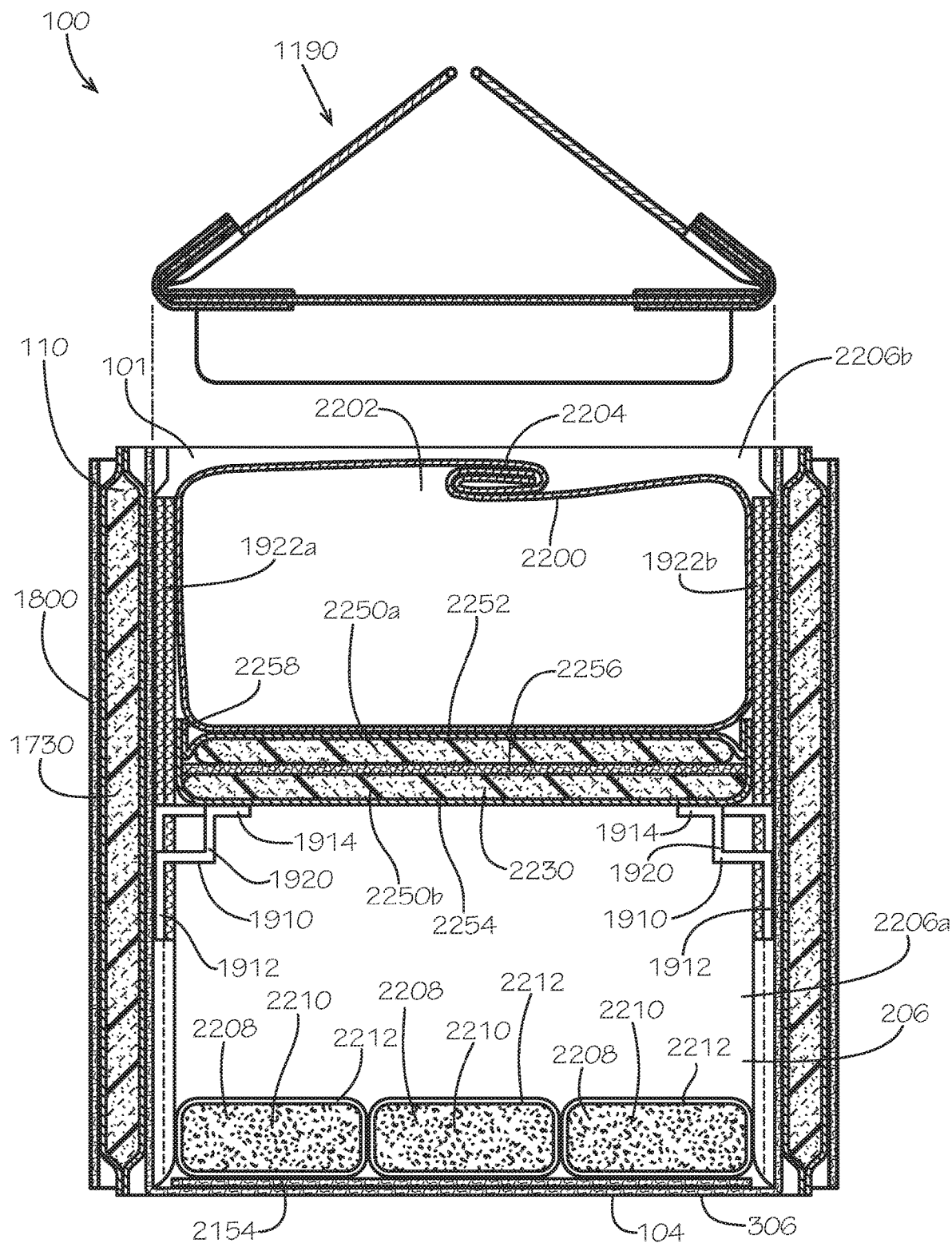
FIG. 22 is a side cross-section of another aspect of the modular box assembly comprising the insulated box of FIG. 17, the outer sleeve of FIG. 18, the support bracket of FIG. 19, a divider panel, and temperature maintaining packs in accordance with another aspect of the present disclosure.

FIG. 22 is a side cross-section of another aspect of the modular box assembly 100. In the present aspect, the modular box assembly 100 can comprise the handle top 1190 and the insulated box 110 of FIG. 17 which can be nested within the outer sleeve 1800 of FIG. 18. The modular box assembly 100 can further comprise the support brackets 1910 of FIG. 19 which can engage the shoulder channels 1922a,b of the box 101. The modular box assembly 100 can further comprise the divider panel 2230 which can be suspended within the box cavity 206 by the support brackets 1910.

The divider panel 2230 can comprise a first sheet 2252, a second sheet 2254, a pair of insulation batts 2250a,b, and a board 2256. In the present aspect, the board 2256 can be a rigid board; however in other aspects, the board 2256 can be a flexible or resilient board. The board 2256 can be positioned between the insulation batts 2250a,b, and the board 2256 and the insulation batts 2250a,b can be encapsulated between the first sheet 2252 and the second sheet 2254. The first sheet 2252 and the second sheet 2254 can be joined by a border 2258 which can extend around the divider panel 2230 to fully enclose the board 2256 and insulation batts 2250a,b. The divider panel 2230 can divide the box cavity 206 into a first sub-compartment 2206a and a second sub-compartment 2206b, and the divider panel 2230 can insulate the first sub-compartment 2206a from the second sub-compartment 2206b. The border 2258 can also form a seal with the box 101 to isolate the first sub-compartment 2206a from the second sub-compartment 2206b. In other aspects, the divider panel 2230 may not be suspended by the support brackets 1910 but can instead rest upon contents of the first sub-compartment 2206a, and the compressible nature of the lower insulation batt 2250b can allow the divider panel 2230 to conform to the contents of the first sub-compartment 2206a. The divider panel 2230 can provide increased rigidity compared to the insulated cavity panel 430 (shown in FIG. 4) which can be desirable for applications in which the divider panel 2230 supports a load.

In the present aspect, the modular box assembly 100 can further comprise a bag 2200 disposed within the second sub-compartment 2206b. In other aspects, the bag 2200 can be disposed within the first sub-compartment 2206a, or the bag 2200 can fill the box cavity 206 in undivided applications. In the present aspect, the bag 2200 can be sealed by a roll top seal 2204 to enclose a bag cavity 2202. In the present aspect, the bag 2200 can comprise a thermally reflective material or radiant barrier, such as a metal foil or a metalized plastic such as mylar, for example and without limitation. The bag 2200 can be configured to maintain higher or lower temperatures within the bag cavity 2202 relative to a temperature within the box cavity 206.

The modular box assembly 100 can further comprise temperature maintaining packs 2208 which can each comprise a temperature maintaining material 2210 enclosed in a container 2212. The temperature maintaining material 2210 can be similar to the temperature maintaining material 2110 (shown in FIG. 21), or the temperature maintaining material 2210 can comprise a different material than the temperature maintaining material 2110. The container 2212 can be a soft container such as a plastic bag, foil pack, fabric sack, or any other suitable soft container, or the container 2212 can be a hard container such as a plastic bottle, metal case, or any other suitable hard container.

The temperature maintaining packs 2208 can be configured to maintain higher or lower temperatures within the box cavity relative to an ambient temperature outside of the box cavity 206. For example, in cooling applications, the temperature maintaining material 2210 can absorb heat through a phase change such as melting ice or subliming dry ice, an endothermic reaction such as dissolving solid solute within a solvent, or warming of a chilled material, heat sink, or cold plate defining a temperature below the ambient temperature. In heating applications, the temperature maintaining material 2210 can release heat through a phase change such as condensation or solidification, an exothermic reaction such as oxidation or solid crystal nucleation in a supersaturated solution, or cooling of a heated material or heat source defining a temperature above the ambient temperature.

The temperature maintaining packs 2208 can be sized and shaped to cover the board 2154 or the bottom panel 306 of the box 101, similar to bricks, to form a first layer. In other aspects, an insulated panel, such as the insulated cavity panel 430 or the bottom insulated panel 2130 can be placed between the temperature maintaining packs 2208 and the bottom panel 306 to reduce heat transfer through the bottom end 104 of the box 101. Contents of the box 101 can be placed atop the temperature maintaining packs 2208, or in some aspects, another layer of temperature maintaining packs 2208 can be placed atop the first layer of temperature maintaining packs 2208 to provide increased heating or cooling time for contents of the box cavity 206. The temperature maintaining packs 2208 can be placed in both or either of the first sub-compartment 2206a and the second sub-compartment 2206b or in undivided applications, the temperature maintaining packs 2208 can be placed anywhere within the box cavity 206. In some aspects, the temperature maintaining packs 2208 can be used in the same box cavity 206 with the inner box 1500 and the temperature maintaining material 2110, for example and without limitation, to provide increased heating or cooling time for contents of the box cavity 260.

Figure 23:
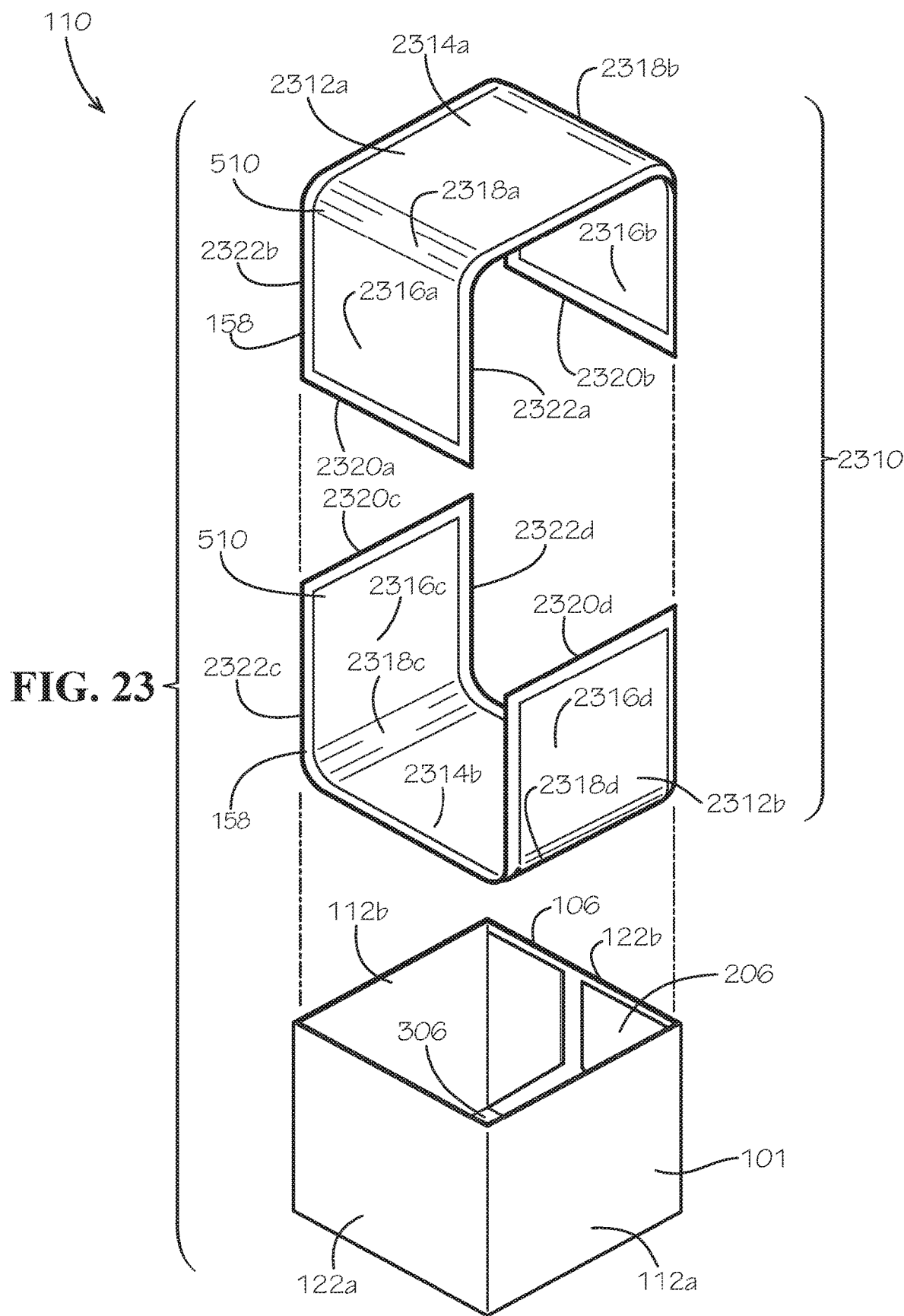
FIG. 23 is an exploded perspective view of another aspect of the insulated box in accordance with another aspect of the present disclosure.

FIG. 23 is an exploded perspective view of another aspect of the insulated box 110 in accordance with another aspect of the present disclosure. The insulated box 110 of the present aspect can be an internally insulated box. The insulated box 110 can comprise an A-B liner 2310 which can comprise a first liner 2312a and a second liner 2312b. The first liner 2312a and the second liner 2312b can each be defined by insulated panels 510 which can each be folded into a C-shape.

The first liner 2312a can define a center panel 2314a disposed between a first side panel 2316a and a second side panel 2316b. A border 158 of the first liner 2312a can comprise a first end border portion 2320a defined by the first side panel 2316a and a second end border portion 2320b defined by the second side panel 2316b and disposed opposite from the first end portion 2320a. A fold 2318a can be defined between the first side panel 2316a and the center panel 2314a, and a fold 2318b can be defined between the second side panel 2316b and the center panel 2314a. A pair of side border portions 2322a,b of the border 158 can be defined by the side panels 2316a,b and the center panel 2314a, and the side border portions 2322a,b can extend between the respective end border portions 2320a,b.

The second liner 2312b can define a center panel 2314b disposed between a first side panel 2316c and a second side panel 2316d. A border 158 of the second liner 2312b can comprise a first end border portion 2320c defined by the first side panel 2316c and a second end border portion 2320d defined by the second side panel 2316d and disposed opposite from the first end border portion 2320c. A fold 2318c can be defined between the first side panel 2316c and the center panel 2314b, and a fold 2318d can be defined between the second side panel 2316d and the center panel 2314b. A pair of side border portions 2322c,d of the border 158 can be defined by the side panels 2316c,d and the center panel 2314b, and the side border portions 2322c,d can extend between the respective end border portions 2320c,d.

The liners 2312a,b can fit together to define a substantially cubic or rectangular prism shape with an inner insulated cavity (not shown) defined by the A-B liner 2310. The end border portions 2320a,b of the border 158 of the first liner 2312a can contact the center panel 2314b of the second liner 2312b, and the end border portions 2320c,d of the border 158 of the second liner 2312b can contact the center panel 2314a of the first liner 2312a. The side border portions 2322c,d of the border 158 of the second liner 2312b can each extend around the sides of a different one of the side panels 2316a,b. The side border portions 2322a,b of the border 158 of the first liner 2312a can each extend around the sides of a different one of the side panels 2316c,d.

In the present aspect, the A-B liner 2310 can be oriented so that the center panel 2314a of the first liner 2312a covers the box opening 106 of the box 101, the center panel 2314b of the second liner 2312b covers the bottom panel 306, and the side panels 2316a,b,c,d cover the side panels 112a,b, 122a,b of the box 101. In the present aspect, the side panels 2316a,b can cover the side panels 122a,b, and the side panels 2316c,d can cover the side panels 112a,b. In other aspects, the side panels 2316a,b can cover the side panels 112a,b, and the side panels 2316c,d can cover the side panels 122a,b.

In still other aspects, the A-B liner 2310 can be orientated such that the first side panel 2316a of the first liner 2312a covers the box opening 106, and the second side panel 2316b of the first liner 2312a covers the bottom panel 306 of the box 101. The side panels 112a,b,122a,b of the box 101 can be covered by the second liner 2312b and the center panel 2314a of the first liner 2312a. Such a configuration can be desirable because the first side panel 2316a can act as a lid which can be folded about the fold 2318a to open and close the inner insulated cavity of the A-B Liner 2310 without requiring removal of either of the liners 2312a,b from the box 101.

In the present aspect, the sheets 352,354,2052,2054,2152, 2252,2254 can comprise paper, such as kraft paper; however, in other embodiments, the sheets can comprise posterboard, cardboard, plastic sheeting, cellulose film, cloth, or any other suitable material. In some aspects, the sheets can comprise a water-proof or water-resistant material, such as water-proof paper. In some aspects, a one of the sheets 352,354,2052,2054,2152,2252,2254 of the modular box assembly 100 can comprised a material different from another of the sheets 352,354,2052,2054,2152,2252,2254. In the present aspect, the box 101 can comprise a paper fiber-based material such as corrugated cardboard or poster board; however, the box 101 can be comprised of any suitable rigid board material such as wood, plastic, metal, or any other material.

The insulation batts 350,2051,2150,2250*a,b* can comprise paper or other paper fiber materials; however, in other aspects, the insulation batts can comprise cotton, foam, rubber, plastics, fiberglass, mineral wool, or any other flexible insulation material. In the present application, the insulation batts can be repulpable. In the present aspect, the modular box assembly 100 can be 100% recyclable. In the present aspect, the modular box assembly 100 can be single-stream recyclable wherein all materials comprised by the modular box assembly 100 can be recycled by a single processing train without requiring separation of any materials or components of the modular box assembly 100. In the present aspect, the modular box assembly 100 can be compostable. In the present aspect, the modular box assembly 100 can be repulpable. In the present aspect, the modular box assembly 100 and each of the insulated box 110, the top panel 190, the insulated panels 130*a-d*,430,140,510, the insulation wrap 1730, the bottom insulated panel 2130, the divider panel 2230, and the liners 2312*a,b* can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. which is hereby incorporated in its entirety. In the present aspect, the modular box assembly 100 and each of the insulated box 110, the top panel 190, the insulated panels 130*a-d*,430,140,510, the insulation wrap 1730, the bottom insulated panel 2130, the divider panel 2230, and the liners 2312*a,b* can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill.

The insulation batt 350,2051,2150,2250*a,b* can comprise fibers, such as loose ground-up fibrous cellulous paper or ground-up cardboard material. The fibers in the fibrous paper or cellulous material can be interlocked by methods such a needling or by use of a melted binder fiber, a bioresorbable adhesive, recycling-compatible, water soluble adhesive, plant based (sugar or pectin) adhesive from for example sugar beet, corn, or sugar cane, or starch. The ground up cellulous paper or cardboard material is formed into a slab or batt by passing the continuous layer of material between a pair of tapered edge plates which forms the batt width. The thickness of the uncompressed batt can be defined by an upper rake or block. This material can have its thickness and density adjusted using a compression roller which can apply heat.

According to the present teachings, a method of forming an insulated box is disclosed. The method includes forming cellulous fibers by passing recycled cardboard through a hammer mill. These fibers are mixed with paper and with one of a recycling-compatible fiber and water soluble adhesive. The water soluble adhesive can be a meltable thermoplastic fiber. An insulative paper fiber batt having a first width and first length is formed from the recycled paper fibers. A first paper layer can be coupled to the paper fiber batt. The paper fiber batt can be coupled to a corrugated box.

The fibers can be interlocked by methods such a needling or by use of a melted binder which represents 2-25% of the fiber. Alternatively, the fibers can be bound using recycling-compatible or water soluble adhesive.

The insulation batt 350,2051,2150,2250*a,b* can be a manufactured fiber composition formed by passing recycled cardboard through a mill such as a hammer mill. The batt can contain small amounts of water soluble adhesive or meltable fibers such a polypropylene fiber. Optionally, randomly distributed natural fibers such as cotton and binder fibers having lengths between 1/16 inch to 1.5 inches and a denier of between 5 and 12 are used to form the insulation batt 350,2051,2150,2250*a,b*.

Additionally, the fibers can be a water soluble PVOH fiber which can have a denier 0.02-3.0 and a water temperature at more than 100 degrees C., and a cut length of 2 mm to about 8 mm. The fiber can be for example a KURALON (tm) brand short cut fibers. As a binder fiber, the recyclable PVOH fiber used in the insulation can be a 0.4 to 1.0 denier fiber having a length of 3.0-4.0 mm.

The thermoplastic binder fibers and reinforcement fibers are laid randomly yet consistently in x-y-z axes. The reinforcement fibers are generally bound together by heating the binder fibers above their glass transition temperature. Typically, less than about 10% by weight binder fiber is used, and preferably about 5% binder fiber is used to form the insulation batt 350,2051,2150,2250*a,b*.

The fiber can for example, be 75% recyclable cardboard and paper fiber and 25% binder fiber have a density of 1600 GSM (75/25). Additional materials constructed are 80/20 at 1500 GSM; 80/20 at 1400 GSM; 85/15 at 1600 GSM; 85/15 at 1500 GSM; 85/15 at 1400 GSM; and 90/10 at 1500 GSM, with the first number being the paper and cardboard fiber fraction and second number is bi-component (80/20 is 80% fiber and 20% BiCo). The fiber can be 50/50 cardboard/paper up to 75/25 cardboard/paper mix.

The density can be 25 to 40 kg/m3. Thickness can be 1/2 to 3 inch. The fibers (cardboard and binder) can have a denier range of about 1 den to 3 den. Melting temperature related to the bonding fibers can be from 100 C to 250 C. Preferably, the material can be formed of 10% bi-component fiber and 90% recycled cardboard fiber. The bi-component fiber can have a length of 0.5 to 16mm and mixtures of two or more lengths and preferably 1-6 mm and mixtures of lengths. The mixtures can ratios of from 10%-90% of one fiber length to another fiber length.

It was found that for 1300GSM, 90% CARDBOARD with the binder being a 10% -50% -1 mm bi-component fiber and 50%-6 mm bi-component fiber over 93% of the material is re-pulpable and therefore recyclable. It should be noted that 85% repulpability is a "passing grade" for recyclability. The bi-component fibers can be: 6 mm or the 4 mm PE/PP bi-component; 4 mm, then it is a 65/35 PE/PP. Optionally, the Polyethylene/polypropylene ratio can be between about 65/35 and 50/50. These fiber can be by way of non-limiting example ES FIBERVISIONS® polyethylene/polypropylene fiber including EAC, EPS, ESC, ESE, EDC, Herculon T426 and Herculon T457.

It was found that for 1300GSM, 90% CARDBOARD with the binder being a 10% -1 mm Bi component fiber over 98% of the material is re-pulpable and therefore recyclable. 85% repulpability is a "passing grade" for recyclability.

Thermoplastic binder fibers are provided having a weight of less than 0.2 pounds per square foot and, more particularly, preferably about 0.1875 pounds per square foot. The remaining reinforcement fiber is greater than 0.8 pounds per square foot, and preferably 1.0625 pounds per square foot.

The binder fibers are preferably a mixture fibers and paper components passed through a hammer mill.

The insulation batt 350,2051,2150,2250a,b is formed by heating the paper fiber batt in the oven to a temperature greater than about 350° F. and, more preferably, to a temperature of about 362° F. Such heating causes the binder fibers to melt and couple to the non-binder fibers, thus causing fibers to adhere to each other and solidify during cooling. Upon cooling, the binder fibers solidify and function to couple the non-binder reinforcement fibers together as well as function as reinforcement themselves.

The insulative paper fiber batt is heated to form the insulative batt so it has a density of less than about 10 pounds per cubic foot. The insulation batt 350,2051,2150, 2250a,b preferably has a density of greater than about 10 pounds per cubic foot and, more preferably, about 8.3 pounds per cubic foot with a thickness of about 1/4 inch.

According to the present teachings, a method of forming an insulated box is presented. The method includes, forming paper fibers by passing recycled cardboard through a hammer mill, and mixing paper fibers with a recyclable compatible to form a mixture of between 2 and 25% recycling compatible fibers and the balance paper and cardboard fibers. This material can then be formed into a paper fiber batt from the recycled paper fibers and having a first width and first length having a density between 1000 and 1600 gsm. Optionally, a recyclable first paper layer is coupled to the paper fiber batt on a first side of the batt. The fiber batt can be placed within or coupled to a corrugated box. The paper layer can be coupled to the corrugated paper element, or the batt can be directly coupled to a surface layer of the cardboard. Optionally, a recyclable second paper layer can be coupled to the paper fiber batt on a second side of the batt.

The batt can be formed by melting the binder fibers described above in forming the batt. The first paper layer can be coupled to the paper fiber batt by heating the paper layer or disposing one of a recycling-compatible or water soluble adhesive between the first paper layer and the batt. The first and second layers of recyclable paper can be disposed about the insulation to form a pocket. The first and second layers can couple to opposed sides of fiber paper layer, such as by sewing or adhering with one of recycling-compatible or water soluble adhesive, the first and/or second layer to the pair of opposed sides. The binder fibers can be selected from the group consisting of PVOH, polyethylene, polyester, polypropylene, bi-component and mixtures thereof. The insulative pad is about 1/4 to 1 inch thick.

The highly diluted fiber solution is poured out on to a moving screen which allows water to drain away, forming a continuous fiber mat. The continuous fiber matt is pressed between rollers to remove more water. The wet, continuous fiber web is then passed through the dryer where the top and bottom of the web alternately contact the heated surfaces of the drying cylinders, removing the remaining moisture from the paper. At the end of the paper machine, paper is rolled up on a large reel spool.

Recyclable and repulpable insulation materials are further described in U.S. Patent Application No. 62/375,555, filed Aug. 16, 2016, U.S. Patent Application No. 62/419,894, filed Nov. 9, 2016, and U.S. Patent Application No. 62/437, 365, filed Dec. 21, 2016, which are each incorporated by reference in their entirety herein.

The modular box assembly 100 can be used in applications in which a user or mail carrier transports perishable or temperature-sensitive goods, such as frozen, chilled, or hot goods. For example and without limitation, the modular box assembly 100 can be used to transport groceries, medications, electronics, or any other goods. The modular box assembly 100 can improve upon a common cardboard box by providing insulation to prevent spoilage of the contents. The modular box assembly 100 can also be used to deliver hot goods, such as warm foods.

In order to ship temperature-sensitive goods, common cardboard boxes are often packed with insulating materials made of plastics or foams which are not accepted by many recycling facilities or curb-side recycling programs in which a waste management service collects recyclables at a user's home. Consequently, shipping temperature-sensitive goods often produces non-recyclable waste which is deposited in landfills. The insulation materials often decompose very slowly, sometimes over the course of several centuries. In some instances, non-recyclable and non-biodegradable insulating materials can enter the oceans where the insulation materials can remain for years and harm marine life. In some aspects, the modular box assembly 100 can reduce waste and pollution by comprising materials which are recyclable or biodegradable. In aspects in which the modular box assembly 100 is curb-side or single-stream recyclable, the user may be more likely to recycle the modular box assembly 100 due to the ease of curb-side collection.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A box assembly comprising:
   a box defining a box cavity within the box, the box comprising a plurality of side panels and a bottom panel, the plurality of side panels defining an opening to the box cavity positioned opposite from the bottom panel;

a first liner disposed within the box cavity, the first liner defining a first end and a second end, the first end disposed opposite from the second end, the first liner comprising a first insulation batt, the first insulation batt extending continuously from the first end to the second end, the first insulation batt defining an inner surface and an outer surface, the first insulation batt defining a thickness between the inner surface and the outer surface, the thickness being constant from the first end to the second end when the first insulation batt is positioned in an unfolded configuration, a first bend line and a second bend line extending through the first insulation batt, the first liner folded about the first bend line and the second bend line into a C-shape, the first liner defining a first side panel, a second side panel, and a center panel, the first bend line defined between the first side panel and the center panel, the second bend line defined between the second side panel and the center panel, the first side panel covering the opening, the second side panel covering the bottom panel; and a second liner disposed within the box cavity, the second liner defining a third end and a fourth end, the second liner comprising a second insulation batt encapsulated between a first sheet and a second sheet by a border, the border coupling the first sheet to the second sheet, the border extending at least partially around the second insulation batt, a first portion of the border extending outwards from the third end and away from the second insulation batt, a second portion of the border extending outwards from the fourth end and away from the second insulation batt, the first portion of the border and the second portion of the border positioned in contact with the center panel of the first liner, a third bend line and a fourth bend line extending through the second insulation batt, the second liner folded about the third bend line and the fourth bend line into the C-shape, the second liner fitting together with the first liner to define an inner insulated cavity between the first liner and the second liner; and wherein the first insulation batt comprises a repulpable insulation material formed of a mixture of cellulose fiber and between about 2% and about 25% thermoplastic binder fiber distributed substantially randomly within the cellulose fiber, the thermoplastic binder being adhered to the cellulose fiber; and wherein subjecting the repulpable insulation material to a repulpability test produces greater than 85% fiber yield.

2. The box assembly of claim 1, wherein the second liner contacts at least a first side panel of the plurality of side panels and a second side panel of the plurality of side panels.

3. The box assembly of claim 1, wherein:
the first liner comprises a third sheet and a fourth sheet;
the first insulation batt is at least partially encapsulated between the third sheet and the fourth sheet; and
the third sheet is attached to the fourth sheet by a second border which extends at least partially around the first insulation batt.

4. The box assembly of claim 1, wherein the first sheet comprises paper.

5. The box assembly of claim 1, wherein the first insulation batt is flexible.

6. The box assembly of claim 1, wherein:
the first bend line and the second bend line are horizontally oriented; and
the third bend line and the fourth bend line are vertically oriented.

7. The box assembly of claim 1, wherein the first insulation batt comprises a flexible insulation material.

8. The box assembly of claim 1, wherein:
the inner surface of the first insulation batt faces the inner insulated cavity; and
the outer surface of the first insulation batt faces the box.

9. The box assembly of claim 1, wherein the first sheet and the second sheet are defined by two halves of a single sheet.

10. The box assembly of claim 1, wherein the thermoplastic binder is a meltable polyethylene and polypropylene bi-component thermoplastic binder fiber.

11. The box assembly of claim 1, wherein the cellulose fiber comprises paper fiber.

12. The box assembly of claim 1, wherein the thermoplastic binder fiber defines a length of between about 0.5 mm to about 16 mm.

13. A box assembly comprising:
a box defining a box cavity within the box;
a first liner disposed within the box cavity, the first liner defining a first end and a second end, the first end defined opposite from the second end, the first liner comprising a first insulation batt, the first insulation batt extending continuously from the first end to the second end, the first liner defining a first side panel, a second side panel, and a center panel, a first bend line defined between the first side panel and the center panel, a second bend line defined between the second side panel and the center panel, the first liner folded about the first bend line and the second bend line into a C-shape; and
a second liner disposed within the box cavity, the second liner defining a third end and a fourth end, the second liner comprising a second insulation batt extending from the third end to the fourth end, the second liner folded about a third bend line and a fourth bend line into the C-shape, the second liner fitting together with the first liner to define an inner insulated cavity between the first liner and the second liner; and
wherein the first insulation batt comprises a repulpable insulation material formed of a mixture of cellulose fiber and between about 2% and about 25% thermoplastic binder fiber distributed substantially randomly within the cellulose fiber, the thermoplastic binder being adhered to the cellulose fiber; and
wherein subjecting the repulpable insulation material to a repulpability test produces greater than 85% fiber yield.

14. The box assembly of claim 13, wherein the thermoplastic binder is a meltable polyethylene and polypropylene bi-component thermoplastic binder fiber.

15. The box assembly of claim 13, wherein the cellulose fiber comprises paper fiber.

16. The box assembly of claim 13, wherein:
the second insulation batt is encapsulated between a first sheet and a second sheet by a border;
the border couples the first sheet to the second sheet;
the border extends at least partially around the second insulation batt;
a first portion of the border extends outwards from the third end and away from the second insulation batt; and
a second portion of the border extends outwards from the fourth end and away from the second insulation batt.

17. The box assembly of claim 13, wherein the thermoplastic binder fiber defining a length of between about 0.5 mm to about 16 mm.

* * * * *